US011064321B2

(12) United States Patent
Jha et al.

(10) Patent No.: US 11,064,321 B2
(45) Date of Patent: Jul. 13, 2021

(54) CONTENT CENTRIC DYNAMIC AD HOC NETWORKING

(71) Applicant: Intel Corporation, Santa Clara, CA (US)

(72) Inventors: Satish Jha, Portland, OR (US); S. M. Iftekharul Alam, Hillsboro, OR (US); Yi Zhang, Portland, OR (US); Kathiravetpillai Sivanesan, Portland, OR (US); Stepan Karpenko, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 16/236,453

(22) Filed: Dec. 29, 2018

(65) Prior Publication Data

US 2019/0141495 A1    May 9, 2019

(51) Int. Cl.
*H04W 4/40* (2018.01)
*H04W 4/02* (2018.01)
(Continued)

(52) U.S. Cl.
CPC .............. *H04W 4/40* (2018.02); *H04L 45/306* (2013.01); *H04L 45/46* (2013.01); *H04L 67/16* (2013.01);
(Continued)

(58) Field of Classification Search
CPC ......... H04W 4/40; H04W 4/02; H04W 4/023; H04W 4/08; H04W 84/18; H04W 80/12;
(Continued)

(56) References Cited

U.S. PATENT DOCUMENTS

| 2016/0295595 A1 | 10/2016 | Chae et al. |
| 2019/0141495 A1 | 5/2019 | Jha et al. |
| 2019/0182356 A1* | 6/2019 | Ko ........................ H04L 67/26 |

OTHER PUBLICATIONS

L. Wang, R. Wakikawa, R. Kuntz, R. Vuyyuru and L. Zhang, "Data naming in Vehicle-to-Vehicle communications," 2012 Proceedings IEEE INFOCOM Workshops, Orlando, FL, 2012, pp. 328-333, doi: 10.1109/INFCOMW.2012.6193515 (Year: 2012).*

(Continued)

*Primary Examiner* — Eric Myers
(74) *Attorney, Agent, or Firm* — Schwegman Lundberg & Woessner, P.A.

(57) ABSTRACT

An embodiment of a semiconductor package apparatus may include technology to generate first name information corresponding to data and/or content for an autonomous vehicle to represent vehicular application information based on requirements of the vehicular application information, and generate second name information corresponding to a chain of functions for an autonomous vehicle based on the requirements of the vehicular application information. Another embodiment may include technology to identify a cluster head for a cluster of autonomous vehicles, utilize the cluster head to assist in-networking caching of data and/or functions, utilize the cluster head to coordinate discovery of availability of functions, data cache resources, and/or compute resources in a proximity of the cluster head, and utilize the cluster head to coordinate producer mobility and/or consumer mobility. Other embodiments are disclosed and claimed.

25 Claims, 30 Drawing Sheets

(51) Int. Cl.
| | |
|---|---|
| *H04L 29/08* | (2006.01) |
| *H04W 84/18* | (2009.01) |
| *H04L 12/725* | (2013.01) |
| *H04W 4/08* | (2009.01) |
| *H04L 12/715* | (2013.01) |
| *H04W 80/12* | (2009.01) |
| *H04W 84/20* | (2009.01) |

(52) U.S. Cl.
CPC ........ *H04L 67/2842* (2013.01); *H04L 67/327* (2013.01); *H04W 4/02* (2013.01); *H04W 4/023* (2013.01); *H04W 4/08* (2013.01); *H04W 84/18* (2013.01); *H04W 80/12* (2013.01); *H04W 84/20* (2013.01)

(58) Field of Classification Search
CPC ...... H04W 84/20; H04L 45/306; H04L 45/46; H04L 67/16; H04L 67/2842; H04L 67/327
See application file for complete search history.

(56) References Cited

OTHER PUBLICATIONS

Intel Corporation, "From Sand to Silicon 'Making of a Chip' Illustrations," May 2009 (Year: 2009).*

G. Shainer et al., "Next Generation of Co-Processors Emerges: In-Network Computing", Mellanox Technologies, 2016, 21 pages.

M. Sifalakis et al., "An Information Centric Network for Computing the Distribution of Computations", 1st International ACM Conference in Information Centric Networking (ACM ICN 2014), Sep. 2014, pp. 137-146.

Liu et al., "ICN-FC: An Information-Centric Networking Based Framework for Efficient Functional Chaining", 2017 IEEE International Conference on Communications (ICC), May 25, 2017, Abstract.

Krol et al., "NFaaS: Named Function as a Service", In Proceedings of the 4th ACM Conference on Information-Centric Networking '17, Sep. 28, 2017, pp. 134-144.

G. Grassi et al., "Navigo: Interest forwarding by geolocations in vehicular Named Data Networking," 2015 IEEE 16th International Symposium on a World of Wireless, Mobile and Multimedia Networks (WoWMoM), Mar. 5, 2015, 9 pages.

"DMA Technical Manual 8358.1, Chapter 3. Datums, Ellipsoids, Grids, and Grid Reference Systems", National Geospatial Agency, Edition 1, Sep. 1990, 15 pages.

"Geohash Tips & Tricks", #geohas.org, <http://geohash.org/site/tips.html#format>, retrieved Nov. 19, 2018, 2 pages.

International Search Report and Written Opinion for International Patent Application No. PCT/US2019/063623, dated Mar. 24, 2020, 12 pages.

Aissaoui et al., "HCBLS: A Hierarchical Cluster-Based Location Service in Urban Environment," Hindawi Publishing Corporation Mobile Information Systems, vol. 2015, Article ID 490191, 2015, 16 pages.

Intel Corporation, "Summary for NR-V2X AI—7.2.4.1.4 Resource Allocation Mechanism," R1-1811847, 3GPP TSG RAN WG1 Meeting #94bis, Chengdu, China, Oct. 8-12, 2018, 8 pages.

Shah et al., "Adaptive Beaconing Approaches for Vehicular ad hoc Networks: A Survey," Article in IEEE System Journal, May 2016, 15 pages.

Vodopivec et al., "Vehicle interconnection metric and clustering protocol for improved connectivity in vehicular as hoc networks," EURASIP Journal, Wireless Communications and Networking, Oct. 18, 2014, 14 pages.

* cited by examiner

PIT for D

| Interest | Face(s) |
|---|---|
| /stitch/←/bound/←/view/geohash3 | Face$_{App}$ |

FIB for D

| Prefix | Face(s) |
|---|---|
| /stitch | Face$_{GeoHash2}$ |

FIG. 8B

PIT for C

| Interest | Face(s) |
|---|---|
| /stitch/←/bound/←/view/geohash3 | Face$_{GeoHash1}$ |
| /bound/←/view/geohash3 | Face$_{Stitch}$ |
| /view/geohash3 | Face$_{Bound}$ |

FIB for C

| Prefix | Face(s) |
|---|---|
| /bound | Face$_{GeoHash3B}$ |
| /view/geohash3 | Face$_{GeoHash3A}$ |

FIG. 8C

PIT for A

| Interest | Face(s) |
|---|---|
| /view/geohash3 | Face$_{GeoHash2}$ |

FIB for A

| Prefix | Face(s) |
|---|---|
| /view/geohash3 | Face$_{App}$ |

FIG. 8D

PIT for B

| Interest | Face(s) |
|---|---|
| /stitch/←/bound/←/view/geohash3 | Face$_{GeoHash2}$ |
| /view/geohash3 | Face$_{Bound}$ |

FIB for B

| Prefix | Face(s) |
|---|---|
| /view/geohash3 | Face$_{App}$ |

FIG. 8E

| Type | Categories/sub-categories | | Common Parameters (Optional, information type and application dependency) | Specific Parameters (Optional) |
|---|---|---|---|---|
| Type 1- Event based | 1A | | | |
| Type 2- Notification based | 2A | | | |
| Type 3-Driving assistant or Entertainment | 3A - Driving assistant | 3A1 - Traffic Info | 3A1a - Accident info | |
| | | | 3A1b - Congestion info | |
| | | | 3A1c - ... | |
| | | 3A2 - HD map info | | Resolution requirement |
| | | 3A3 - Parking info | Point of Interest (POI) (could be expressed in GeoArea or other format); | |
| | 3B - Entertainment | 3B1 - Video | | |
| | | 3B2 - Music | | |
| | | 3B3 - ... | Time interval; | |
| | 3C - Service discovery | | | |
| Type 4 - Raw data and function | 4A - Raw data | 4A1 - Sensor data | | Functions with the specified order; Sensor type; Sensor resolution; Delay requirement (processing delay) |
| | | 4A2 - Other kind of raw data | | |
| | 4B - Function | | | Version; |

FIG. 9

(a) Example of Various Content Types in a NDN-NFN Service-Resource Report from a Node (b) Example of an Aggregated NDN-NFN Service-Resource Report of multiple nodes generated by CH (b) Cluster Full Report Broadcast in multiple parts/messages

CONTENT CENTRIC DYNAMIC AD HOC NETWORKING

TECHNICAL FIELD

Embodiments generally relate to networking. More particularly, embodiments relate to content centric dynamic ad hoc networking.

BACKGROUND

An autonomous or semi-autonomous vehicle (AV) may include various technologies for perception, such as camera feeds and sensory information. In addition, the vehicles also may use collaborative communications from other vehicles and the intelligent transportation infrastructure to further enhance its perception of the surrounding environment beyond the immediate reach of the camera and other onboard sensors. Institute of Electrical and Electronics Engineers (IEEE) standard 802.11p defines a physical layer radio standard known as Dedicated short-range communications (DSRC) to support vehicular communications, including vehicle-to-everything (V2X) communication. The 3rd Generation Partnership Project (3GPP) published cellular-based V2X specification (C-V2X). On top of the IEEE 802.11p standard, IEEE 1609 defines a family of standards for Wireless Access in Vehicular Environments (WAVE) covering several aspects of a vehicular communications stack, from channel managements to security services. Taken together, WAVE/DSRC technology provides communication among the vehicles, and between the vehicle and the roadside units (RSUs) in specific locations (e.g., toll plazas for applications such as electronic fee collection). Similar technology is being developed in Europe as well. For example, Cooperative-Intelligent Transport Systems (C-ITS) is being defined to provide connectivity between vehicles (e.g., car-to-car), between vehicles and fixed locations (e.g., car-to-infrastructure), and between vehicles and other road participants (e.g. car-to-pedestrian).

BRIEF DESCRIPTION OF THE DRAWINGS

The various advantages of the embodiments will become apparent to one skilled in the art by reading the following specification and appended claims, and by referencing the following drawings, in which:

FIGS. 8A to 8E are illustrative sequence diagrams and associated forwarding table/database updates of an example message flow according to an embodiment;

FIG. 9 is an illustrative diagram of an example of a table of information organization used for naming content/data and functions performed on data according to an embodiment;

DESCRIPTION OF EMBODIMENTS

Figure 1:
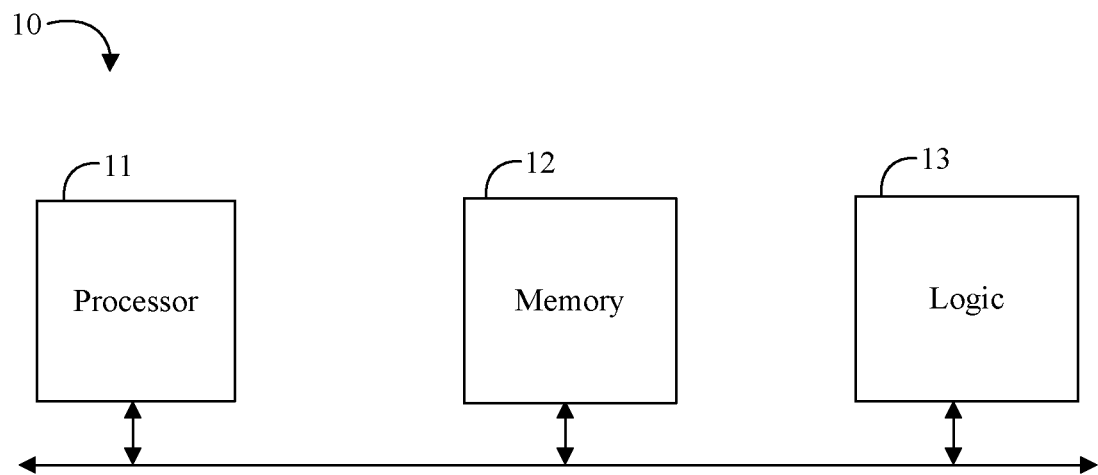
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor to generate first name information corresponding to one or more of data or content for an autonomous vehicle to represent vehicular application information based on one or more requirements of the vehicular application information, and generate second name information corresponding to a chain of one or more functions for an autonomous vehicle based on the one or more requirements of the vehicular application information. In some embodiments, an 'optional' tag may be attached to a function name to allow forwarding of unprocessed data in case a vehicle does not have enough computing capability. The logic 13 may be further configured to incorporate the first and second name information as part of a name of a data packet including at least geo-content location information in the name of the data packet. In some embodiments, the logic 13 may also be configured to discover an available function independent from one or more of a data request or response procedure, and download the available function from a trusted source. For example, the logic 13 may be configured to discover the available function based on one or more of the first name information and the second name information. In some embodiments, the logic 13 may also be configured to forward data based on one or more of geographical location of data, compute capability, and communication capability. For example, the logic 13 may be configured to place an in-network function based on one or more of geographical location of data, compute capability, and communication capability.

Alternatively, or additionally, in some embodiments of the system 10 the logic 13 may be configured to identify a cluster head for a cluster of autonomous vehicles, utilize the cluster head to assist in-networking caching of one or more of data and functions, utilize the cluster head to coordinate discovery of one or more of an availability of functions, data cache resources, and compute resources in a proximity of the cluster head, and utilize the cluster head to coordinate one or more of producer mobility and consumer mobility. For example, the logic 13 may be configured to select the cluster head based at least in part on computational resources of two or more cluster head candidates. In some embodiments, the logic 13 may be configured to identify popular information in a geo-location of the cluster head, and utilize the cluster head to determine where to cache the popular information. The logic 13 may also be configured to provide one or more of service and resource availability-related information updates from each cluster member to the cluster head, provide aggregated service and resource availability-related information from the cluster head to the cluster members, and provide additional service and resource availability-related information from the cluster head to one or more neighbor cluster head. In some embodiments, the logic 13 may be further configured to detect if a producer is moved out of the cluster, and utilize the cluster head to determine one or more cluster members for cache replacement of the moved producer within the cluster. The logic 13 may also be configured to detect if a consumer is moved out of the cluster, track a new target cluster for the moved consumer; and forward interest packet-related information for the moved consumer towards the new target cluster. For example, the logic 13 may be configured to forward data based on cluster-related information.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general-purpose processor, a special purpose processor, a central processor unit (CPU), a controller, a micro-controller, etc. In some embodiments, the logic 13 may be located in, or co-located with, various components, including the processor 11 (e.g., on a same die).

Alternatively, or additionally, all or portions of these components may be implemented in one or more modules as a set of logic instructions stored in a machine- or computer-readable storage medium such as random-access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, etc.).

Figure 2:
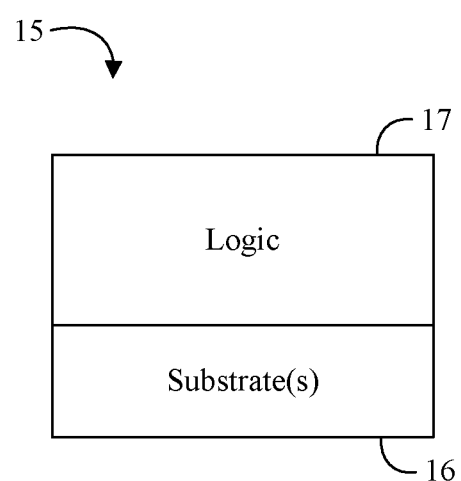
FIG. 2 is a block diagram of an example of a semiconductor package apparatus according to an embodiment.

Turning now to FIG. 2, an embodiment of a semiconductor package apparatus 15 for use with autonomous vehicle-related information may include one or more substrates 16, and logic 17 coupled to the one or more substrates 16, wherein the logic 17 is at least partly implemented in one or more of configurable logic and fixed-functionality hardware logic. The logic 17 coupled to the one or more substrates 16 may be configured to generate first name information corresponding to one or more of data or content for an autonomous vehicle to represent vehicular application information based on one or more requirements of the vehicular application information, and generate second name information corresponding to a chain of one or more functions for an autonomous vehicle based on the one or more requirements of the vehicular application information. For example, the logic 17 may be configured to incorporate the first and second name information as part of a name of a data packet including at least geo-content location information in the name of the data packet. In some embodiments, the logic 17 may also be configured to discover an available function independent from one or more of a data request or response procedure, and download the available function from a trusted source. For example, the logic 17 may be configured to discover the available function based on one or more of the first name information and the second name information. In some embodiments, the logic 17 may also be configured to forward data based on one or more of geographical location of data, compute capability, and communication capability. For example, the logic 17 may be configured to place an in-network function based on one or more of geographical location of data, compute capability, and communication capability.

Alternatively, or additionally, in some embodiments of the apparatus 15 the logic 17 may be configured to identify a cluster head for a cluster of autonomous vehicles, utilize the cluster head to assist in-networking caching of one or more of data and functions, utilize the cluster head to coordinate discovery of one or more of an availability of functions, data cache resources, and compute resources in a proximity of the cluster head, and utilize the cluster head to coordinate one or more of producer mobility and consumer mobility. For example, the logic 17 may be configured to select the cluster head based at least in part on computational resources of two or more cluster head candidates. In some embodiments, the logic 17 may be configured to identify popular information in a geo-location of the cluster head, and utilize the cluster head to determine where to cache the popular information. The logic 17 may also be configured to provide one or more of service and resource availability-related information updates from each cluster member to the cluster head, provide aggregated service and resource availability-related information from the cluster head to the cluster members, and provide additional service and resource availability-related information from the cluster head to one or more neighbor cluster head. In some embodiments, the logic 17 may be further configured to detect if a producer is moved out of the cluster, and utilize the cluster head to determine one or more cluster members for cache replacement of the moved producer within the cluster. The logic 17 may also be configured to detect if a consumer is moved out of the cluster, track a new target cluster for the moved consumer; and forward interest packet-related information for the moved consumer towards the new target cluster. For example, the logic 17 may be configured to forward data based on cluster-related information.

Embodiments of logic 17, and other components of the apparatus 15, may be implemented in hardware, software, or any combination thereof including at least a partial implementation in hardware. In some embodiments, the logic 17 coupled to the one or more substrates 16 may include transistor channel regions that are positioned within the one or more substrates 16. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 15 may implement one or more aspects of the method 20 (FIG. 3), the method 30 (FIGS. 4A to 4C), or any of the embodiments discussed herein. In some embodiments, the illustrated apparatus 15 may include the one or more substrates 16 (e.g., silicon, sapphire, gallium arsenide) and the logic 17 (e.g., transistor array and other integrated circuit/IC components) coupled to the substrate(s) 16. The logic 17 may be implemented at least partly in configurable logic or fixed-functionality logic hardware. In one example, the logic 17 may include transistor channel regions that are positioned (e.g., embedded) within the substrate(s) 16. Thus, the interface between the logic 17 and the substrate(s) 16 may not be an abrupt junction. The logic 17 may also be considered to include an epitaxial layer that is grown on an initial wafer of the substrate(s) 16.

Figure 3:
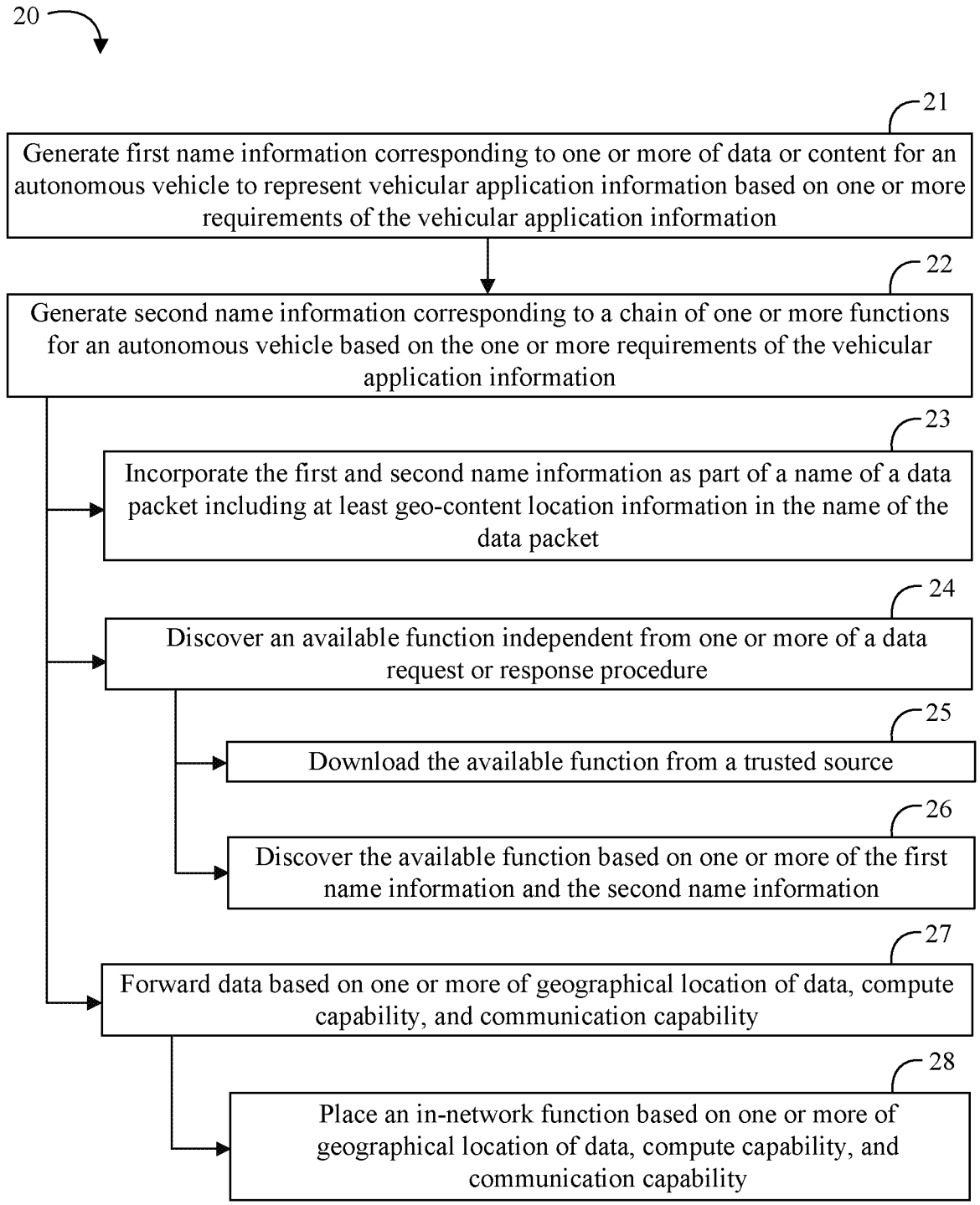
FIG. 3 is a flowchart of an example of a method of compute-aware content-centric vehicular networking according to an embodiment.

Turning now to FIG. 3, an embodiment of a method 20 of compute-aware content-centric vehicular networking may include generating first name information corresponding to one or more of data or content for an autonomous vehicle to represent vehicular application information based on one or more requirements of the vehicular application information at block 21, and generating second name information corresponding to a chain of one or more functions for an autonomous vehicle based on the one or more requirements of the vehicular application information at block 22. For example, the method 20 may include incorporating the first and second name information as part of a name of a data packet including at least geo-content location information in the name of the data packet at block 23. Some embodiments of the method 20 may include discovering an available function independent from one or more of a data request or response procedure at block 24, and downloading the available function from a trusted source at block 25. For example, the method 20 may include discovering the available function based on one or more of the first name information and the second name information at block 26. Some embodiments of the method 20 may include forwarding data based on one or more of geographical location of data, compute capability, and communication capability at block 27. For example, the method 20 may include placing an in-network function based on one or more of geographical location of data, compute capability, and communication capability at block 28.

Figure 4A:
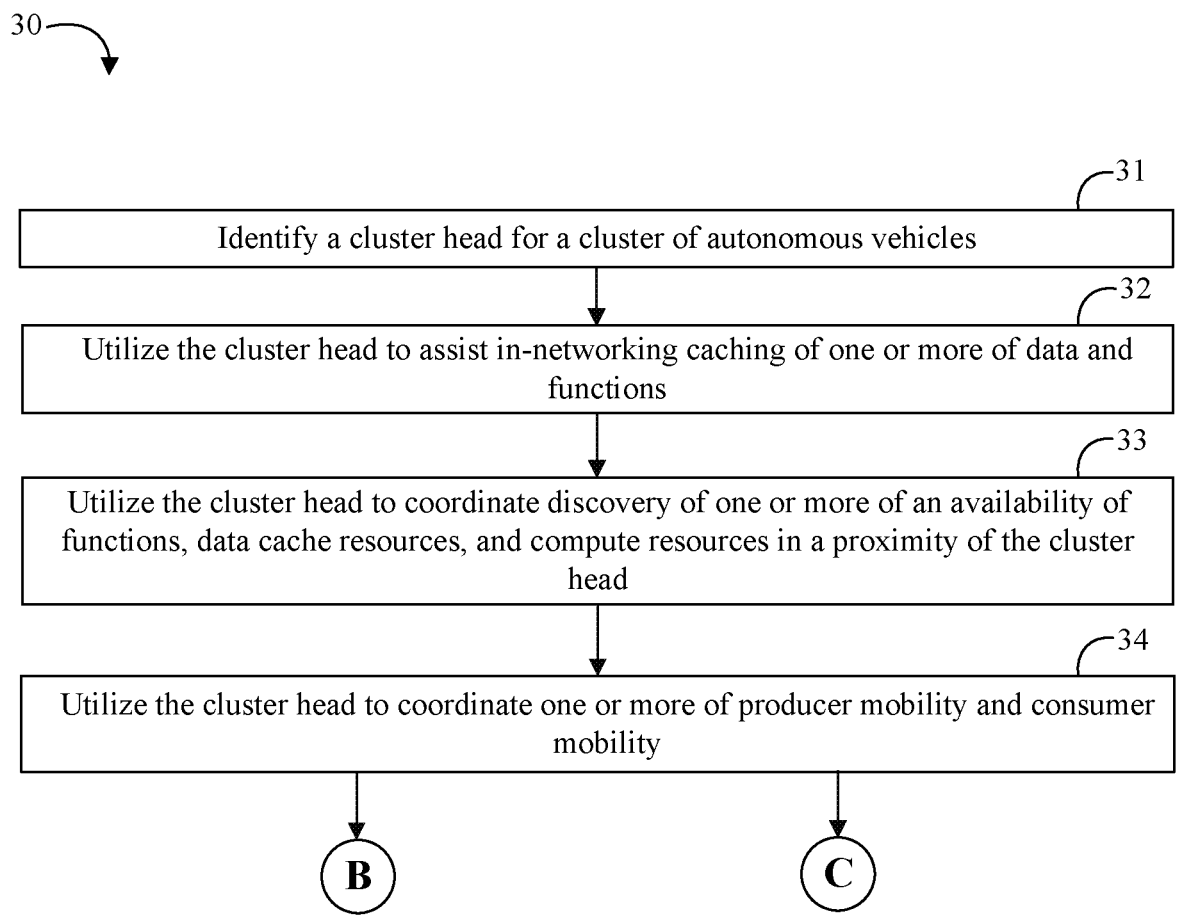
FIGS. 4A to 4C are flowcharts of an example of a method of vehicular networking according to an embodiment.
Figure 4B:
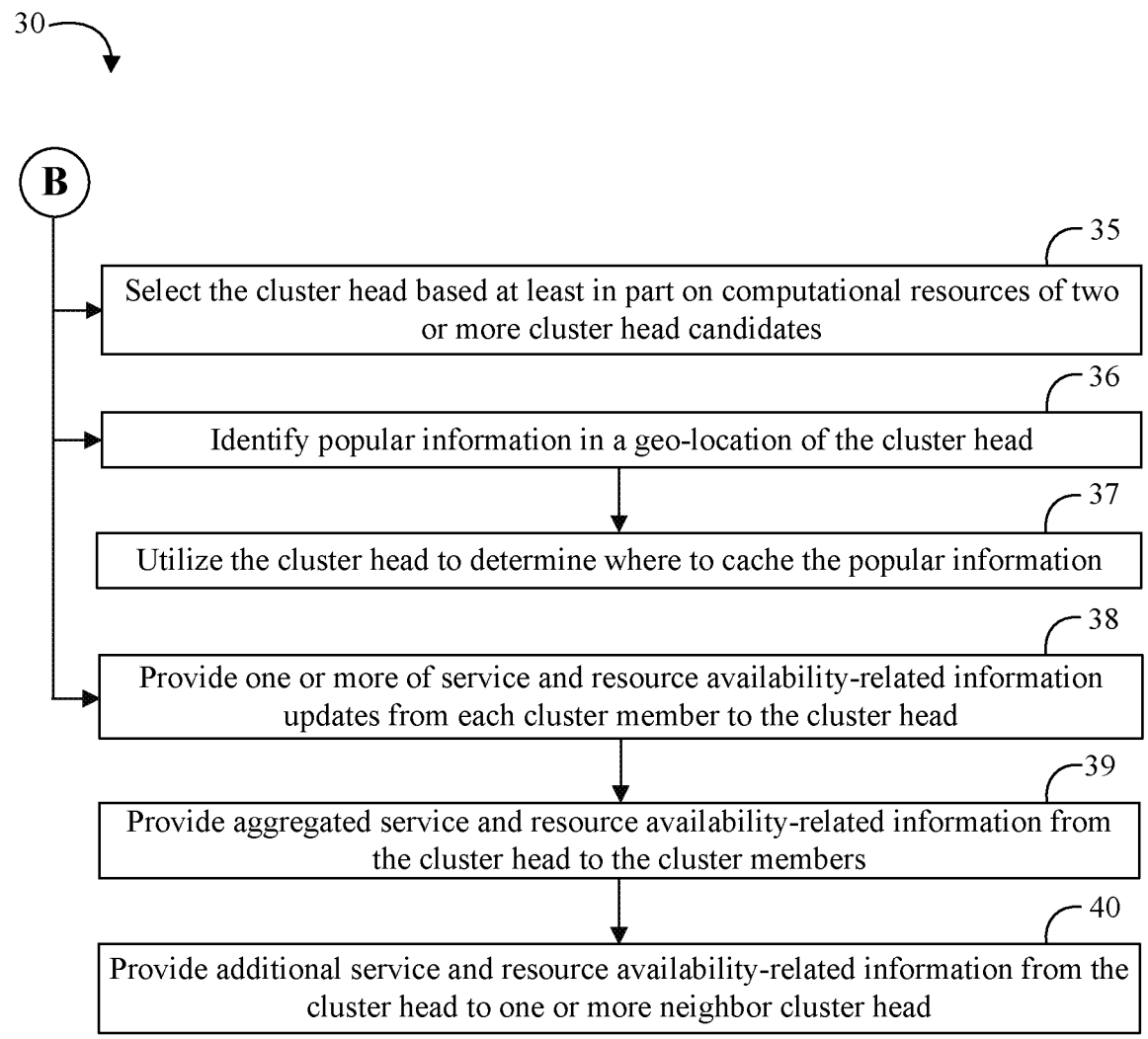
Figure 4C:
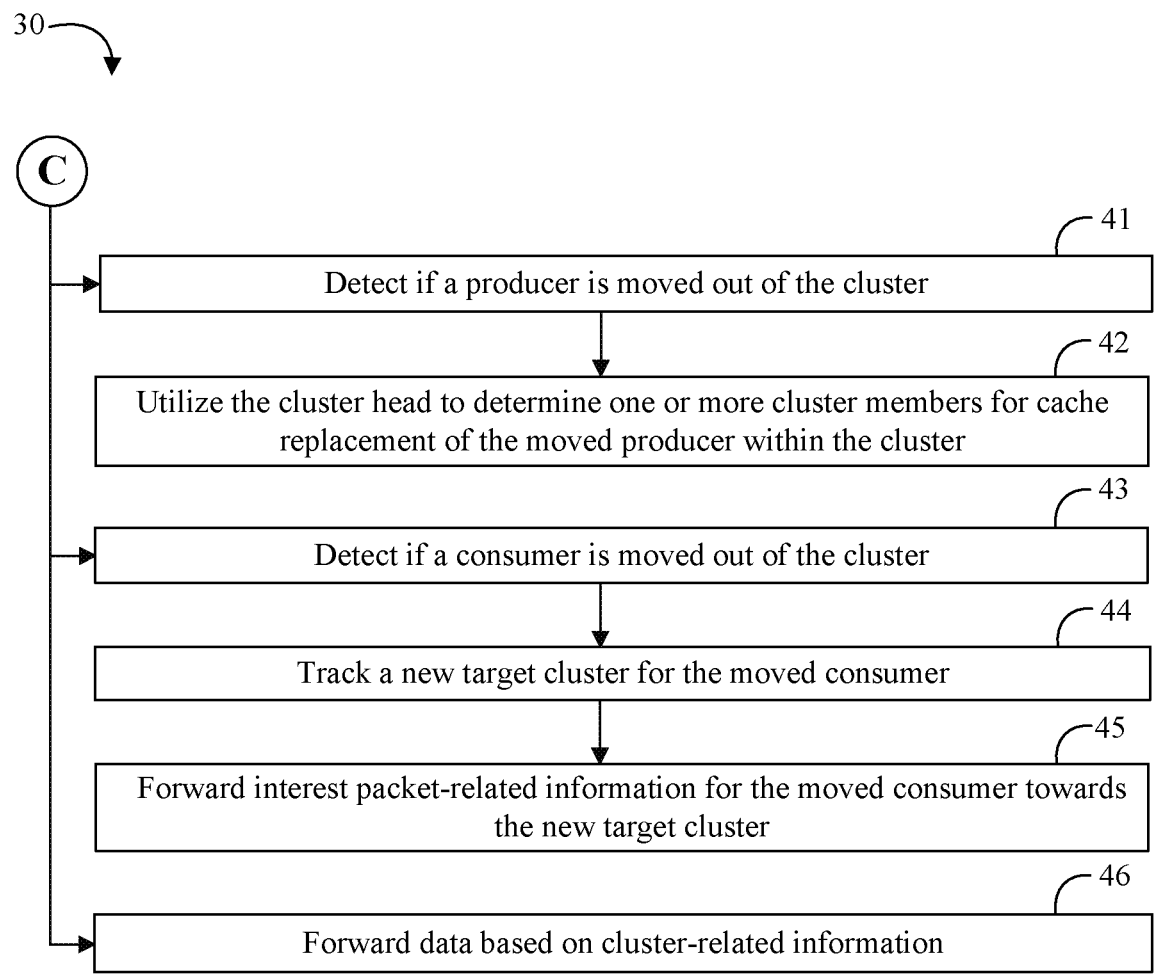

Turning now to FIGS. 4A to 4C, an embodiment of a method 30 of vehicular networking may include identifying a cluster head for a cluster of autonomous vehicles at block 31, utilizing the cluster head to assist in-networking caching of one or more of data and functions at block 32, utilizing the cluster head to coordinate discovery of one or more of an availability of functions, data cache resources, and compute resources in a proximity of the cluster head at block 33, and utilizing the cluster head to coordinate one or more of producer mobility and consumer mobility at block 34. For example, the method 30 may include selecting the cluster head based at least in part on computational resources of two or more cluster head candidates at block 35. Some embodiments of the method 30 may also include identifying popular information in a geo-location of the cluster head at block 36, and utilizing the cluster head to determine where to cache the popular information at block 37. The method 30 may also include providing one or more of service and resource availability-related information updates from each cluster member to the cluster head at block 38, providing aggregated service and resource availability-related information from the cluster head to the cluster members at block 39, and providing additional service and resource availability-related information from the cluster head to one or more neighbor cluster head at block 40. Some embodiments of the method 30 may further include detecting if a producer is moved out of the cluster at block 41, and utilizing the cluster head to determine one or more cluster members for cache replacement of the moved producer within the cluster at block 42. The method 30 may also include detecting if a consumer is moved out of the cluster at block 43, tracking a new target cluster for the moved consumer at block 44, and forwarding interest packet-related information for the moved consumer towards the new target cluster at block 45. For example, the method 30 may include forwarding data based on cluster-related information at block 46.

Embodiments of the method 20 and/or the method 30 may be implemented in a system, apparatus, computer, device, etc., for example, such as those described herein. More particularly, hardware implementations of the method 20 and/or the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 and/or the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 20 to 25 below, while the method 30 may be implemented on a computer readable medium as described in connection with Examples 51 to 56 below. Embodiments or portions of the method 20 and/or the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 5:
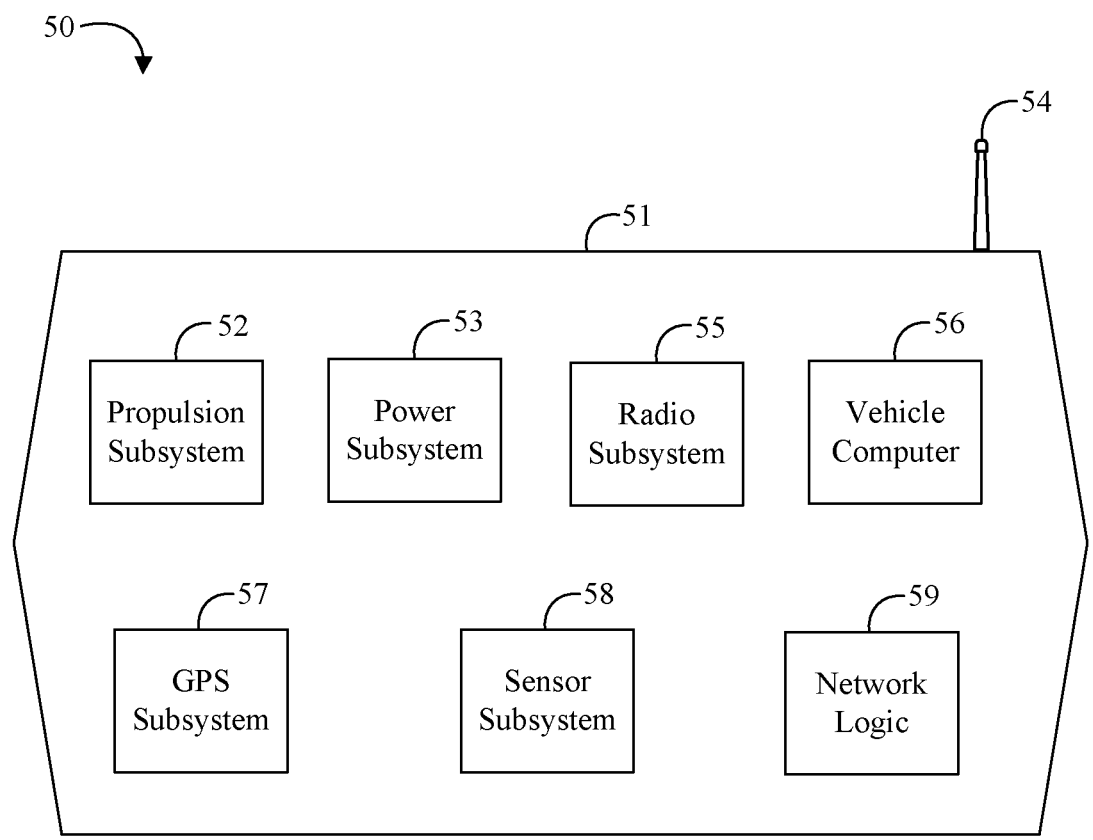
FIG. 5 is a block diagram of an example of an autonomous vehicle according to an embodiment.

Turning now to FIG. 5, an embodiment of an autonomous vehicle (AV) 50 may include a vehicle body 51 housing/supporting a propulsion subsystem 52 and a power subsystem 53. The AV 50 may be fully autonomous or semi-autonomous and may optionally accommodate one or more passengers and/or one or more drivers/pilots. The propulsion subsystem 52 may include one or more of ground propulsion components, air propulsion components, marine propulsion components, and space propulsion components, or any other suitable propulsion components (e.g., cable, maglev, etc.). For example, the AV 50 may be a car, a plane, a helicopter, a boat, a drone, etc. The power subsystem 53 may include one or more batteries or electrical power sources. In some embodiments, the power subsystem may optionally include one or more additional power sources such as a gasoline or other fuel powered engine. The AV 50 may also include one or more antennas 54 coupled a radio subsystem 55, a vehicle computer 56, a GPS subsystem 57, a sensor subsystem 58, and network logic 59. The components and subsystems of the AV 50 may be coupled to each other in any suitable manner, including mechanically and/or electrically. Electrical components may be communicatively coupled to each other wired or wirelessly. For example, the location information from the GPS subsystem 57 may be useful for navigation and the AV 50 may rely at least partly on the location information for navigation. Although discussed primarily with the example of autonomous vehicles, some embodiments may be adapted for non-autonomous vehicles or other navigation applications (e.g., where another type of edge device may be substituted for the AV 50).

The network logic 59 may be configured as described in connection with any of the system 10 (FIG. 1), and/or apparatus 15 (FIG. 2) above (e.g., and/or may include features of the other embodiments and examples described below). In particular, the network logic 59 may include technology to acquire network related information (e.g., from the GPS subsystem 57, the radio subsystem 55, etc.), acquire local area information (e.g., from the sensor subsystem 58, the radio subsystem 55, etc.), and implement one or more aspects of the method 20 (FIG. 3), and/or the method 30 (FIGS. 4A to 4C). In some embodiments, the network logic 59 may be physically or logically arranged as a module outside of the vehicle computer 56. Alternatively, in some embodiments all or portions of the network logic 59 may be implemented in or integrated with the vehicle computer 56. Some embodiments may omit one or more of the GPS subsystem 57 and propulsion subsystem 52, such that the system functions as a fixed infrastructure node such as an RSU, instead of an AV 50.

For marine environments, RSUs may be replaced with buoys, floating or underwater infrastructure, and/or other coastal connected vehicle infrastructure. For air environments, the connected vehicle infrastructure may include RSUs or towers (e.g., when flying over land), buoys or floating infrastructure (e.g., when flying over water), and/or satellites.

Network Naming Examples

Some embodiments may advantageously provide a networking paradigm for improved or near-optimal compute and communication trade-offs in vehicular ad hoc networks. The advancement in autonomous driving technology is leading towards roads and highways that may be full of smart and connected vehicles with increased sensing, computing and communication capabilities. Augmented information services may involve technology where vehicles become source, processor, and consumer of information at the same time. For example, an autonomous car may continuously capture its surrounding environment via on-board sensors (e.g., camera) which can be a source of information, particularly for cars which are configured to know about the situation of road before them. Transmissions of raw data from individual vehicles and processing the data at an end-host (e.g., an edge device, the cloud, etc.), however, may incur significant communication overhead on the network. The overhead may adversely affect duration or rate of successful data transfer, especially in a highly congested road, making application requirements difficult or impossible to meet.

In-network computing (INC) over vehicular ad hoc networks allows processing functions (such as aggregation or compression) to be applied over data while they are being forwarded, instead of waiting for them to be applied at the end host. In the case of the aforementioned example, a vehicle can stitch its own captured view with that from a previous vehicle and eliminate redundancy before forwarding to the next hop. Thus, processing at intermediate nodes may reduce an amount of data to be forwarded in the subsequent hops—helping to reduce overall traffic in a multi-hop vehicular wireless network. Some embodiments may provide a generic substrate for in-network computing over vehicular networks where the network intelligently trades computing capability/resources with communication capability/resources to meet varying application demands.

Some embodiments may advantageously provide technology to enable in-network computing over vehicular networks where data forwarding nodes are chosen based on a near-optimal compute-communication trade-off. Embodiments of the network substrate may be agnostic to the underlying physical layer of wireless communication interface and may provide technology to represent application data and computing functions, which is aligned with information-centric networking (ICN) or named function networking (NFN). In particular, some embodiments may provide technology for (i) a naming mechanism to represent vehicular application data and chain of functions with their requirements, (ii) a technique (independent from data request/response procedure) to discover and download functions from trusted sources, and (iii) data forwarding and in-network function placement strategy that may be aware of geographical location of data and compute-communication trade-off.

Vehicular applications require the distribution of huge amounts of data among heterogeneous players under poor and intermittent connectivity in high mobility, harsh signal propagation, and sparse roadside infrastructure conditions. The host-centric internet protocol (IP)-based protocols of the conventional Internet networking may be designed with the end-to-end connectivity principle in mind, and may not be well-suited under such settings. Some embodiments may provide a networking paradigm that replaces or works alongside IP that can leverage in-network caching and vehicular computing power with a localized replication technique. This can speed up the retrieval of location- and time-dependent contents by reducing congestion and counteracting the intermittent wireless connectivity. Information-centric networking (ICN) may be a suitable fit for networking layer technology in a dynamic vehicular network. ICN reverses the traditional IP address-centric philosophy into a content-centric one; this means that a user interested in getting a given content directly uses a "name" to retrieve it without referring to the IP address of the node storing the content. Each vehicle could act as the content producer or content consumer, and the content is delivered hop-by-hop among distributed nodes. Content discovery is simpler because ICN does not need name-to-IP-address resolution, and does not ask for the producer to always be connected. While conventional ICN shows promise for a vehicular environment, it poses challenges in terms of efficient interest or data forwarding, incorporating compute-communication trade-off, and naming or representing data relevant to heterogeneous vehicular applications and computing functions.

Named data networking (NDN) is a variant of ICN where an NDN network uses data/content names from applications for data delivery. Applications follow a pre-defined naming guideline to name content which is known to nodes in NDN network. A NDN network has three main actors in content delivery: data producers, consumers, and router/forwarders. A consumer (node requesting content) sends an interest packet (carrying content name or content attributes) to the network to request a specific data/content, and routers forward the interest packet towards data/content producers and maintain track of all the pending Interests. When an interest packet reaches a node with data matching interest name (at the producer, or from a router cache) or when a data/content becomes available at a router with pending matching interest, the data/content is sent back to the consumer following a reverse path of the interest packet. Usually NDN capable nodes maintain three data structures/tables to enable name-based content delivery: a content store (CS), Pending Interest Table (PIT), and Forwarding Information Base (FIB). The Content Store caches relevant data/content received for a limited time to potentially satisfy future Interest packets, while the PIT maintains unserved Interests for a while that have been forwarded and waits for matching data to return. Whenever a data/content is received at router with a matching entry in PIT, the router forwards the content towards downstream interfaces listed in the PIT entry, removes that PIT entry and caches the data in CS for future use. A name-based routing protocol maintains a Forwarding Information Base which is used by a forwarding strategy module to make Interest forwarding decisions.

Named Function Networking (NFN) is an extension to ICN that enables naming functions in addition to naming data and fetching/executing function executables inside traditional wired network. NDN or NFN, in their general formats, are suitable for wired network and suffer from excessive retransmissions in wireless networks which is inherently unreliable and broadcast in nature. While there are some extensions to NDN available for vehicular wireless networks, they do not take advantage of opportunistic communication and compute-communication trade-offs in wireless networks. Some embodiments may include these aspects to enable content delivery and in-network computing service based on content and service names in a highly dynamic decentralized ad-hoc vehicular network. In particular, some embodiments may include improvements to one or more of the following three technologies: naming technology; service/function discovery technology; and data forwarding technology.

Naming technology: A significant portion of vehicular applications data comes from various sensors and have strong geo-location dependency. These applications should include geo-location in the name of data/content. A node/consumer interested in such a content (such as traffic updates at an intersection, parking availability at a parking location, cooperative environment perception at a local area) can send an interest packet to the network which can be forwarded towards a content's associated geo-location. Many such applications also have stringent requirements in terms of latency or throughput and can benefit from in-network computing functions. For example, a cooperative road view construction application may allow each reporting vehicle to apply a function that calculates volumetric representation (bounding box) of raw point clouds captured via LiDAR or 3D stereo camera. Intermediate data forwarding vehicles can stitch bounding box representations of multiple nearby vehicles and forward to interested vehicles. In case of an entertainment application such as video streaming, an intermediate vehicle may dynamically choose a video encoding scheme based on available communication bandwidth. Some embodiments provide a comprehensive naming scheme that incorporates geo-location of content, application type, chain of functions with application-specific requirements.

Service/function discovery technology: A mechanism independent from interest/data forwarding is beneficial to discover available functions in the network. History from previous function execution and pro-active function discovery can help reduce end-to-end latency. This is also useful to ensure interoperability among vehicles from various brands. Some embodiments may include an additional naming mechanism and message flow for function discovery, downloading function images from trusted sources like RSUs, and periodic announcement about popularity of functions to enable function prefetching.

Data forwarding technology: Some embodiments may enable content delivery based on geo-location association of content and also radio transmission technology rather than traditional routing-based node-to-node data forwarding. This helps with coping with frequent communication link disruptions and changes in network topology of vehicular networks. ICN for wired networks also relies on a routing protocol to populate forwarding information base (FIB), which is not applicable to a dynamic wireless network. Instead, some embodiments use the existing Geo grid map systems (such as Military Grid Reference System (MGRS), or Geo-Hash) where the world can be divided into approximately square/rectangular geo-areas of various granularities and each geo-area can be represented by a string of digits and letters. A vehicle equipped with GPS sensors can determine its location and calculate its Geo-Area. Some embodiments may provide (i) mechanisms to determine an interest packet forwarding path (geo-area-to-geo-area) and a content delivery reverse path (geo-area-to-geo-area); and (ii) mechanisms to select a node in each geo-area to forward an interest packet (or content) to the next geo-area with minimal flooding. Some embodiments of a content forwarding mechanism also integrate in-network computing at a content forwarder to process two or more versions of the content (e.g., views of an intersection by different vehicles) to generate better content before forwarding to next geo-area.

Architectural Overview Examples

Figure 6:
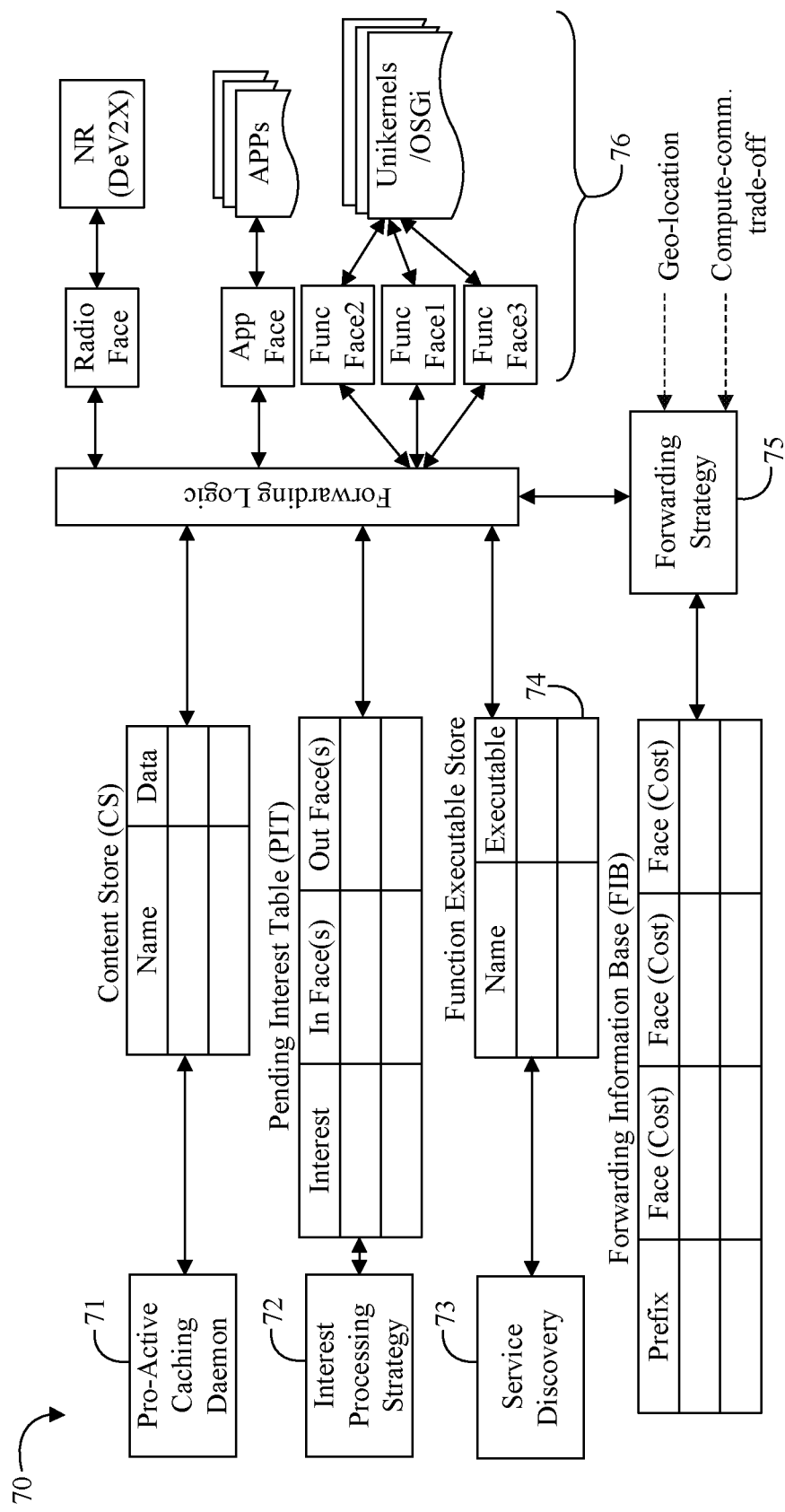
FIG. 6 is a block diagram of an example of a compute-aware content-centric networking module according to an embodiment.

Turning now to FIG. 6, an embodiment of a vehicular node architecture 70 may include suitable technology to implement the naming techniques discussed herein. In the architecture 70, a vehicular node requesting data sends an interest with an expressive name of data and a chain of function names to be applied over named data. The architecture 70 of a vehicular node is extended from ICN/NDN with the introduction of, among other things, additional modules for a pro-active caching daemon 71, an interest processing strategy 72, a service discovery module 73, function executable store 74, a forwarding strategy 75, and an abstraction of function executables 76. Note that, a node running default NDN stack only maintains content store for caching, pending interest table to record incoming interest, and forwarding information base that is used by forwarding strategy 75 to decide routes for interest packets. The role of the additional modules below in enabling efficient data forwarding and intelligent in-networking computation is discussed below.

(i) Pro-active caching daemon 71: This module allows a vehicular application to register for pro-active caching even if there are no explicit interests for the application at the time data is produced. Because many vehicular applications (e.g., cooperative road construction etc.) are latency-sensitive, pro-active caching would allow faster data forwarding by avoiding interaction with an application layer. The latency-insensitive applications (e.g., cooperative video streaming or VR gaming) can go through regular interest-based caching to make best use of limited caching storage. Some embodiments may allow certain applications to cache their data even without an explicit request from the network. This is mainly to reduce end-to-end latency of a delay sensitive computing request as data can be retrieved from cache and processed immediately.

(ii) Interest processing strategy 72: The name of an embodiment of an interest packet contains a series of function names and the node receiving interests may support only a subset of requested functions (this list is available from 'Function Executable Table' as mentioned below). This module modifies or creates new interest packet(s) with names of unsupported functions. It also creates Pending Interest Table (PIT) entries into the PIT table for modified interest packets so that corresponding data packets, upon reception, can be forwarded to appropriate interface. The modified or newly created interest packets then are forwarded in the network and may go through additional rounds of modification in subsequent hops.

(iii) Service/Function discovery 73 and function executable store 74: These modules usually work independently of the regular interest/data forwarding chain. It allows a RSU to periodically broadcast available function names, their profiles (minimum resources required etc.) and popularity. Popularity of a content or function can be Geo-area dependent. These modules are also responsible for downloading specific function executables from RSUs, storing them into a store known as 'Function Executable Store', and sharing the list of available functions with neighboring vehicles. Selected nodes in a Geo-Area may download some function executables from RSUs proactively if these functions are very popular in this Geo-Area based on popularity info broadcasted by the RSU.

(iv) Compute-communication- and geo-area-aware forwarding strategy 75: This forwarding strategy considers geo-area of data, radio technologies and computing capability of neighboring vehicles to forward interest and data packets. The strategy also takes the opportunistic nature of wireless communication into consideration to enable faster data dissemination.

(v) Abstraction of function executables 76: Some embodiments abstract function executables as forwarding faces similar to application and radio faces (which abstract varying applications and radio protocols for ICN/NDN networking layer). The forwarding logic inside a vehicular node chooses a particular function face if that is listed as available in the function executable store and selected by the forwarding strategy. The underlying implementation of each function may use any suitable technology including, for example, either unikernel or JAVA-based service-oriented architecture (e.g., Open Services Gateway initiative (OSGi)).

Figure 7:
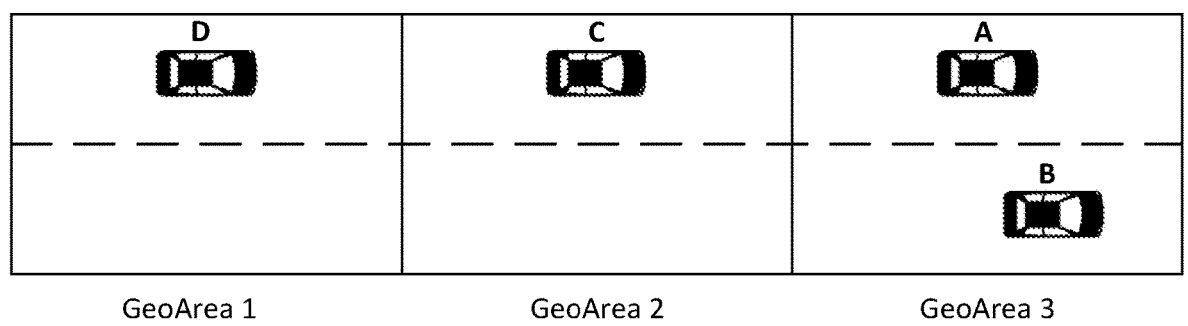
FIG. 7 is an illustrative diagram of an example of a road topology according to an embodiment.
Figure 8A:
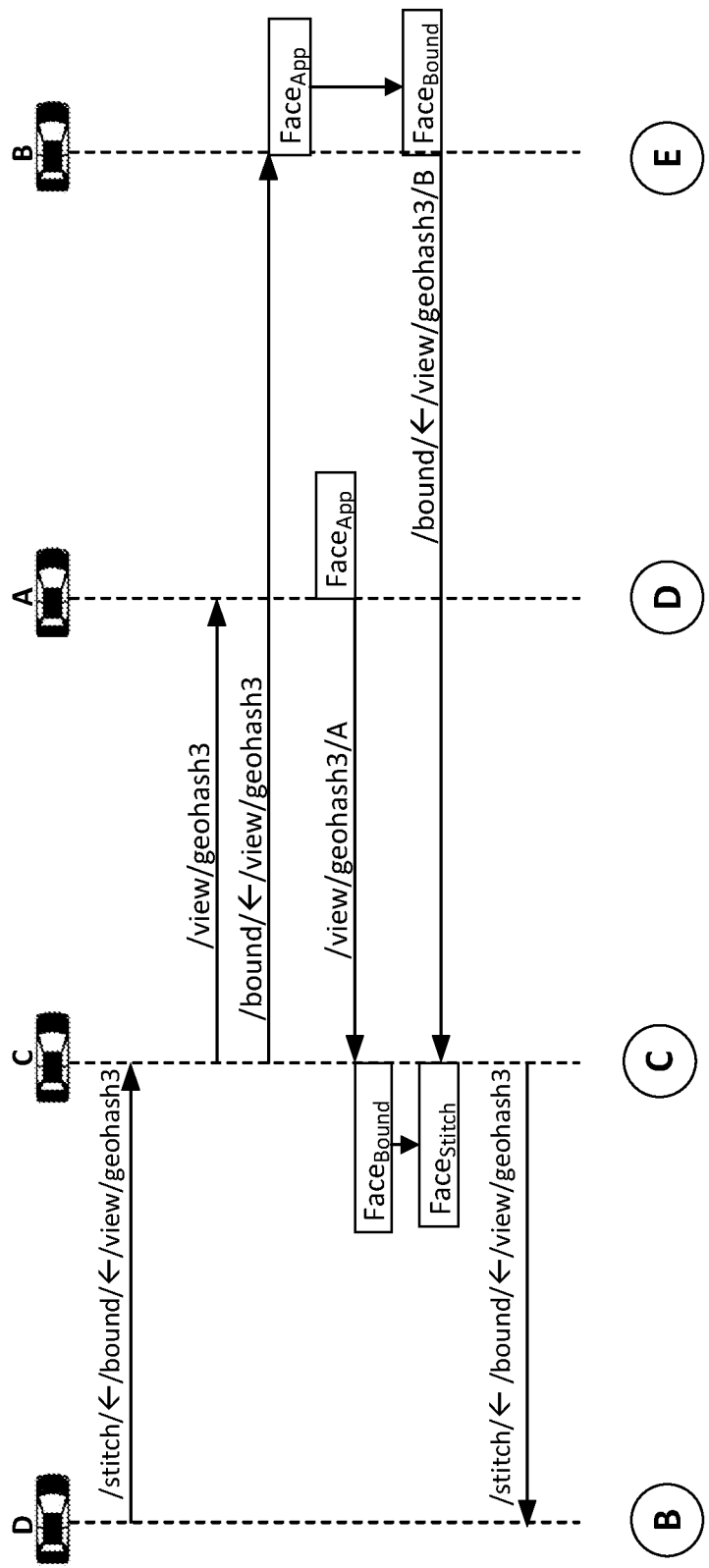

FIG. 7 shows an example road topology. A cooperative road perception is illustrated as an example to demonstrate how the aforementioned modules may work together to enable interest/data forwarding and in-network computing. FIG. 7 shows an example road topology consisting of 4 vehicles. The road environment is divided into three geographical areas each identified with a unique name. Further division within a geographical area is possible to denote location with smaller granularity (e.g., as described in more detail below).

FIGS. 8A to 8E show an example message flow to enable in-network computing over a vehicular ad hoc network. In this example, it is assumed that vehicle D is interested to know about road situation of geo-area 3 which is identifiable with the string 'geohash3'. Vehicle D is not interested in lots of details of the environment and mainly wants to know about the shape of potential hazardous dynamic objects on road. It also prefers to have stitch function applied over views captured by multiple vehicles within geo-area 3 so that it can get a broader perspective of the environment. As shown in FIGS. 8A to 8E, the application of vehicle D creates an interest packet whose name contains two functions 'information stitching' and 'bounding box' along with the part that represents a request for data pertaining to the area of interest. Some embodiments use a separator identifier (←) to distinguish names of different functions and data parts (e.g., as described in more detail below). Before forwarding this interest packet, the 'interest processing strategy' module of D creates an entry into its PIT table indicating that received data related to this interest will be passed to application layer via the 'App Face' interface. While forwarding the interest packet, the 'forwarding strategy' module of D consults with its FIB table to determine the availability of requested functions and data. Through function or service discovery (e.g., as described below), D already knows that an 'information stitching' function is available in its neighboring geo-area 2 (which again is represented with a single identifier 'geohash2') and records this information in FIB. Hence, the interest packet is forwarded to geo-area 2 via a geo-location based forwarding mechanism. The next forwarder within geo-area 2 is chosen using an intelligent distributed timer, that prioritizes vehicles with better computing capability and communication links towards a destination geo-area (e.g., as described in more detail below). In the given example, vehicle C is selected as the next forwarder as this is the only option available within geo-area 2.

Upon reception of the interest packet, the 'interest processing strategy' module of node C checks its 'Function Executable Table' to determine the availability of a function executable/unikernel for 'information stitching' and 'bounding box'. This example assumes that C has adequate computing ability to perform these functions. Hence, node C creates a series of PIT entries: (i) a first PIT entry with the original name to indicate that data/response with the original name should be forwarded to the incoming interface, i.e., geo-area 1 (ii) a second PIT entry with a modified name containing the name of the next function (bounding box) and data part to indicate that the output data of the bounding box function should be passed to the interface (Face$_{stitch}$) associated with the 'information stitching' executable (iii) a third PIT entry with the name containing the data part only to indicate that data relevant to area of interest (geo-area 3) should be passed to the interface (Face$_{bound}$) associated with the 'bounding box' function. Then the forwarding logic of vehicle C consults with its forwarding strategy module that takes the FIB information into consideration to determine the next geo-area(s) for forwarding the newly created interest packets. Through service/function discovery, vehicle C knows that there is a node (i.e., vehicle B) in the destination geo-area 3 who has the ability to apply a bounding box function and another node (i.e., vehicle A) who can provide only the data part without applying the bounding box function. Because vehicle C itself has the ability to apply the bounding box function, it can send an interest packet with the name containing 'bounding box' function and use an optional tag (not shown in the figure) next to it.

Because vehicle A does not have a capability to apply a bounding box function, it treats the interest packet from C as only a request for the data part, ignoring the optional function request. On the contrary, vehicle B processes the interest packet as the packet is. Vehicle A creates a PIT entry indicating that data should be forwarded towards geo-area 2. Then vehicle A passes the request to the interface associated to an application as vehicle A knows from FIB that requested data is available from its application layer. Vehicle B, on the other hand, creates two PIT entries (similar to C as described in the previous paragraph) indicating that data should be passed to a bounding box interface and the output of the bounding box function should be forwarded to geo-area 2. Similar to A, vehicle B knows through B's FIB table that data is available from an application layer. Though the interaction with a content cache is not shown in this example, note that each vehicle, upon reception of an interest packet, also looks into the vehicle's content store to determine if pre-computed function output or data relevant to the interest packet is available. If it is available in the cache, the vehicle does not need to go to the application layer to fetch the data. Thus, the pro-active caching module at vehicle A and B can help alleviate an extra level of interaction with the application layer.

The output data from vehicles A and B are forwarded to geo-area 2 based on an embodiment of a geo-location based forwarding method (e.g., as described in more detail below). Upon reception of raw data, vehicle C applies the bounding box function and then propagates the data to the 'information stitching' function. Note that each vehicle is allowed to keep a function in a wait state after its instantiation depending upon application requirements. This is particularly useful for an aggregation type of function (such as information stitching) which can collect information from multiple vehicles while the function is in a waiting state and apply the actual function logic after the specified waiting timer expires. Hence, the information stitching function at C waits to collect information from both vehicles A and B. Finally, the output of the stitching function is forwarded to geo-area 1 where the requesting vehicle D is present.

Naming Scheme Examples

Because every content is accessed by the name of the content in ICN/NDN rather than the address of the host machine (as in IP address), ICN/NDN becomes a natural fit for a networking layer solution for a dynamic vehicular network. NFN, as an extension to ICN/NDN, is also taken into consideration in the naming scheme to identify challenges to enable in-network computing over ICN/NDN based vehicular ad hoc networks.

When the information generated by vehicles is organized and named, the information can be disseminated efficiently in the ICN-based paradigm and shared among the vehicles. Some embodiments may advantageously provide a systematic naming protocol to reflect the requirements of a vehicular network as well as data processing functions. A hierarchical naming scheme may be utilized by some embodiments because it is highly expressive and can be easily aggregated under common prefixes to facilitate routing operations and limit the number of FIB entries.

There may be three types of information in vehicular networks generally: 1. Event related information, such as electronic brake warnings. Normally this information needs to be notified to other surrounding vehicles in time in order to achieve safe driving, such as the Basic Safety Message (BSM) message which is broadcast periodically. This type of information is generally short-lived; 2. Notification related information, such as accident notifications, warnings of road condition in certain segments (e.g., icy or oily patch of road), etc. Such information shared among vehicles can realize route optimization or adaptation of driving behavior. This type of information generally needs to be notified to other vehicles regularly, and has a medium life period; and 3. Entertainment related data (e.g., music, video segments) or drive assistant data (e.g., sensors' images, parking lots availability or traffic density in a certain area, HD map of certain area, etc.). This type of information is not of interest by everybody and thus does not need to be shared among all the vehicles.

Information of types 1 and 2 should be communicated to a certain group of vehicles in allotted time or periodically. No request, or fetch procedure is needed. These types of information are push-based. In contrast, information of type 3 is pull-based. Vehicles fetch such type of information from others only when the information is needed. A request/reply procedure is an efficient approach to exchange this type of information among the vehicles. Therefore, it is important to include the information type and the corresponding application info in the name.

Instead of requesting the composite or processed data (e.g., HD map, parking lot availability), some embodiments also provide vehicles opportunities to request the raw data and corresponding computing functions to process the raw data and generate the data wanted. In vehicular applications, the raw data often comes from various sensors (e.g., LiDAR, depth camera, inertial measurement unit etc.) with varying resolutions (e.g., full point clouds, bounding box etc.). The raw data could be used to generate greater range, around-corner view or through-objects view or predictive insights. There can be a chain of functions required for a particular application with different requirements. In one example, a consumer requests several large video clips to be firstly processed by a video combination function and then by a video compression function. In another example, a cooperative road view construction application may require applying a bounding box detection function and an aggregation of bounding boxes from multiple views. Those functions may be distributed to different vehicles or road side units. Therefore, besides the three types of information mentioned above, a type 4 information for vehicular network may be provided in some embodiments: 4. Raw data and function related info. This includes a) the raw data from the sensor/camera type X with resolution Y and other information; and b) the functions which could be used to process the raw data.

Information of type 4 is also pull-based. Vehicles fetch raw data from others only when the data is needed, and the requesting vehicles should also identify what kind of processing steps will be applied to the raw data and the corresponding order of functions. A "←" symbol may be used in naming semantics to separate different functions or data in the name of the functional chaining request. For example, an Interest with name/C←/B←/A requests raw data A to be processed by a function B firstly and then the processed data are sent to a function C for further processing. Therefore, it is also useful to include function names that will be applied to data and their requirements in terms of delay. In some embodiments, this symbol is used in the name as well but with reasonable extension to support more complicated use cases.

Besides requesting the raw data, the vehicles can also request the functions they need. For example, a vehicle requests a function: BoundingBox in order to process the raw data generated by its own sensors/cameras or get from other vehicles.

Moreover, whatever the vehicular applications' target, road safety or infotainment or raw data, the data is relevant to a given location (e.g., intersection, parking lot, a portion of a road), and/or to a given time interval (e.g., traffic jam warnings expire in a few hours; parking lot availability lasts a few minutes). Therefore, the naming should take the location and time interval into consideration. Also, in some applications, the generated data are intended for groups of recipients (e.g., ads for parking lots to approaching vehicles).

FIG. 9 shows an example table of information organization. The four types of information mentioned above give a highest classification to the information of vehicular network. Each type of information can be classified into different categories and sub-categories hierarchically. For example, driving assistant information can be further classified into parking info, traffic info, HD map info, etc. Some of the information given in FIG. 9 is included in the name as the common parameters, such as location and time interval, while other information, such as sensor type, sensor resolution, delay requirement, and etc., may also be appended in the name as specific parameters.

Generally, the content part of the naming scheme is below:

/Type/categoryLevel1_id/categoryLevel2-id/...
　　/CommonParameters/SpecificParameters (excluding function part)

Example 1: if a vehicle wants to know the parking information of area X within half hour from now on (assuming the time when the vehicle sending the Interest packet is 16:00), the name could be: /3A3/GeoArea(X)/20180816/16:00-16:30/

If a function is taken into consideration, the whole name structure may be represented as the following:

/Type/categoryLevel1_id/categoryLevel2-id/ ...
/CommonParameters/SpecificParameters (excluding function part) →
/Function1→/Function2, or
/Function2←/Function1←/Type/categoryLevel1_id/categoryLevel2-id/...
/CommonParameters/SpecificParameters (excluding function part)

In case the functions are interchangeable, in other words, the order of the functions is changeable, the whole name structure may be represented as the following:

/Type/categoryLevel1_id/categoryLevel2-id/...
　　/CommonParameters/SpecificParameters (excluding function part)
　　→/Function1+Function2

Example 2: a cooperative road view construction application may require applying a bounding box detection function to the raw data from depth cameras and then an aggregation of bounding boxes from multiple views for a predefined area X and date/time interval, the name could be:

/4A1/Geohash(area X)/20180816/16:00-17:00
/DepthCamera/DelayRequirement( )→/BoundingBox→/InfoStitch, or
/InfoStitch←/BoundingBox←/4A1/GeoArea(X)/20180816/16:00-17:00
/DepthCamera/DelayRequirement( )

If these two functions, bounding box and aggregation, could be exchangeable, the name could be:

/4A1/GeoArea(X)/20180816/16:00-17:00
/DepthCamera/DelayRequirement( )→/BoundingBox + InfoStitch, or
/InfoStitch + BoundingBox←/4A1/GeoArea(X)/20180816/16:00-17:00
/DepthCamera/DelayRequirement( )

Example 3: a vehicle asks for a function, e.g., bounding box, to be installed to process the data generated by the sensors. The name could be:

/4B/BoundingBox/Version_xx/

If a vehicle asks for more than one function, e.g., a bounding box with version 1 and an aggregation with version 3, the name could be:

/4B/BoundingBox+InfoStitch/Version_2+Version_3/

Service/Function Discovery and Execution Examples

A vehicular node can apply a function over data only if the node has the function executable available in its 'Function Executable Store' and possesses enough compute resources to execute the function. If local execution of the function is not possible, the vehicle decides to forward a request to a neighboring vehicle with adequate compute resources. In order to facilitate this decision, a mechanism is beneficial to discover availability of function executables and compute resources in the neighborhood. The existing function discovery method in NFN relies on a routing advertisement-based technique, which is not suitable for a dynamic vehicular wireless network due to its large overhead. It is also important to ensure that function executables are downloaded from a trusted authority other than from any vehicle in the network.

Some embodiments may allow a vehicle to download a function executable only if the vehicle has enough compute resources to execute the function and the executable is coming from a trusted source like a RSU. It is assumed that each vehicle has a pre-installed list of RSU locations and each RSU has enough storage to maintain function executables. With these assumptions, an embodiment of a function downloading process works following A, B, and C as described in the immediately following paragraphs.

A) If the name of an interest packet contains a function name (which is identifiable via the separator token '→'), the service/function discovery module of every RSU and vehicle records how many times that function has been requested. This record allows RSUs and vehicles to calculate a popularity score of a function.

Figure 10:
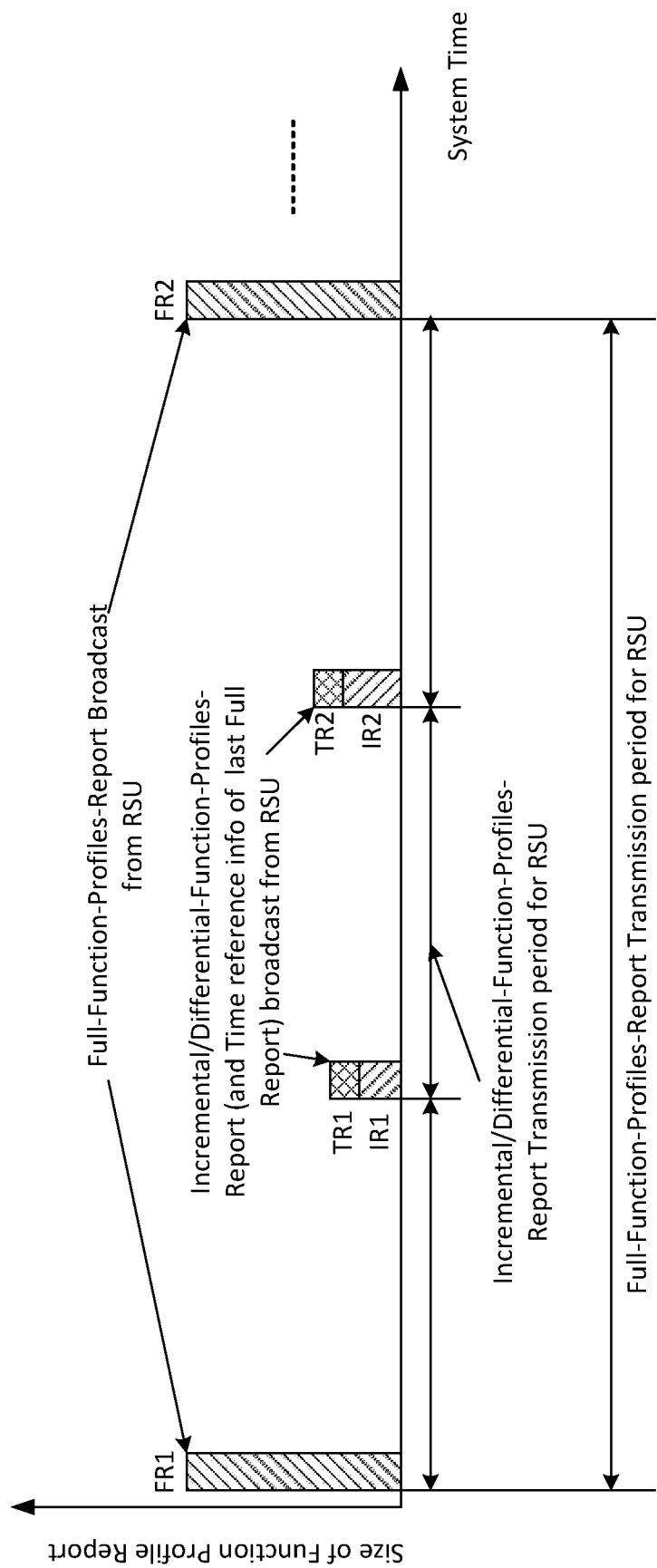
FIG. 10 is an illustrative diagram of an example of a timeline of broadcast organization for sharing function profiles within a neighborhood according to an embodiment.

B) The RSU periodically shares available function profiles via push-based ICN but with hop-limited (for example, maximum allowable hops=2) forwarding. The profile of a function contains a number of fields: size of function executables, type of executable (unikernel or Java-based service), popularity of the function perceived by RSU, type of function (aggregation- or standalone-type), required computing/storage resources, and minimum delay requirement. 'Popularity of the function perceived by RSU' may have further granularity with different Popularity scores for various Geo-area. Because the aggregated profile size may grow significantly along with increasing number of available functions, some embodiments allows two options: (i) pushing only popular function profiles and (ii) pushing function profiles incrementally. FIG. 10 shows an example of how a RSU shares and updates function profile information to vehicles, where FR=Full Report, IR=Incremental Report, and TR=Time Reference for Incremental Report where time info indicates the time of last full report. FIG. 10 also shows an example of incremental pushing of function profiles from the RSU. In order to reduce transmission overhead further, the periodicity of pushing is also adaptively controlled according to the frequency of addition of new functions at the RSU.

Figure 11:
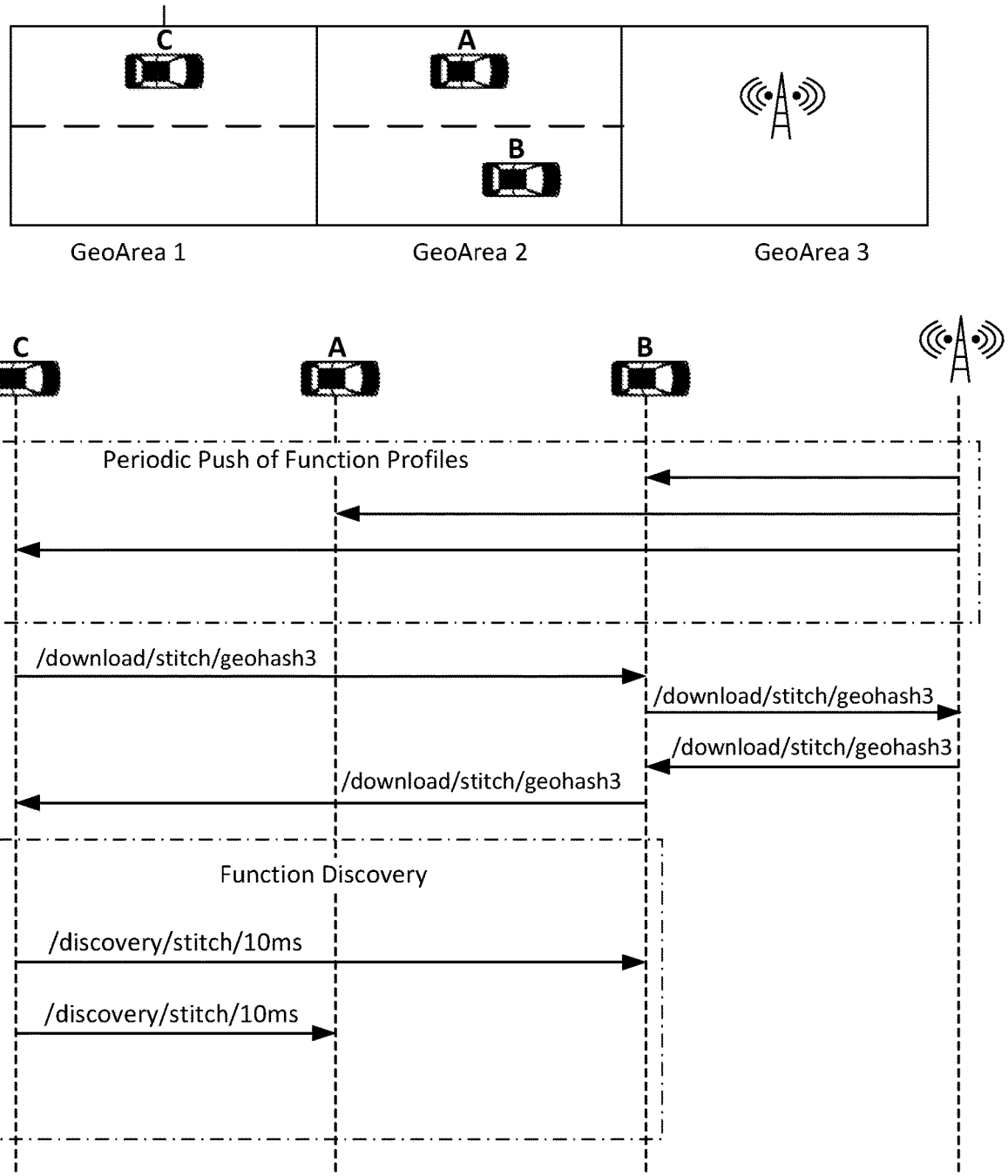
FIG. 11 is an illustrative diagram of another example of a road topology and a sequence diagram of a message flow of an example function discovery process according to an embodiment.

C) Upon reception of function profiles from the RSU, a vehicle determines the list of functions that are more popular and can be executed on the vehicle's available computing resources. If 'Popularity of the function perceived by RSU' with different Popularity scores for various Geo-area is available, a vehicle in a Geo-Area selects the most popular functions (which can be executed on its available computing resources) in that Geo-Area. Then, for each of the selected functions, the vehicle creates an interest packet with a name containing a known prefix '/download' (to separate from regular interest packets), name of function to be downloaded, and a geo-area identifier indicating the location of RSU that has executable. These interest packets are forwarded using the geo-location based forwarding method discussed below. Upon reception of interest packets, the RSU transmits a function executable as a signed data packet. FIG. 11 shows the aforementioned message flow for downloading function 'information stitching' for an example road topology. The vehicles verify the signature of the function executable and store it into its 'Function Executable Store'.

Once a vehicle downloads function executable(s), neighboring vehicles may learn the availability of functions in order to make compute-communication-aware forwarding decisions. Some embodiments may use one of the following options to discover the availability of functions in a neighborhood: i) Pro-active periodic announcement of available function names with estimated completion time (as shown in FIG. 11): This option requires creation of a new interest packet with the name containing a known prefix '/discovery'. The name of functions and estimated time to complete a function can be added either to the name itself or the data part of the interest packet. This is a special kind of interest packet which is allowed to propagate up to a single hop only. Similar to the process of pushing function profiles (as discussed above), the periodicity of functions availability announcement can be made adaptive based on the popularity score of functions. Upon reception of this kind of interest packet, a vehicle creates an entry into the FIB table with a prefix set to function name and cost set to estimated completion time for that function; and ii) Reactive function discovery: Initially a vehicle does not have any information about the availability of functions in the neighborhood with this option. Hence, an interest packet containing a function name is flooded until it reaches a vehicle that has the desired function executable available. When the requesting vehicle receives processed data, the vehicle records the function name, geo-area of the vehicle with that function, and time taken to complete the request into FIB. For subsequent interest packets, the forwarding strategy module uses the information from FIB to forward packets farther.

Figure 12:
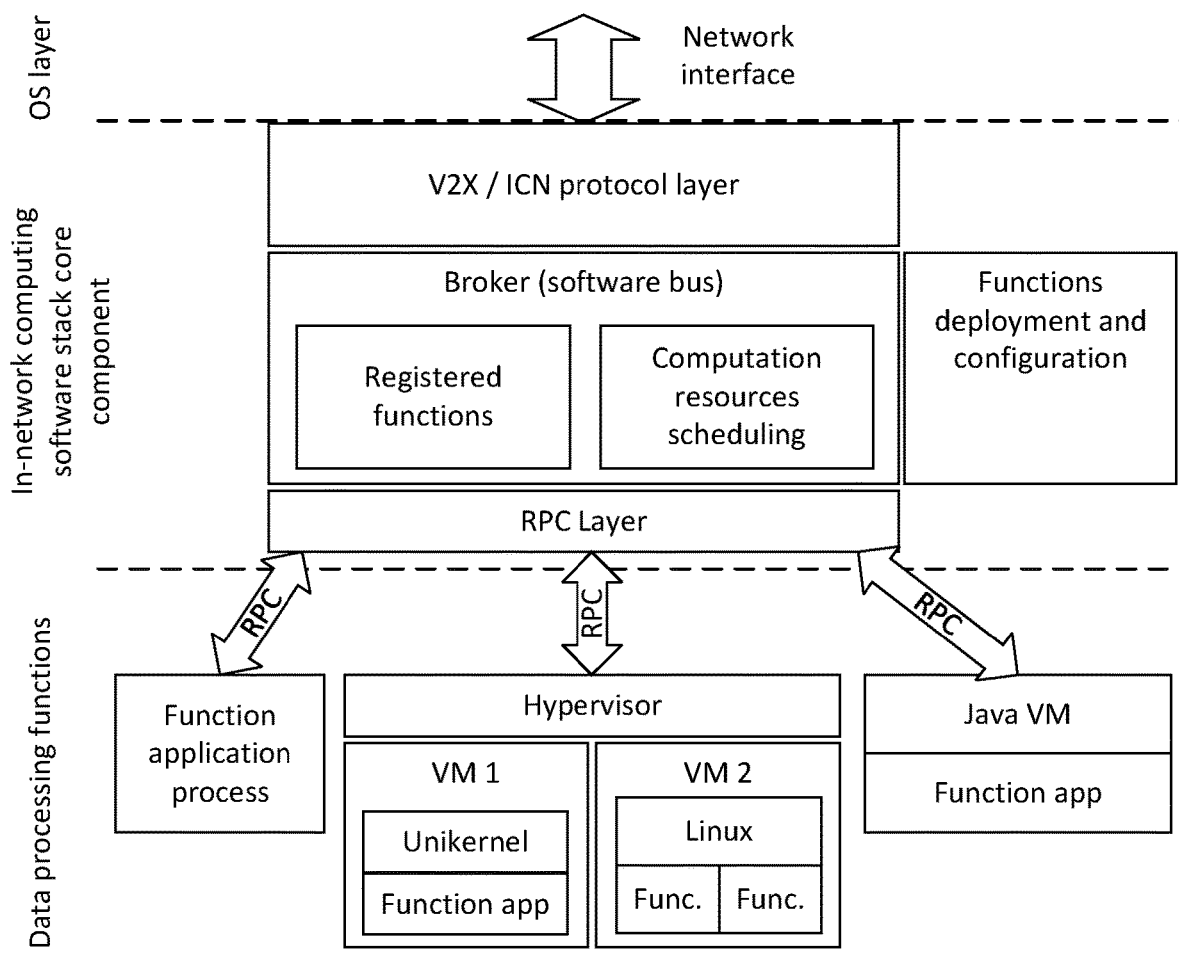
FIG. 12 is a block diagram of an example of a software stack architecture for in-network computing according to an embodiment.

FIG. 12 shows an embodiment of an in-network computing software stack architecture. Some embodiments of the software stack for in-network computing use a broker architectural style for coordination and communication between registered function processes and remote clients as shown in FIG. 12.

Once the ICN protocol layer receives a remote request, the ICN protocol layer either responds immediately or forwards the request to an upper layer called broker or software bus. The broker is responsible for coordinating communication to a requested function process. In addition, the broker also keeps track of currently running and installed functions as well as performs balancing of the system load when possible. The broker communicates with functions using a Remote Procedure Call (RPC) style protocol. This approach helps to achieve a higher level of flexibility in supported function environments. For example, a function could be a digitally signed binary supplied by a car vendor or other trusted authority or at the same time certain functions can be executed in a controlled environment such as virtual machines, containers or JAVA runtime-environment. Such loose integration between functions and the broker allows scaling of the solution to several computation units installed on a vehicle or a mobile edge. In this case functions can be distributed between different computation units depending on computation power, connected sensors or peripherals.

Geo-Area Based Forwarding Examples

Some embodiments may provide technology for content delivery of application data where application data are Geo-Dependent. Examples of such data can be traffic updates at an intersection, parking availability at a parking location, cooperative environment perception at a local area. A node/consumer interested in a content (identified by attributes including Geo-Location association of content) can send an interest packet (specifying content attributes) to the network which can be forwarded towards the content's associated geo-location. The path an interest packet traverses may be referred to as an interest packet forwarding path. Any node (original content producer(s), or nodes which have the content in their caches) can respond back to the consumer with the content. The path content traverses may be referred to as a content forwarding reverse path.

Challenges to enable efficient data forwarding over vehicular ad hoc network may include: 1) How to effectively forward the interest packet from a content consumer to reach nodes with requested content (i.e., original content producer(s), or nodes which have the content in their caches) is challenging as it may result in interest packet flooding. Wireless radio resources are scarce in decentralized vehicular networks and there is no central coordinating entity to avoid contention during radio resource access. Interest packet forwarding with minimal flooding without deteriorating air-interface communication performances is vital to enable content-name based content delivery in such a network; 2) In the named data network (NDN) or the information centric network (ICN), once the interest packet reaches a node (with content), the content is forwarded towards consumers through the same node-to-node paths in reverse directions as the node-to-node path for the interest packet. Considering a highly dynamic network topology scenario in a decentralized vehicular network (due to mobility, dynamic wireless environment perceived by moving nodes, right turn, left turn, U-turn, highway exit, traffic light, and so on), assuming same node-to-node path for content forwarding as that for interest packet may not be efficient. Mechanisms to determine efficient content forwarding path as well as interest packet forwarding path are necessary which are well customized to decentralized vehicular network; and 3) In some cases (such as updated map/traffic of/at an intersection, parking availability at a parking location, cooperative environment perception at a local area) different versions of contents may exist at different producers. In-network computation (INC) by a content forwarder may be useful to generate a better content (from two or more versions of the received content from different producers) before forwarding to next hop. The content forwarding logic should be developed considering INC as an integrated factor.

In the following paragraphs, an embodiment is illustrated with a use case where a consumer is interested in getting a traffic/map update at a traffic intersection. However, the use case is for illustrative purpose only. Some embodiments may be applicable to content delivery use cases where content has a location dependency (such as parking updates at a parking location, traffic/map updates at a specific street/intersection, collaborative environment perception at a local area, and so on).

Geo-Area Assumption: In some embodiments, the existing Geo grid map systems (such as Military Grid Reference System (MGRS), Geo-Hash, etc.) may be utilized where the world can be divided into approximately square/rectangular Geo-areas of various granularities and each Geo-area can be represented by a string of digits and letters. A vehicle equipped with GPS sensors can determine its location and calculate its Geo-Area. Because involved vehicles or RSUs in some embodiments are within a local area (for example a 1 km by 1 km or 10 km by 10 km area) in most of the cases, only a few least significant bytes/characters of Geo-Area string can be good enough to identify smaller granularity/size Geo-Areas within the local area. That is, only a few least significant bytes/characters of Geo-Area string need to be transmitted over the air-interface to minimize overhead.

In some embodiments, forwarding of the Interest packet and content may advantageously be based on Geo-Location and other parameters, and the routes of Interest packet and content forwarding can be different. Note that in conventional ICN/NDN the Content forwarding reverse path (node-to-node) is exactly the same as interest packet forwarding path. Advantageously, some embodiments may determine these paths separately. In some embodiments, the Content forwarding reverse path (node-to-node) may be different than the interest packet forwarding path. For example, the interest/content packet forwarding may be coordinated via a geo-grid based distributed and deterministic timer calculation.

Some embodiments for Interest Packet Forwarding and content delivery are now discussed. In reference to FIGS. 13-19, the term Source or Source Vehicle (in the context of routing) is used to represent a content consumer, e.g., a vehicle interested in getting content. Similarly, the term Destination or Destination Vehicle (in context of routing) is used to represent a content producer or vehicle with the content in its Cache, i.e., vehicle sending back content to the source/consumer. Interest packet forwarding includes two steps: 1) to select next hop Geo-Area for 'Interest Packet forwarding Geo-Area-to-Geo-Area path'; and 2) to select one or more node in the Geo-Area to forward the interest packet to next Geo-Area (labeled on the Figures at 'G-A'). The Consumer includes the Geo-location association of the content (e.g., Geo-Area-5-3 in FIG. 13) as well as consumer's own Geo-location (e.g., Geo-Area-2-3 in FIG. 13) in the interest packet.

Figure 13:
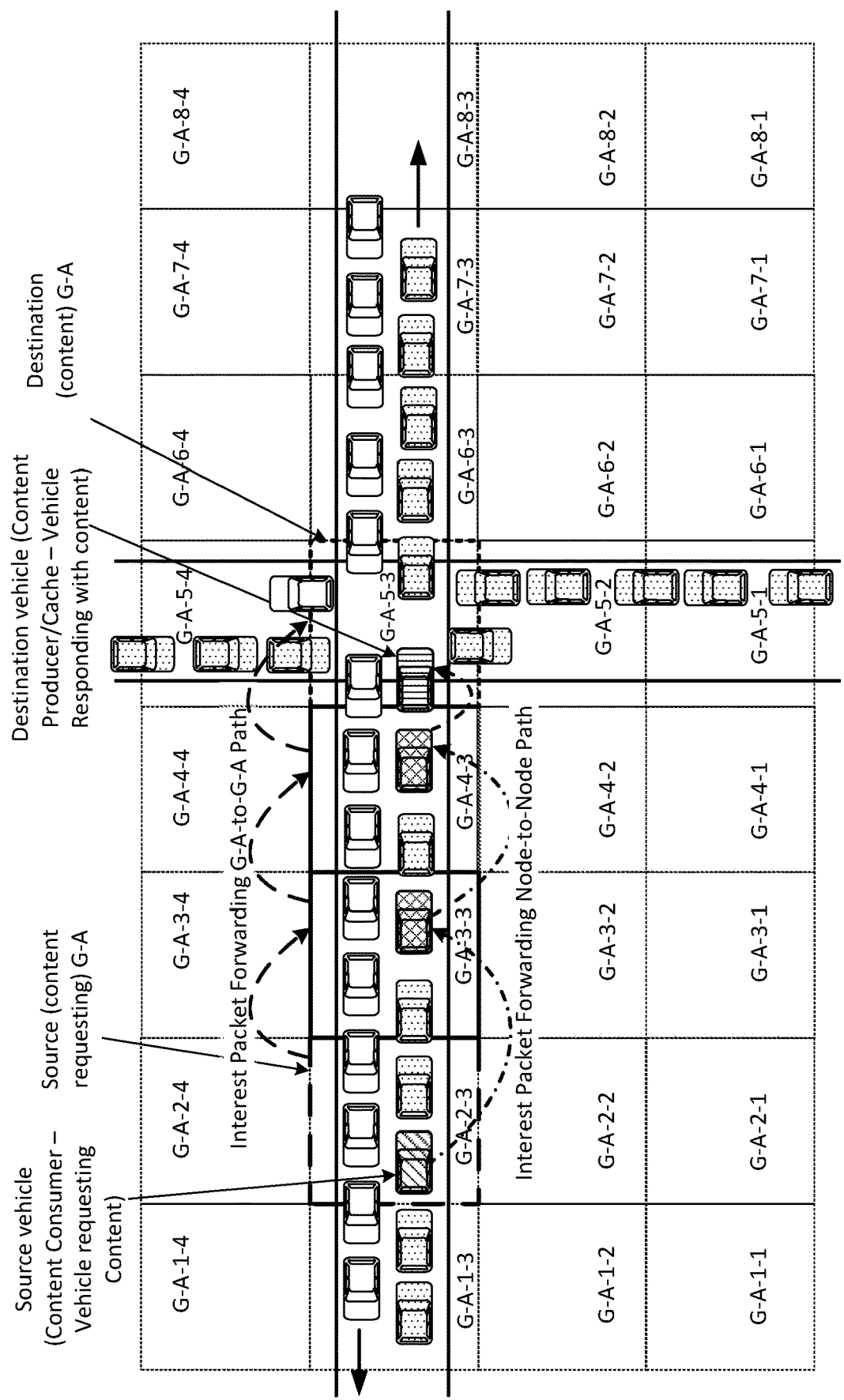
FIGS. 13 to 19 are illustrative diagrams of respective examples of road topologies, Geo-Area (G-A) grids, Geo-Area-aware timer management and message flow according to embodiments.

FIG. 13 shows an example of a Geo-Area based Interest packet forwarding mechanism for a content-centric decentralized vehicular network. The Interest packet carries content name indicating content's Geo-Area. Based on the Geo-location association of the content, forwarding strategy module at consumer node determines next-hop Geo-Area (e.g., Geo-Area-3-3 in FIG. 13). Name based routing protocol maintains a Geo-Area Forwarding Information Base (GFIB) which may already have entry for Next Geo-Area associated with the Content's Geo-Area specified in the interest packet. For example, next hop Geo-Area for various potential Content's Geo-areas can be calculated in advance frequently and corresponding entries can be maintained in the GFIB. If the entry exists, forwarding strategy module consults GFIB and get the next hop Geo-Area to forward Interest packet. Otherwise, next hop Geo-Area is determined by forwarding strategy module for the Content's Geo-Area specified in the interest packet and an entry is added in the GFIB.

It is assumed that each node is equipped with GPS sensor and is able to calculate its associated Geo-Area. It is also assumed that granularity of Geo-Area (100 m by 100 m, 200 m by 200 m or 1 km by 1 km) to be used in forwarding has already been agreed among vehicles either through some periodic hello message exchanges or is pre-configured. The Geo Area granularity can also be selected by the consumer and indicated in an Interest packet. For example, in vehicular network there is periodic message (BSM/DENM/CAM—carrying location, id, etc.) transmission among vehicles, which enables consumer to get neighbor list and to determine approximate 1-hop reachability/coverage. Geo-Area granularity should be based on 1-hop reachability. For example, if neighbor reachability in one direction is X, Geo-Area should be Y by Y, where $Y<=X$. The Selected Next hop Geo-Area (e.g., Geo-Area-3-3 in FIG. 13) is indicated in the Interest packet. It can be added as an additional temporary field valid for next hop transmission only. Receivers in next hop Geo-Area will remove it and add new next-hop Geo-Area e.g., (Geo-Area-4-3 in FIG. 13) before forwarding further.

Figure 14:
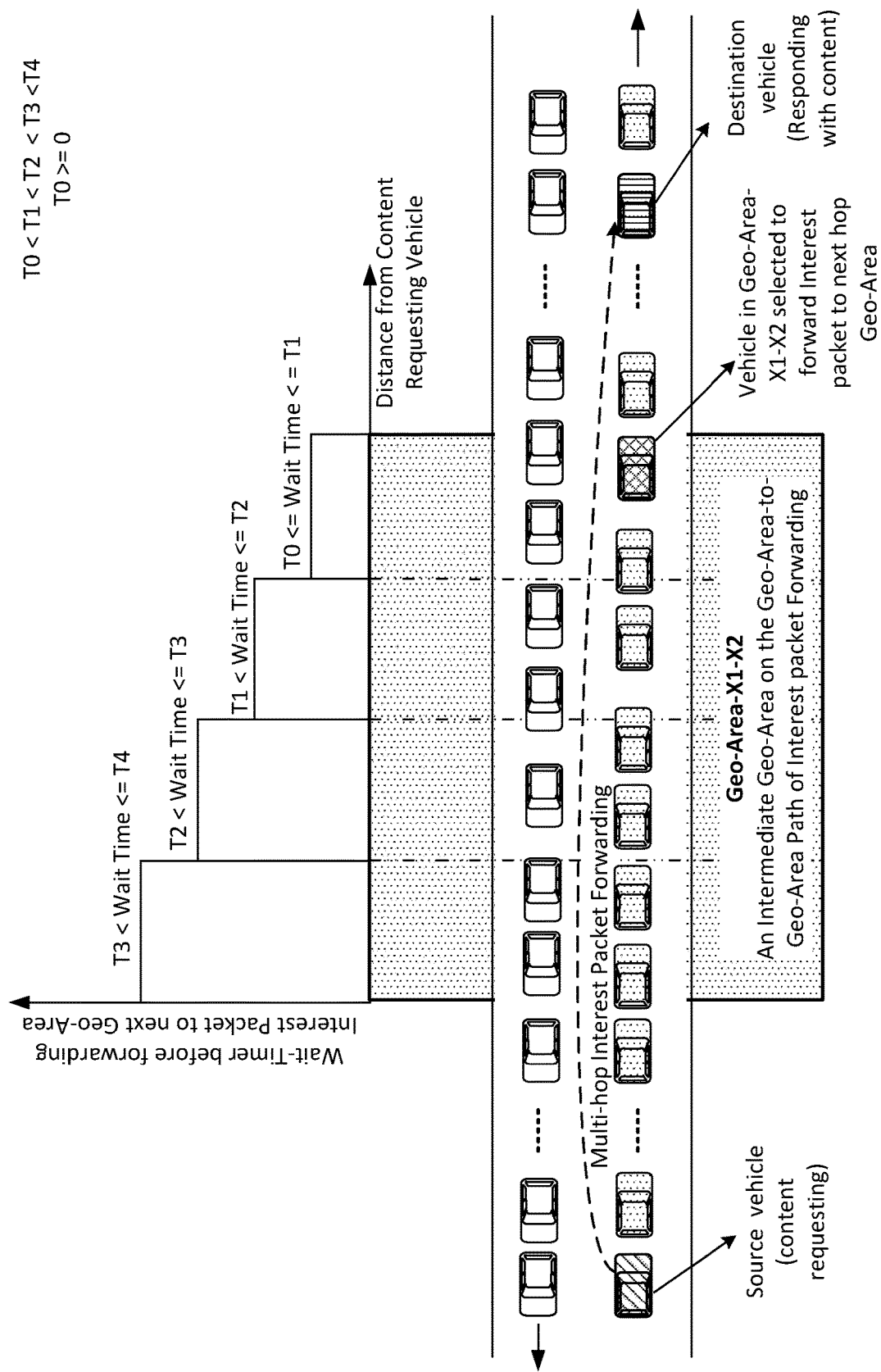

Nodes in next Hop (e.g., Geo-Area-3-3 in FIG. 13) after receiving the Interest packet, add an entry in pending interest table (PIT). Forwarding logic at each node then starts an IPF-Wait-Timer (interest packet forwarding wait timer) whose value is determined based on its location within the Geo-Area and location of consumer as shown in FIG. 14. FIG. 14 shows an example of a Wait Timer based mechanism to select candidate vehicle in a Geo-Area for Interest packet forwarding to next hop Geo-Area. In this example, vehicles farther from content requesting vehicle get higher chance to forward Interest packet to next hop Geo-Area. For example, each Geo-Area is divided into N (=4 in FIG. 14) regions and the vehicles in the region farthest from consumer has shortest IPF-Wait-Timer (e.g. a randomly selected value between T0 and T1).

The vehicle, which has received interest packet and whose IPF-Wait-Timer expires first, will forward the interest packet to next Geo-Area. For example, if a vehicle in farthest region has successfully received interest packet and its Wait-Timer expires first, it will forward the interest packet to next Geo-Area. Once interest packet (with updated next-hop Geo-Area) is forwarded to next Geo-Area, all other nodes in the current Geo-Area will stop their IPF-Wait-Timer and skip forwarding of interest packet. These nodes keep PIT entry. In some specific use cases, more than one node (say from two regions of the Geo-area) may be allowed to transmit interest packets for redundancy purpose to achieve more success in finding content.

Figure 15:
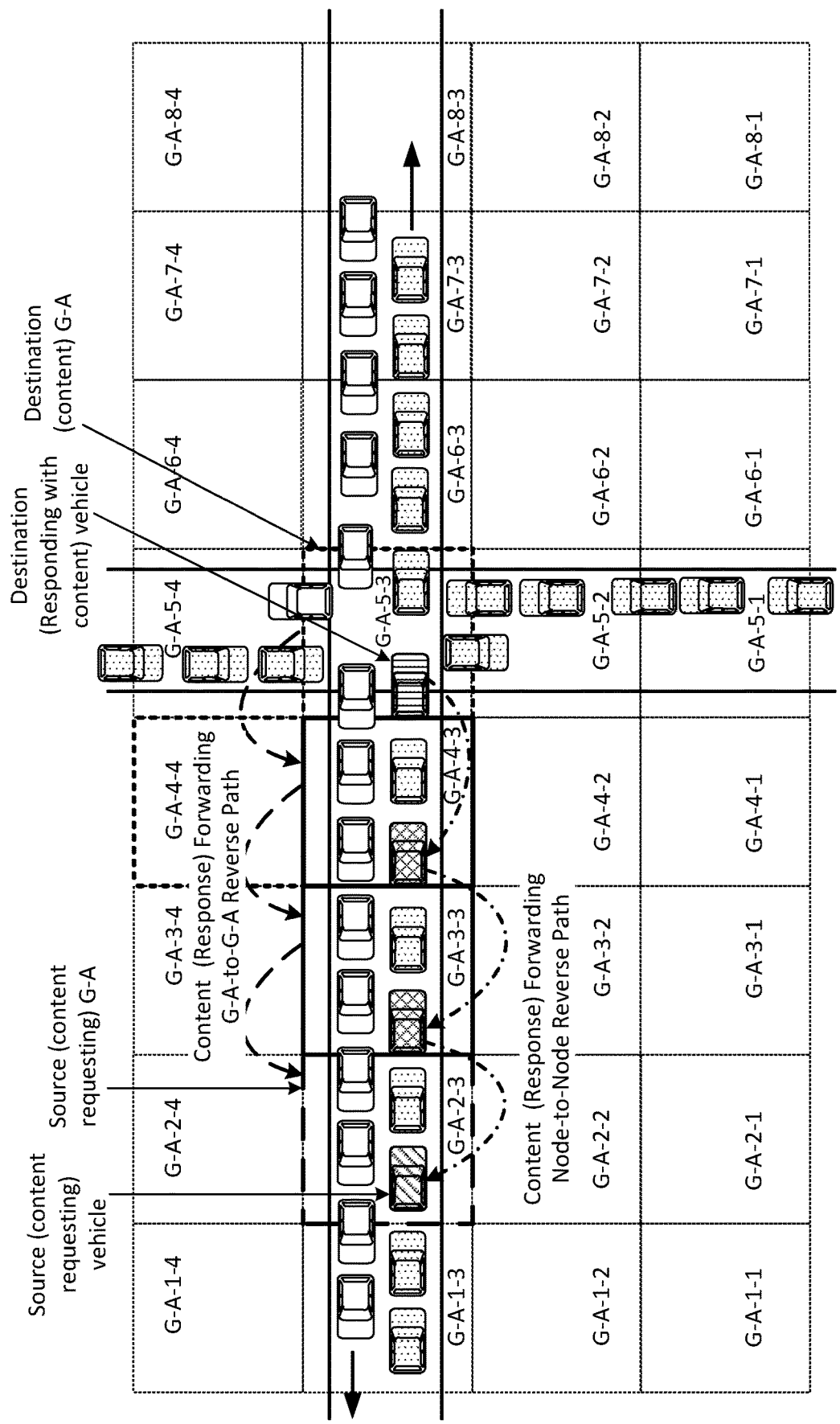
Figure 16:
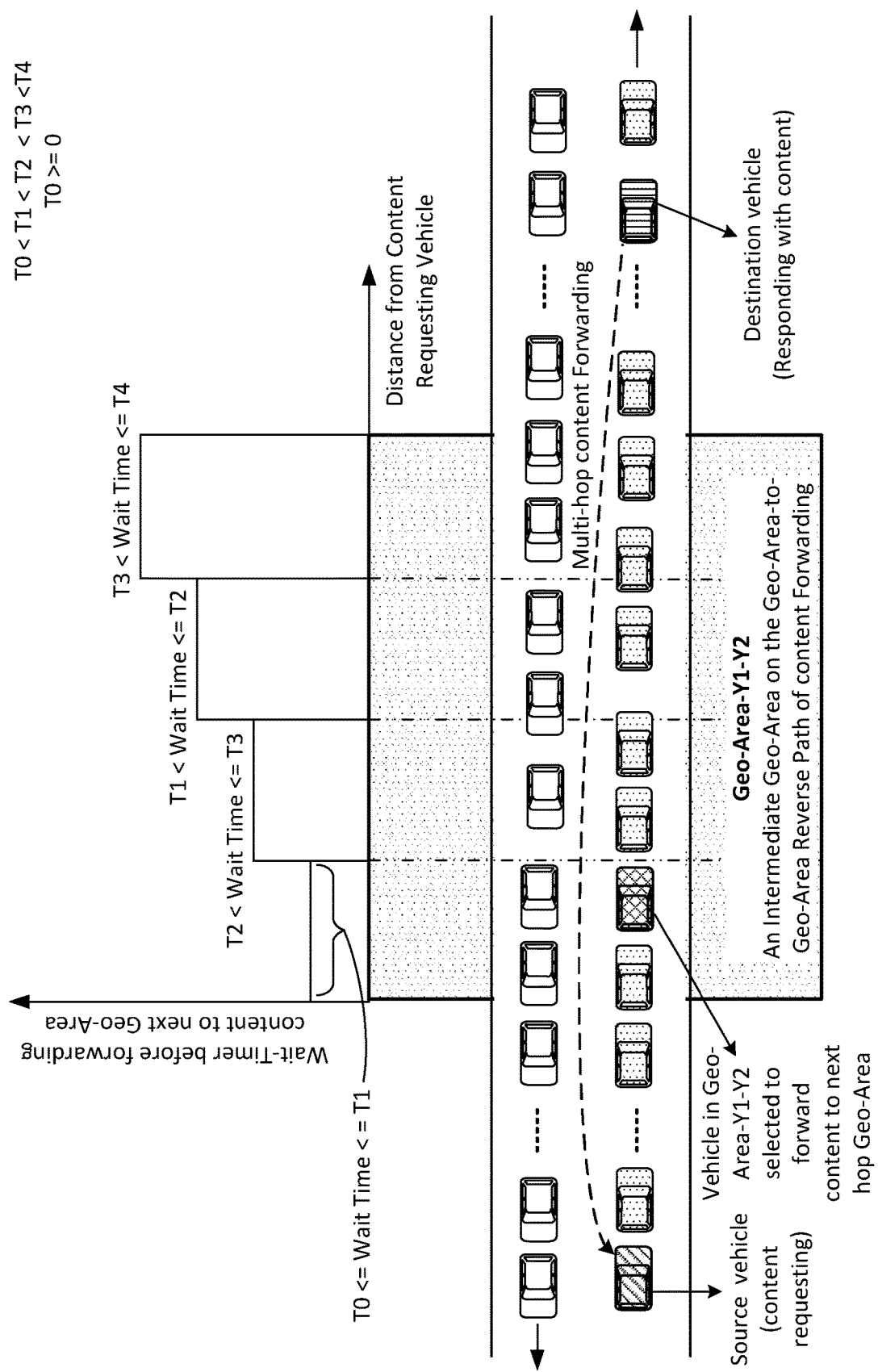

Forwarding to next Geo-Area continues until packet interest reaches a Geo-Area (Geo-Area-5-3 in FIGS. 14 and 15) where at least one node has matched data/content. The nodes with matched data/content start CF-Wait-Timer (content forwarding wait timer). The value of the CF-Wait-Timer is different in different regions of the Geo-Area (region nearer to consumer may have shorter wait time) as shown in FIG. 16. FIG. 15 shows an example of a Geo-Area based content forwarding mechanism in a content-centric decentralized vehicular network. Content (Response) Forwarding Geo-Area-to-Geo-Area Reverse Path can be same as Interest Packet Forwarding Geo-Area-to-Geo-Area Path. However, vehicle (node) in each Geo-Area for content forwarding may be different than that for packet forwarding. FIG. 16 shows an example of a Wait Timer based mechanism to select candidate vehicle in a Geo-Area for content forwarding to next hop Geo-Area. In this example, vehicles nearer to content requesting vehicle get higher chance to forward content to next hop Geo-Area.

In some cases, a specific node such as an RSU may have better and reliable content than other nodes. For example, for a content like traffic/map update at an intersection, RSU may aggregate views from various cameras and/or multiple vehicles to get a better content. Some embodiments provide higher priority to such a node to send the content to the consumer by defining shortest wait time (CF-Wait-Time <T0) irrespective of their region inside the Geo-Area. The vehicle, which has received interest packet, has matched content and whose CF-Wait-Timer expires first, will forward the content to next Geo-Area (Geo-Area-4-3 in FIG. 15) towards consumer. Once matched data/content is forwarded to next Geo-Area towards consumer: all other nodes in the current Geo-Area will stop their CF-Wait-Timer (if running) and skip forwarding of content. In some specific use cases, more than one node (say 2 nodes from two regions of the Geo-area) may be allowed to transmit content for redundancy purpose to achieve more success in delivering content. In the Geo-Area where matched content exists, nodes (not having matched data) know no further forwarding of interest packet is needed based on Geo-Area of content in the interest data. These nodes may not add an entry in pending interest table (PIT). Once a content forwarding is heard, these nodes remove associated PIT entry (if any).

Some embodiments may have the same Geo-Area-to-Geo-Area return path for content forwarding as that for the interest packet forwarding. However, the node in Geo-Area forwarding the content may be different than the node forwarding interest packet as can be seen in FIG. 13 and FIG. 15. Now nodes in the Geo-Area-4-3 in FIG. 15 after receiving content, start an CF-Wait-Timer whose value is determined based on its location within the Geo-Area and location of consumer as shown in FIG. 16. The vehicle, which has received content and whose CF-Wait-Timer expires first, will forward the content to next Geo-Area. Once matched data/content is forwarded to next Geo-Area (Geo-Area-4-3 in FIG. 16) towards consumer: all other nodes in the current Geo-Area will stop their CF-Wait-Timer, skip forwarding of content and remove associated PIT entry(ies). Nodes may store the content in content store for a while for potential future use. In some specific use cases, more than one node (say 2 nodes from two regions of the Geo-area) may be allowed to transmit content for redundancy purpose to achieve more success in delivering content. Next hop Geo-Area content forwarding is continued unless the content is reached to consumer's Geo-Area (i.e., to consumer).

Figure 17:
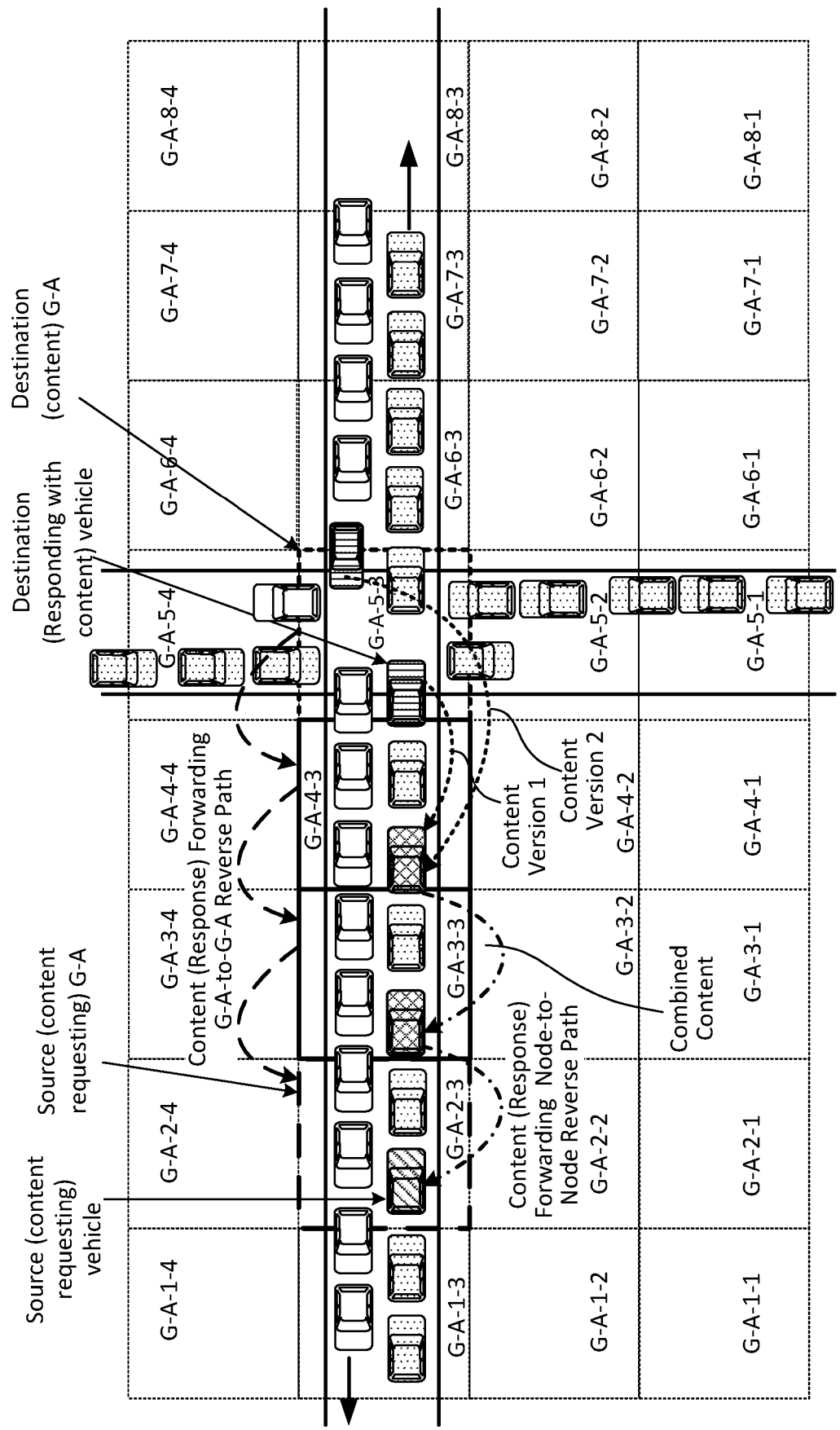

FIG. 17 shows an example of a Geo-Area based content forwarding mechanism in a content-centric decentralized vehicular network. The Content (Response) Forwarding Geo-Area-to-Geo-Area Reverse Path can be same as the Interest Packet Forwarding Geo-Area-to-Geo-Area Path. However, the vehicle (node) in each Geo-Area for content forwarding may be different than that for packet forwarding. Two vehicles in destination Geo-Area sends different versions of the requested content, which are processed by the vehicle in the next hop Geo-Area to get combined content before forwarding.

Redundant Content Use Cases to Enhance Content Delivery Success Rate Examples

Figure 18:
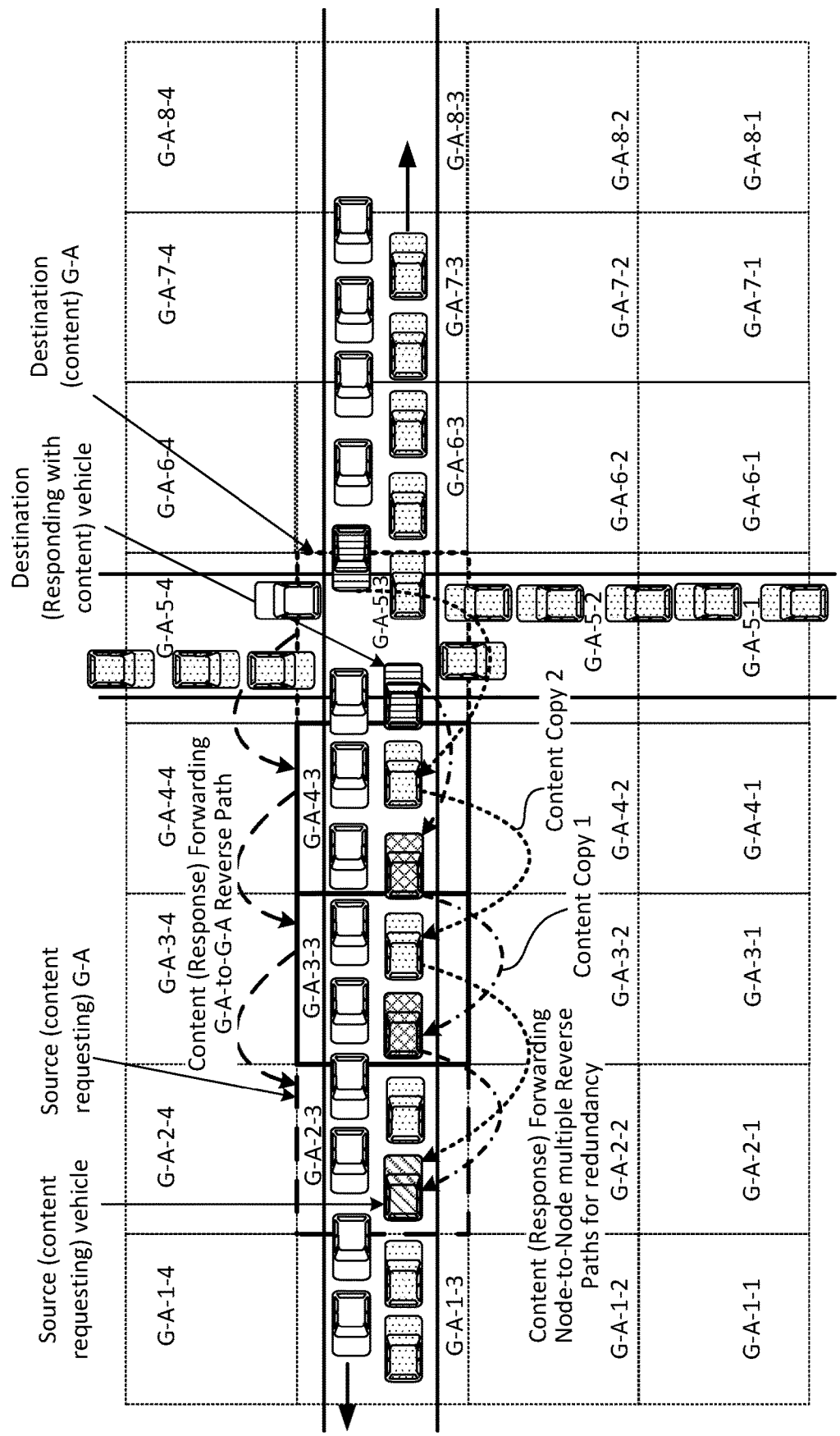

FIG. 18 shows an example of a Geo-Area based content forwarding mechanism in a content-centric decentralized vehicular network. The Content (Response) Forwarding Geo-Area-to-Geo-Area Reverse Path can be same as the Interest Packet Forwarding Geo-Area-to-Geo-Area Path. However, the vehicle (node) in each Geo-Area for content forwarding may be different than that for packet forwarding. Two copies of content from two content-sources are sent to the requesting vehicle through different paths.

Figure 19:
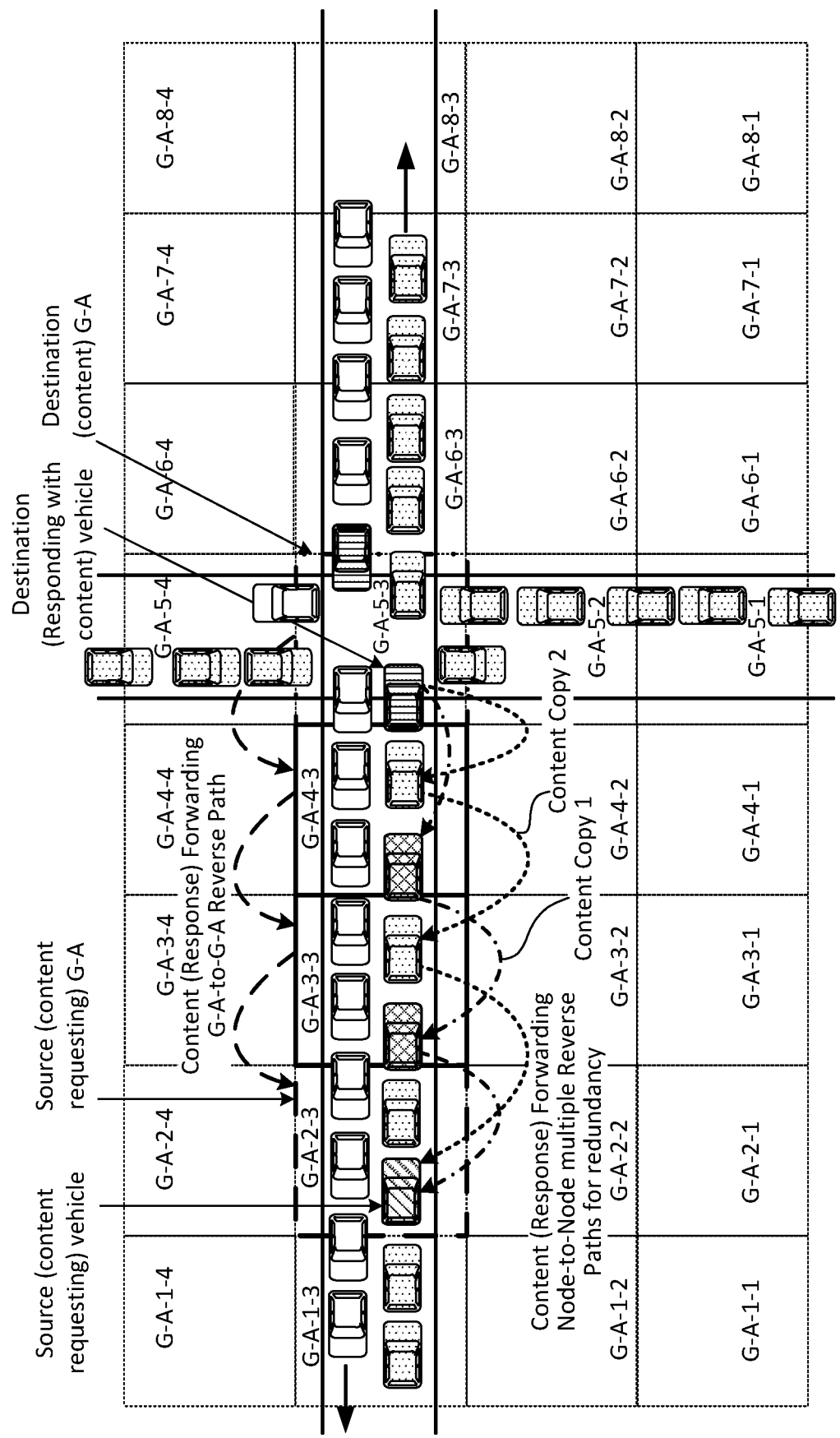

FIG. 19 shows an example of a Geo-Area based content forwarding mechanism in a content-centric decentralized vehicular network. The Content (Response) Forwarding Geo-Area-to-Geo-Area Reverse Path can be same as the Interest Packet Forwarding Geo-Area-to-Geo-Area Path. However, the vehicle (node) in each Geo-Area for content forwarding may be different than that for packet forwarding. Two copies of content are sent to the requesting vehicle through different paths.

Cluster-Based Network Examples

Some embodiments may advantageously provide End-to-End technology to enable an information centric network architecture in a highly dynamic cluster-based vehicular ad-hoc network. Recently there has been a consideration of Internet architecture change to cope with increasing data demands and new applications 13 attracting to shift the network architecture from host-centric to Information-centric networking. The information centric networking model is also a promising paradigm for future vehicular networks as the vehicular network consists of smart and connected nodes (with increased sensing, computing and communication capabilities). This will open up opportunities for augmented information services where vehicles become source, processor, and consumer of information at the same time. Some embodiments may provide technology for a multi-hop ad-hoc vehicular network where nodes form a 1-hop cluster with a cluster head for coordination among nodes in a cluster. The cluster head may also have inter-cluster coordination.

One inherent feature of information centric networking (ICN) is in-network caching of data/information. Efficient in-networking caching can play an important role in improving system performance in ICN by avoiding wastage of network bandwidth due to the repeated delivery of popular content and by reducing response time for content delivery by placing the content closer to consumers. However, efficient in-network caching is highly beneficial to achieve a reasonable tradeoff between Cache hit ratio and caching redundancy as caching uses node's storage resources as well as network's radio resources for data transfer from producer to caching node. For example, Named data networking (NDN) may be a suitable architecture for ICN. Some embodiments may focus on NDN as the ICN architecture, just as an illustrative example. Ubiquitous caching in NDN enables data availability in the proximities of consumers reducing the data delivery latency as well as network traffic. In-network caching in cluster-based vehicular ad-hoc network may be improved in some embodiments by exploiting roles of cluster heads as intra-cluster coordinators as well as inter-cluster coordinators.

Another beneficial aspect of some embodiments is to provide technology to enhance user experience in a vehicular network through joint performance optimization of communication and computation in the network to exploit the available compute capabilities of nodes as well. For example, an autonomous car continuously captures its surrounding environment via on-board sensors (e.g., cameras) which can be a source of information, particularly for cars who are willing to know about the situation of road before them. A consumer can ask multiple sources to send road view in this case to perceive better quality of road environment. Transmissions of raw data from individual vehicles and processing them at an end-host (edge/cloud), however, may incur significant communication overhead on the network. This will adversely affect duration or rate of successful data transfer, especially in highly congested road, making application requirements impossible to meet. In-network computing (INC) over vehicular ad hoc network allows processing functions (such as aggregation or compression) to be applied over data while they are being forwarded, instead of waiting for them to be applied at the end host. In case of aforementioned example, a vehicle can stitch its own captured view with that from its previous vehicle and eliminate redundancy before forwarding to the next hop. Thus, processing at intermediate nodes may reduce data amount to be forwarded in the subsequent hops—helping to reduce overall traffic in a multi-hop vehicular wireless network. Named Function Networking (NFN) concept helps enabling efficient INC (in-network computing) in the vehicular network. NFN (Named Function Networking) is an extension to ICN that enables naming 'functions' in addition to naming 'data' and fetching/executing function executables inside a network. A vehicular node can apply a function over data if it has the function executable available in its 'Function Executable Store' and possess enough compute resources to execute the function. If local execution of the function is not possible or practical, the vehicle needs to forward request to a neighboring vehicle. Therefore, an efficient in-network caching of 'Function Executable' along with in-network caching of data is beneficial to get full advantage of an opportunistic communication and compute-communication trade-off. In some embodiments, a cluster head's presence may advantageously be exploited to optimize in-network caching of 'Function Executable' along with in-network caching of data in the cluster-based vehicular ad-hoc network Another beneficial aspect of some embodiments is to provide a cluster head assisted discovery mechanism with low signaling overhead to discover availability of function executables, data cache and compute resources in the neighborhood. For example, a forwarding algorithm to find a content or function executable is heavily dependent on such discovery mechanism.

Another beneficial aspect of some embodiments is to provide technology to handle producer and/or consumer mobility in a highly mobile environment of vehicular network. For example, when a producer moves out of a cluster, some embodiments may determine how the cluster head should transfer the data (and function executable in some cases) at the producer to other members of the cluster to minimize the impact of the producer's movement. Alternatively, or additionally, some embodiments may determine how to inform the neighborhood about the producer's mobility as soon as possible with reasonable message exchange overhead. The problem with producer mobility in a NDN is that during the convergence/update time, the network is not updated with the new location or cluster-association of the producer. An interest packet is directed to the old location (or cluster-association) with a chance to fail unless it finds a new cache on the previously established path between consumer and producer. Embodiments of cluster head assisted mobility handling may be beneficial to optimize In-network cache placement/replacement, In-network placement/replacement of INC related 'Function Executables', and discovery of availability of function executables, data cache and compute resources in the neighborhood.

Some embodiments may advantageously provide an end-to-end solution framework to enable content delivery and in-network computing service based on content and service names in a highly dynamic cluster-based ad-hoc vehicular network—by developing cluster head assisted efficient mechanisms for named data networking and named function networking. In particular, some embodiments may include technology to provide: (i) Cluster head assisted in-networking caching of 'data' and 'Function Executables', (ii) Cluster heads coordinated Discovery mechanism to discover availability of function executables, data cache and compute resources in the neighborhood, (iii) Mechanisms to handle Producer and/or Consumer mobility with cluster head's coordination, (iv) Cluster-based Data forwarding.

Network Architecture Examples

A vehicular network environment may encounter several challenges such as hidden terminal problems, nodes contending for limited radio resources, and highly variable channels due to stationary as well as mobile obstacles and interferers. The presence of a coordinator such as an access point may have significant advantages over an ad-hoc network as the coordinator/access point can enable improved or optimal scheduling for channel access and allocation of radio resources in a simpler and more effective way. However, deployment of infrastructure/access points in a large area of intended coverage imposes cost issues. Embodiments of a cluster-based architecture may advantageously bring a reasonable amount of benefits of an infrastructure-based network without the need for physical infrastructure. Clustering forms a hierarchical network structure in a distributed manner.

Some embodiments described herein may assume a cluster based vehicular ad-hoc network, where a group of proximity vehicles form a cluster to achieve better coordination for communication and in-network computation. Each cluster has a cluster head (CH) as coordinator. All members of a cluster are referred as cluster members (CMs). Inter-cluster communication and/or in-network computing resources/caches/functionalities within a cluster mechanism can be coordinated by the CH. Proximity CHs communicate for Inter-cluster coordination. In some cases, where CHs of two neighboring clusters may not reach each other by 1-hop communication, these CHs may designate one or more cluster members as gateway members (GM) between these clusters to cooperate inter-cluster coordination. Any suitable cluster-based vehicular communication technology may be utilized. One example of suitable cluster-based vehicular communication technology may include a framework with self-contained frame structure and inter/intra cluster resource coordination strategy to meet the latency, reliability and coverage requirements of the autonomous vehicles. In this example, the frame structure integrates clustering based communication as a design choice. In other implementations, the frame structure may consider only distributed communication and clustering can then be implemented at higher protocol layer (such as L3).

Some embodiments may include computational capabilities of nodes as an additional factor along with other factors (such as communication, Geolocation, etc.) to select the cluster head in the clustering process. For example, a node with higher computational capabilities/resources gets higher priority to be selected as a CH. Other beneficial performance indicators such as lower cluster formation time, longer cluster head lifetime, and longer residence times of CMs (i.e., lower rates of re-affiliation of nodes) under all mobility models may also be considered to get a stable clustering. As an example, some embodiments may utilize a two-step clustering technique as described below where initial clustering (Step 1) focuses on faster cluster formation and Step 2 focuses on optimizing cluster head selection for multiple performance indicators such as CH life time, computational capability of CH, etc.

Figure 20:
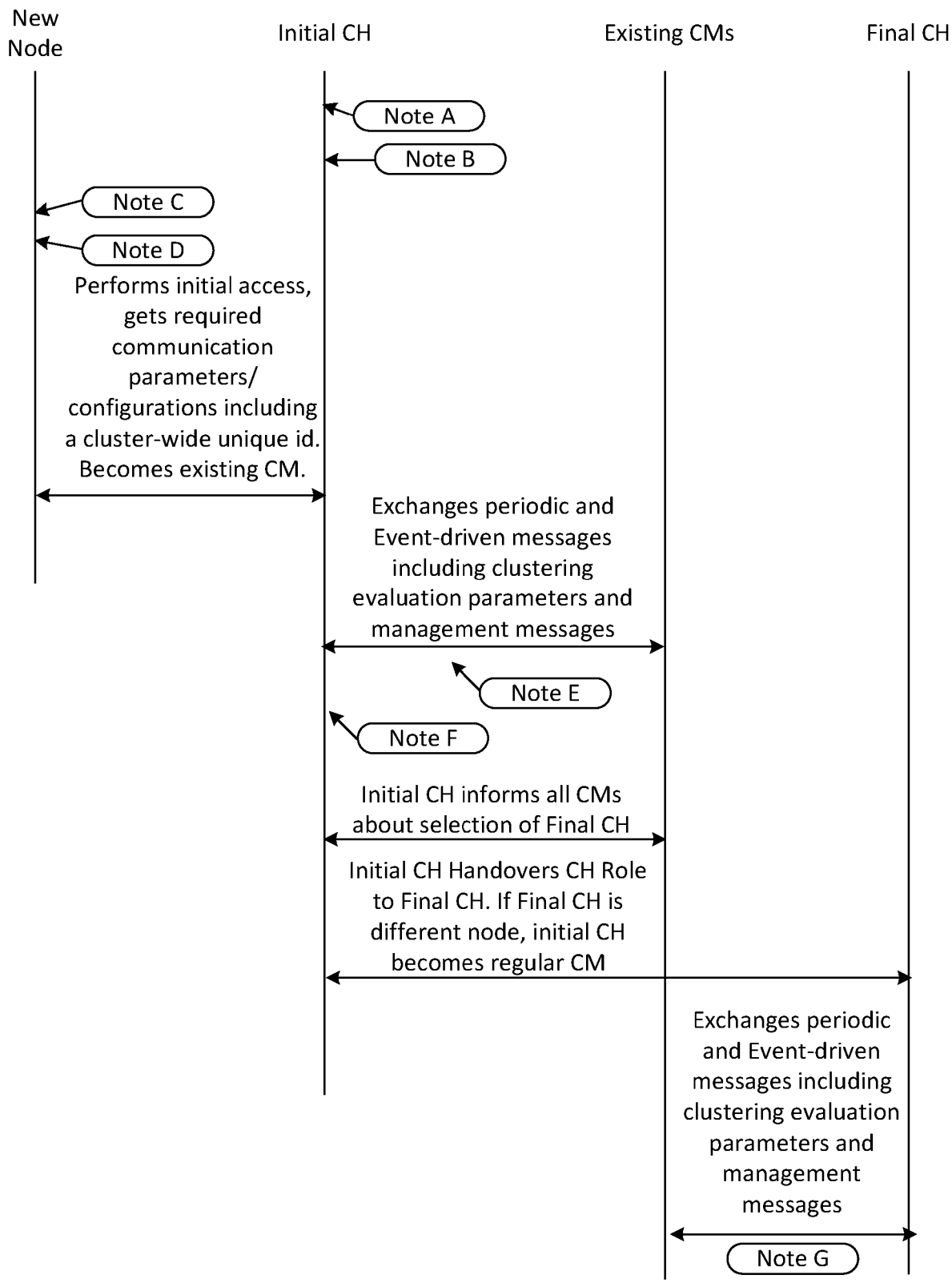
FIG. 20 is an illustrative sequence diagram of another process flow according to an embodiment.

FIG. 20 shows an embodiment of a process flow for clustering and cluster head selection where computational capabilities of nodes along with other factors are taken into consideration while selecting CHs. Step 1-Initial Clustering may include: (a) A vehicle (arriving first or in need of initiating/joining cluster) will listen/monitor for any existing synchronization/discovery signal/beacon in the proximity for a minimum specified time (greater than periodicity of discovery signal); (b) If a discovery signal exists, it may join the existing cluster (synchronizing, initial access, achieve an ID, etc.). In some cases, it may still consider starting a new cluster; and (c) If no discovery signal exists, it assumes role of CH and start sending discovery signal.

Step 2-Optimal Cluster head Selection may include: (a) Once an initial cluster is created, the Initial cluster head collects and coordinates information to evaluate optimal CH candidates; and (b) The initial CH then hands over its CH role to the selected best CH candidate as shown in FIG. 20. Several factors with complex decision process can be applied here (e.g., as described in further detail below).

At note A in FIG. 20, upon arrival or upon deciding to join a Cluster, a vehicle monitors a beacon/discovery message from existing CH for at least pre-defined time (Tmin_CH>Beacon/discovery transmission periodicity). At note B, there was no beacon/discovery message from any existing CH for the pre-defined time (Tmin_CH), so the vehicle declares itself Initial-CH and starts broadcasting periodic Beacon/Discovery Message. At note C, upon arrival or upon deciding to join a Cluster, a new vehicle monitors a beacon/discovery message from an existing CH for at least pre-defined time (Tmin_CH). At note D, the new vehicle receives the beacon/discovery message from the initial CH and decide to join the cluster.

At note E in FIG. 20, the CH coordinates to exchange/collect CH selection information of CMs to select a final CH. Examples of CH selection information: Computational Resources/capabilities of nodes, Geographical location (e.g. middle lane nodes are better), mobility (speed, direction), Min (time to destination, time to continue on the same road/highway without existing/right-turn/Left-turn), Turning direction, ID, Trust level, Vehicle shape/dimension, driver interest/Intension, front of platoon, connectivity (number of neighbors with good channel conditions), Mean distance with the neighbors, etc. At note F, the CH runs a pre-defined Final CH selection algorithm based on the Computational Resources/capabilities of nodes and one or more other information collected from CMs for this purpose. At note G, the Final CH runs a pre-defined Final CH update algorithm frequently. It hands over the CH role to a new CM if that CM is selected as better Final CH candidate.

Figure 21:
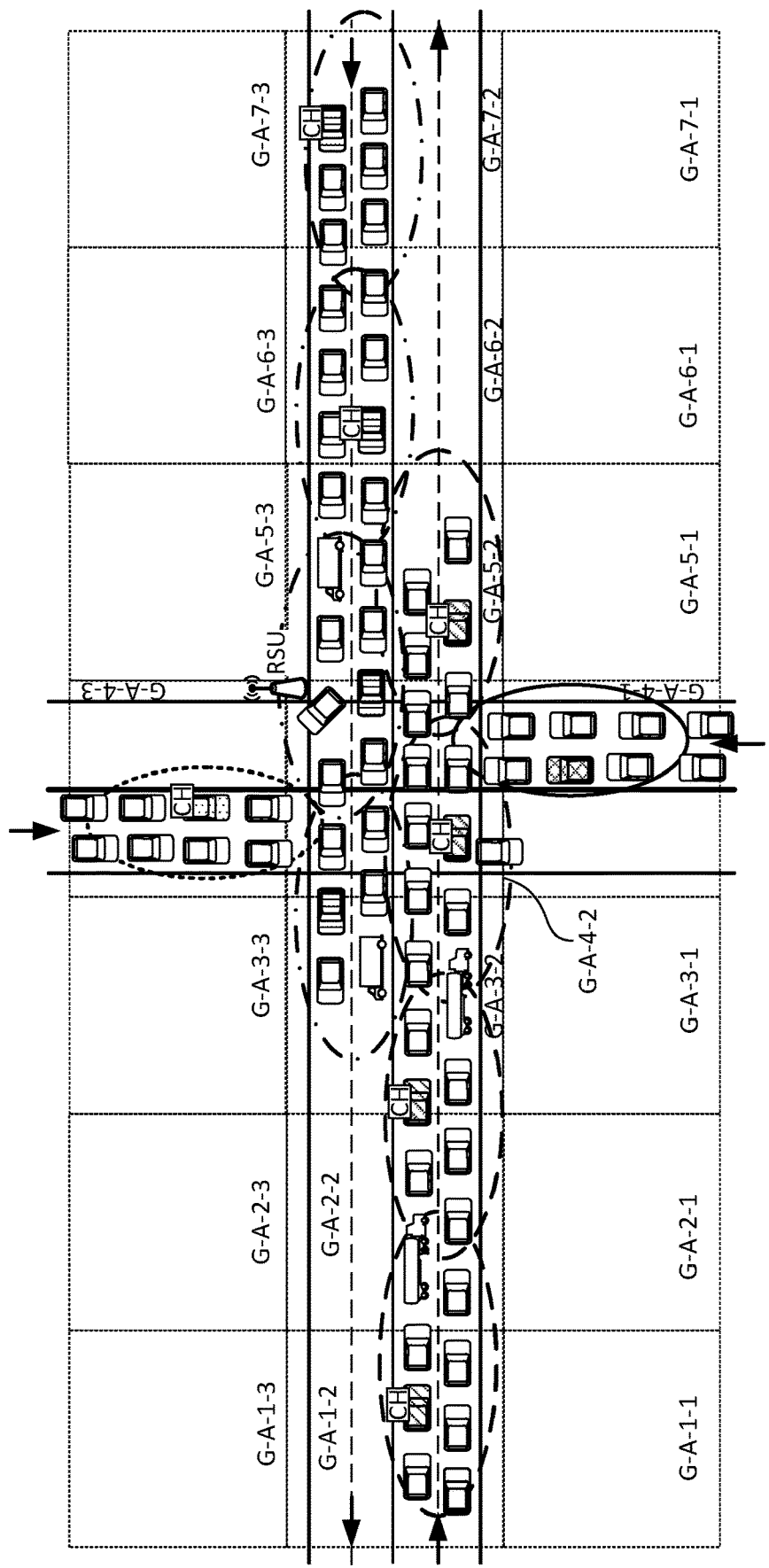
FIG. 21 is an illustrative diagram of another example of a road topology and a Geo-Area grid according to an embodiment.
Figure 22:
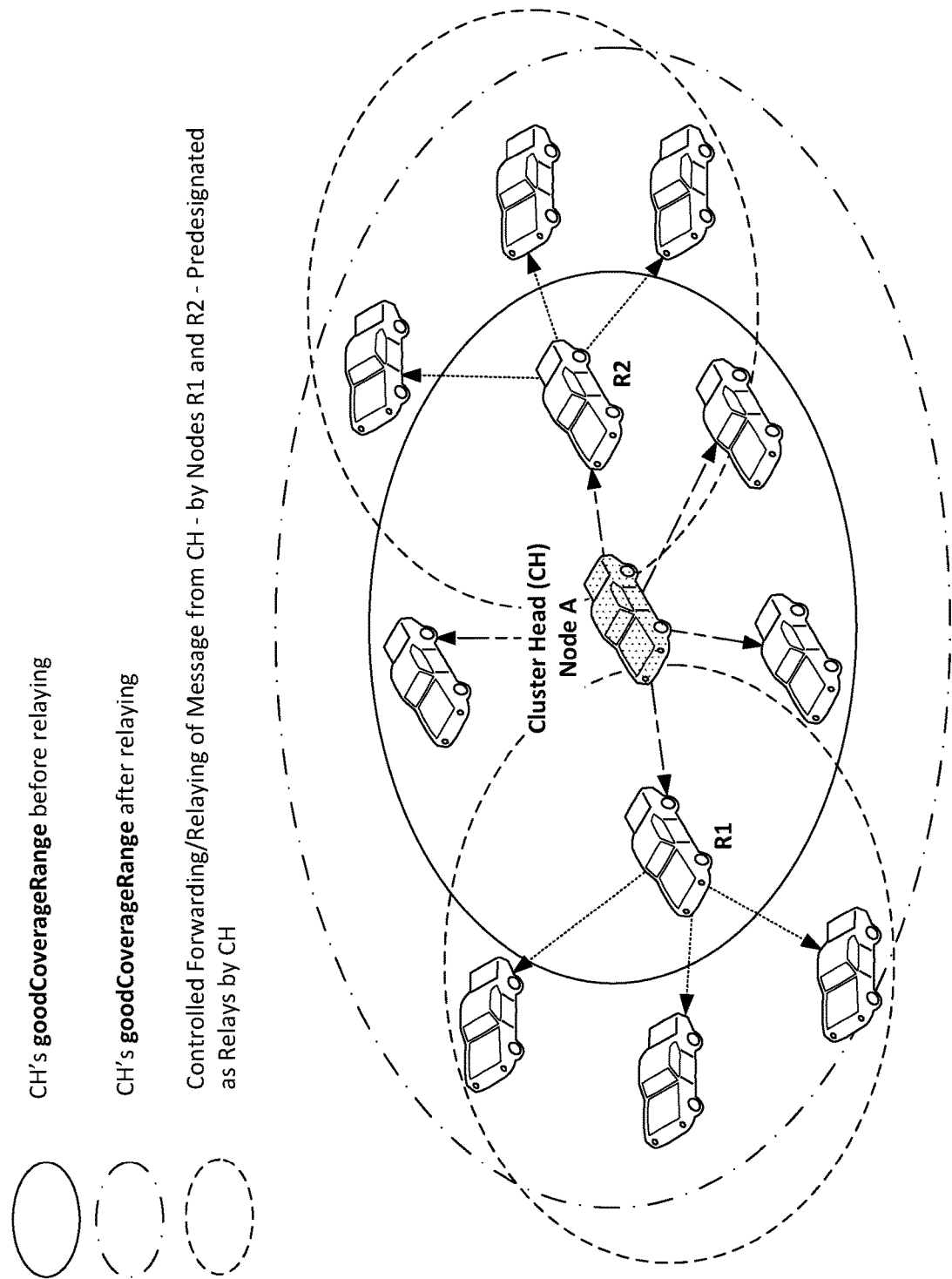
FIG. 22 is an illustrative diagram of an example of a controlled forwarding mechanism according to an embodiment.

FIG. 21 illustrates an example scenario showing a cluster-based vehicular ad-hoc network. Because messages from the CHs are important for the cluster members for coordination, controlled relaying of a message from the CH can be implemented to ensure all cluster members receive messages from the CH with high reliability. FIG. 22 shows an example of controlled relaying of messages from the cluster head by pre-designated relays to ensure reliable reception by all cluster members.

NDN and NFN Examples

Named Data Networking (NDN) is a variant of ICN where an NDN network uses data/content names from applications for data delivery. Applications follow a pre-defined naming guideline to name content which are known to nodes in NDN network. An NDN network has three main actors in content delivery: data producers, consumers, and router/forwarders. A consumer (node requesting content) sends an Interest packet (carrying content name or content attributes) to the network to request a specific data/content, and routers forward interest packet towards data/content producers and maintain track of all the pending Interest packets. When an Interest packet reaches a node with data matching interest name (at the producer, or from a router cache) or when a data/content becomes available at a router with pending matching interest, the Data/content is sent back to the consumer following a reverse path of the interest packet. Usually NDN capable nodes maintain three data structures/tables to enable name-based content delivery, namely: a Content Store (CS), a Pending Interest Table (PIT), and a Forwarding Information Base (FIB). The CS caches relevant data/content received for a limited time to potentially satisfy future Interest packets, while the PIT maintains unserved Interests for a while that have been forwarded and waiting for matching Data to return. Whenever a data/content is received at router with a matching entry in PIT, the router forwards the content towards downstream interfaces listed in the PIT entry, removes that PIT entry and caches the data in CS for future use. Name-based routing protocol maintains the FIB which is used by a forwarding strategy module to make Interest forwarding decisions.

NFN (Named Function Networking) is an extension to ICN that enables naming functions in addition to naming data and fetching/executing function executables in the network. In NFN, naming in interest packet indicates content and names of functions that can be applied on the content/data while performing in-network computing by the router(s).

A Geo-Area may refer to a Geo grid map system (such as Military Grid Reference System (MGRS), Geo-Hash, etc.) that divides the world into approximately square/rectangular geo-areas of various granularities. Each geo-area can be represented by a string of digits and letters. A vehicle equipped with GPS sensors can determine its location and calculate its corresponding Geo-Area.

End-To-End Cluster-Based Technology Examples

Caching of a request packet and content is an inherent feature of NDN (or content centric networking (CCN)) network. When the interest packet travels from a consumer to a producer (or content cache), the nodes on the route/path store the interest at least for a while. Similarly, when content is forwarded from a producer to a consumer, content can be cached on the path/route. Such a basic caching scheme may not be efficient as it may result in excessive caching on limited routes, reducing cache hits as well as wasting caching resources at nodes on the limited paths. Off-route intelligent caching including some proactive caching is beneficial in a vehicular network. Moreover, in cluster-based vehicular network, cluster heads can coordinate to avoid excessive caching in the neighborhood and also to discover available caches in an efficient way.

Similarly, for the in-network computing, a vehicular node can apply a function over data if it has the function executable available in its 'Function Executable Store' and possesses enough compute resources to execute the function. If local execution of the function is not possible or practical, the vehicle has to forward request to a neighboring vehicle with adequate compute resources. In order to facilitate this decision, a mechanism is beneficial to discover availability of function executables and compute resources in the neighborhood. The Cluster head can be instrumental to download the most popular 'Function Executables' pro-actively from reliable sources such as RSUs and store them at a limited number of computationally capable nodes in the proximity. While doing so, the CHs can also avoid excessive caching of 'Function Executables' in a proximity. The CHs can also coordinate to cache associated data (on which a Function is executed) either at a same node as that for related 'Function Executable' caching or on nearby nodes to optimize communicate and compute tradeoffs.

Once caching of content/data and function executables is done at selected nodes, it is desirable that the neighboring nodes know about availabilities about these caching as well computational capabilities/resources at neighboring nodes to efficiently utilize these resources. For example, a forwarding algorithm to find a content or function executable is heavily dependent on such a discovery mechanism. The CHs are configured to be effective in providing discovery mechanisms to share availability of data caches, function executables, and compute resources in the neighborhood with minimal signaling overhead on the communication side. Similarly, the CHs can also assist in finding a better forwarding route/path taking into consideration of the communicate and compute tradeoffs.

Producer (or node with content or function executable in cache) and consumer mobility in a highly mobile environment of vehicular network is generally frequent. For example, in case of producer mobility in a NDN, the network is not updated with the new location or cluster-association of the Producer for a while (called convergence/ update time). An interest packet is directed to the old location (or cluster-association) with a chance to fail unless it finds a new cache on the previously established path between consumer and producer. Cluster head assisted mobility handling is beneficial to optimize cache replacement in such cases and to inform the neighborhood about producer and/or consumer mobility as soon as possible to reduce convergence time with minimal signaling flood.

Some embodiments may include technology to provide cluster head assisted in-networking caching of 'data' and 'Function Executables'. In some embodiments, the CH coordinates caching of data/content and function executables at nodes in the cluster. The CH further coordinates with neighboring CHs to minimize redundant caching of data/content as well as Function executables in the proximity. To facilitate a coordinator role, the CH frequently gets updated reports about availability of Data/content caches, Function executable caches, remaining cache capacity, and available computation resources at nodes in the cluster from cluster members. The CHs also share cluster-wide resource/service/cache availability reports with each other in the proximity. Further details of examples of this report sharing or discovery mechanisms are provided below.

The main objectives of some embodiments of CH assisted Caching design for data/content as well as functional executables are as follows: (a) A balanced distribution of data/content among available caches in the cluster as well as among proximity clusters. CHs can have a wider view of available caches; (b) A balanced distribution of function executables among nodes with available cache and computation resources in the cluster as well as among proximity clusters; (c) Cache a functional executable and potential associated content at same or nearby nodes; (d) Minimize unnecessary caching redundancy (for data/content and function executable caching) in a cluster as well as in the proximity (among neighboring clusters); (e) Improve Cache hit ratio with reduced communication cost (i.e., interest packet reach matched data with reduced flooding and in less number of hops)—by developing efficient discovery mechanisms and forwarding strategies; and (f) CHs also considers a Geo-location-based popularity score while deciding caching of data/content and function executable. One of the benefits of an NDN architecture comes from caching of popular data in the local area of consumer. In a vehicular network, much application data comes from sensors and have associations with Geo-location. So, the popularity of data/content as well as function executable can be Geo-location dependent. For example, all clusters reaching an intersection have more interest in updated intersection view data compared to clusters leaving intersections.

Caching Data Content Examples

In some embodiments, the CH decides data/content caching of most popular content/data in the CH's Geo-location. The CH ensures no redundant caching of data/content in the same cluster. Neighboring CHs coordinate among them to avoid unnecessary caching in the proximity. CHs may decide to have redundant caches in neighboring clusters for extremely popular content in the Geo-Area. The CH may maintain a popularity score of contents based on the interest received by consumers over a sliding window of time. For example, the CH may ask CMs (cluster members) to count the request rate for content and send it to the CH frequently. The CH can then calculate and maintains the popularity scores of contents. When a content traverses through a cluster (e.g., in response to an interest from a consumer) and the CH finds popularity score for the content to be high, the CH selects the content for caching. CH may check with neighboring CHs whether it is already cached. If the content is already cached in a neighboring cluster, the CH may skip caching the content. The CH selects a node in the cluster (either on-path/route or off-route of the interest/content) and asks the selected cluster member to cache the content. Selection of node for caching can be done as follows: (a) the CH has updated information about the available caches at its cluster members. Note that the discovery mechanism discussed below enables a CH to have knowledge of resource/ service/cache availability at its cluster members; (b) the CH estimates the size of the data/content and selects a CM with sufficient available cache; and (c) The content may be associated with a function which is cached at a CM. In this case the CH will give high priority to the CM with the function executable to cache the data/content, if the CM has sufficient available cache. Otherwise a nearby CM will get priority to cache the data/content.

Caching Function Executables Examples

In some embodiments, it is assumed that a vehicle should download a function executable only if it has enough compute resources to execute the function and the executable is coming from a trusted source like road side unit (RSU). It may also be assumed that each vehicle has a pre-installed list of RSU locations and each RSU has enough storage to maintain function executables. In some embodiments, the CHs handle communication with the RSU on behalf of their clusters. The RSU periodically broadcasts lists of function profiles. The broadcast of function profiles from the RSU may go through multiple hops. Upon reception of function profiles from the RSU, a CH determines the list of functions that are more popular in the CH's Geo-location and are not already downloaded in the cluster. The determined list may be referred to as a Shortlisted Potential Function List 1 (SPFL1). Popularity of a function can be decided as follows: (a) The CH may maintain a popularity score of functions based on the interest received by consumers for the functions recently over a sliding window of time. For example, the CH may ask CMs (cluster members) to count the request rate of function and send it to the CH. The CH can then calculate and maintain the popularity scores of functions; (b) Alternately, or additionally, the RSU may include 'Popularity of the function perceived by RSU' information. The 'Popularity of the function perceived by RSU' information may indicate different Popularity scores of a function for various Geo-areas. The CH in a Geo-Area then selects the most popular functions in that Geo-Area.

In some embodiments, the CH may check whether some of the selected popular functions in the SPFL1 are already cached in the neighboring clusters and may exclude them to minimize redundancy in the proximity. Note that the discovery mechanism discussed below enables a CH to have knowledge of resource/service/cache availability in the neighboring clusters. If a function is extremely popular in the Geo-Area of the CH, the CH may keep it in shortlisted list to download even if it is already cached in the neighboring clusters. The CH then prepares a Shortlisted Potential Function List 2 (SPFL2). The CH then checks whether each Function in SPFL2 can be executed on at least one CM (cluster member) with its available computing resources. If not, it is excluded from the list. The remaining Functions list is SPFL3. Note that the Function profiles report from the RSU provides details of resources needed to download and execute a function. Neighboring CHs may coordinate to collectively distribute function-downloads in clusters to avoid redundancy. In that case, SPFL3 of each cluster is determined collectively by negotiation among the CHs.

In some embodiments, the CH selects a CM to download a function where the CM has sufficient resources to execute it starting from the most popular function in the SPFL3. If a node/CM has data/content cache associated with the function and it has sufficient compute resources to execute the function, the CM is given higher priority to download the function executable. The CH may receive the function executable from the RSU and then send it to the selected CM by unicast. The CH may send an interest packet to the RSU by using a Geo-based forwarding indicating a function executable download. In case the CH is maintaining a popularity score of functions in its Geo-Area based on the interest received by consumers for the functions, the CH may ask the RSU to send the function executable for most popular functions on demand. The CH may send an interest packet to the RSU for this purpose. Information about Updated caching of functional executables is shared by the CH with its cluster members and neighboring CHs as discussed below in connection with the discovery mechanisms.

Discovery Mechanism Examples

In some embodiments, the cluster heads may utilize a coordinated discovery mechanism to discover availability of function executables (service), data cache and compute resources in the neighborhood. Embodiments of such mechanisms may include technology to share updated information about service and resource availability at cluster members (CMs) to the cluster head (CH), and technology to share overall service and resource availability in a cluster to the proximity clusters.

Figure 23A:
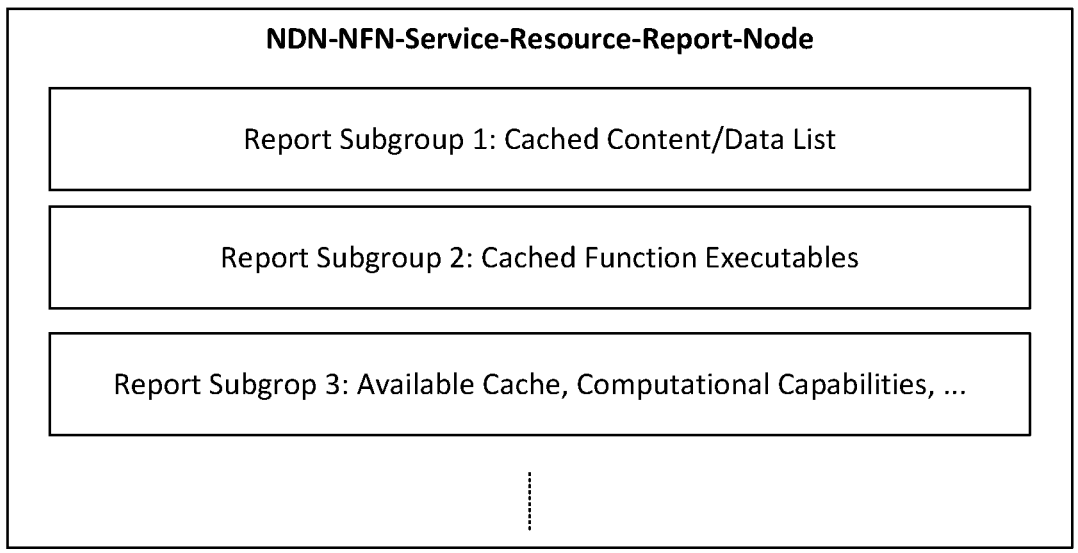
FIGS. 23A to 23B are illustrative diagrams of respective examples of reports according to embodiments.
Figure 23B:
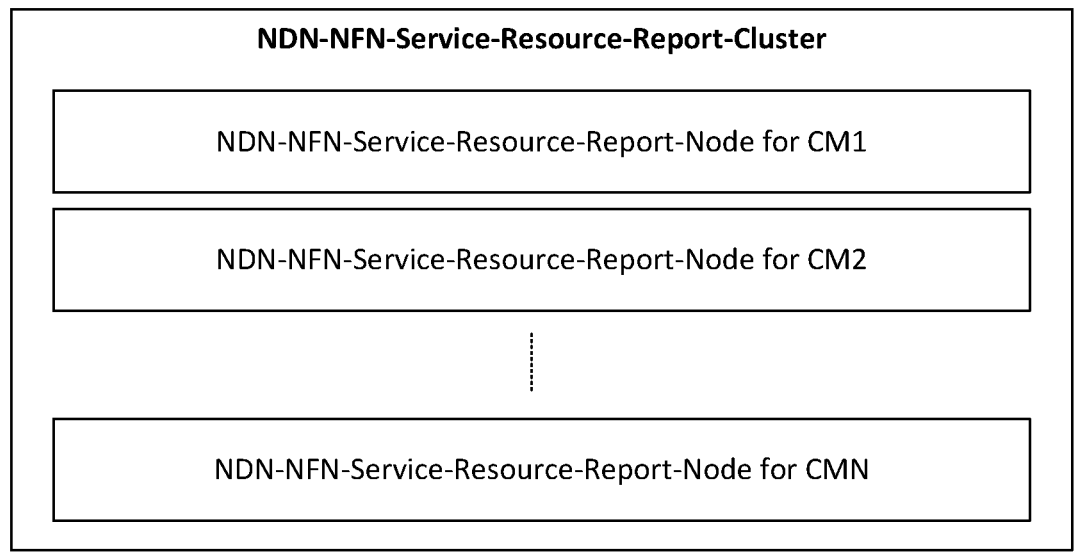
Figure 24:
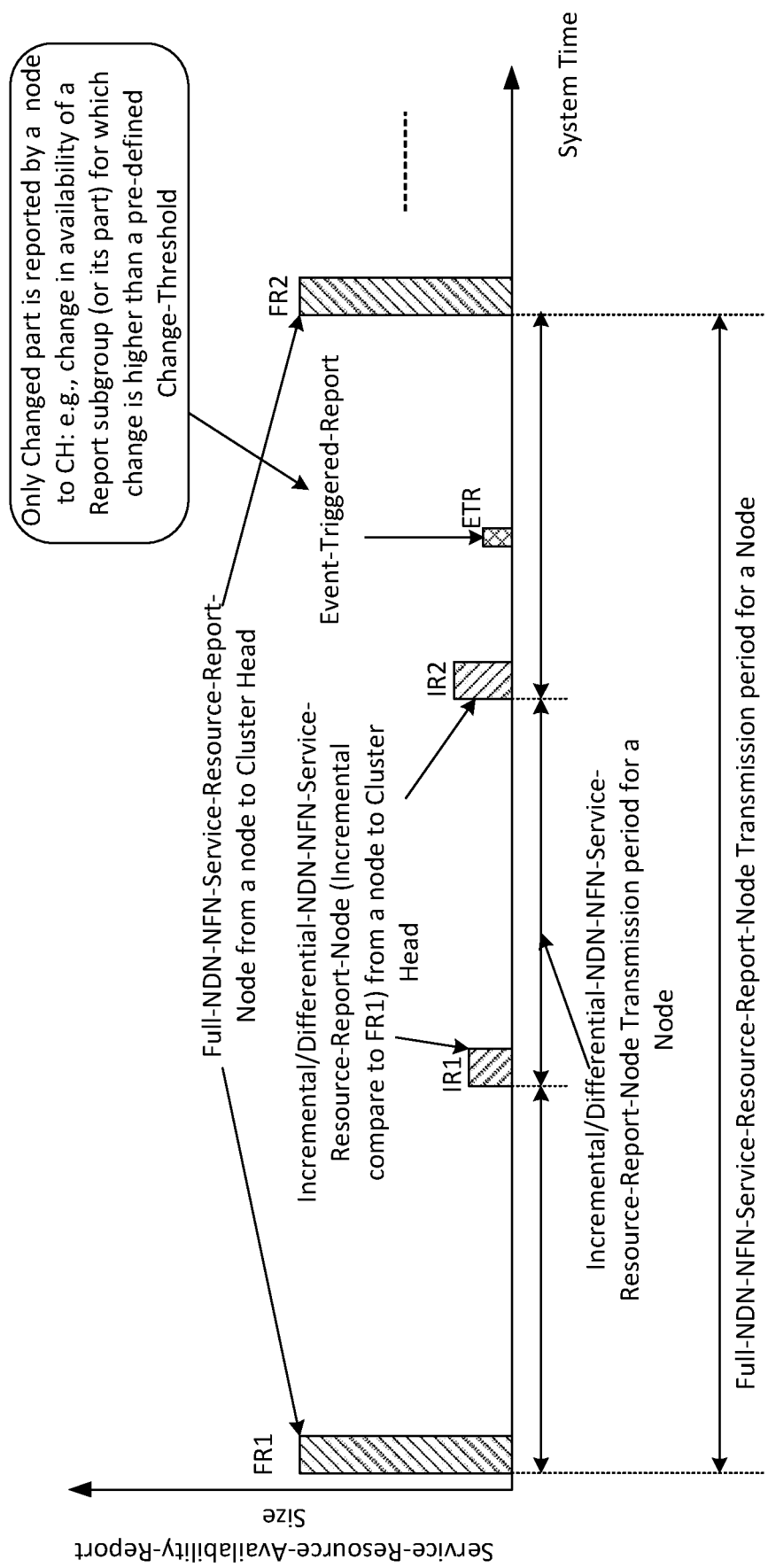
FIGS. 24 to 26 are illustrative diagrams of respective examples of timelines of broadcasts organization according to embodiments.

FIG. 23A shows an example NDN-NFN-Service-Resource-Report-Node from a node, and FIG. 23B shows an overall report NDN-NFN-Service-Resource-Report-Cluster for the cluster. FIG. 24 illustrates an example showing how a cluster member shares Resource/service/cache Availability and caching updates to cluster head, where FR=Full Report, IR=Incremental Report, and ETR=Event-Triggered Report.

An embodiment of a discovery process may include mechanisms where each Node (Cluster Member) sends service/resource availability updates to the Cluster Head. Each node frequently sends a report called 'NDN-NFN-Service-Resource-Report-Node' to the cluster head to indicate updated service and resource availability at the node. The NDN-NFN-Service-Resource-Report-Node may consist of several categories of contents called report subgroups as shown in FIG. 23A. For example, a list of data/content (cached or produced at the node) available at the node; a list of Cached Function Executables; and others such as available remaining cache capacity, computational capabilities and so on. Because caching of data/content and functional executables are coordinated by the CH, nodes do not need to share this part of information in 'NDN-NFN-Service-Resource-Report-Node' frequently. A periodic update about this information with a long periodicity is good enough.

However, some information such as availability of computational resources at a node may vary dynamically over time based on the utilization of these resources by the node itself. A frequent update about these resources need to be sent to the CH, so that the CH can make a better decision regarding cache placement/replacement and forwarding decisions in future. Accordingly, some embodiments provide a Full 'NDN-NFN-Service-Resource-Report-Node' report transmission from each node to CH with a longer periodicity as shown in FIG. 24. In between two full report (FR) transmissions, an Incremental/differential report (IR) is transmitted by the node to the CH, where IR contains only those part of the FR which have been changed (or changed by more than a pre-defined threshold). The periodicity of FR transmissions is integer multiple of IR transmission periodicity. Additionally, in specific cases, an event triggered report (ETR) can be transmitted from a node to the CH such as: (i) computational report at the node changes drastically, (ii) a cached function executable cannot be executed due to change in other computational resources. Some embodiments may use unicast for the 'NDN-NFN-Service-Resource-Report-Node' transmission from the nodes to the CH, so that a CM does not need to track transmissions from other CMs. It is beneficial specifically if the nodes are half duplex. A node may not need to send any update (IR or FR) if there is no change in service/resource availability compared to a last update.

A Time Reference may also be transmitted with the IR transmission where the time reference information indicates the time (e.g., implicit reference time can be last FR transmission) with respect to which the IR has been prepared. For example, some embodiments may include a Time-Tag-of-Full-Report (of X bits, assuming it requires lesser bits than specifying absolute system/frame time) in each FR. Each node will set the Time-Tag-of-Full-Report value as all 0's for first Full report. The Time-Tag-of-Full-Report is incremented if there is any change in the FR compared to the last FR. For each node, upon reception of the FR, the CH stores the FR along with its Time-Tag-of-Full-Report. For each node upon reception of the FR, the CH updates the FR only if the new FR has a higher Time-Tag-of-Full-Report based on Modular operation (as Time-Tag-of-Full-Report rolls back to 0 after reaching 2–1). In this case, the IR from each node indicates the reference Time-Tag-of-Full-Report where the Time-Tag-of-Full-Report reference indicates the FR transmission with respect to which this incremental report has been prepared.

The discovery process may next include mechanisms where the Cluster Head sends aggregated service/resource availability in the cluster to cluster members. As described above, the CH frequently gets Resource/service/cache availability reports from cluster members. Based on these reports and the Resource/service/cache availability at the CH itself, the CH frequently prepares an aggregated report called Full-NDN-NFN-Service-Resource-Report-Cluster for the cluster. The CH then broadcasts the NDN-NFN-Service-Resource-Report-Cluster report frequently to the CMs (as well as to the neighboring CHs as discussed below).

Figure 25:
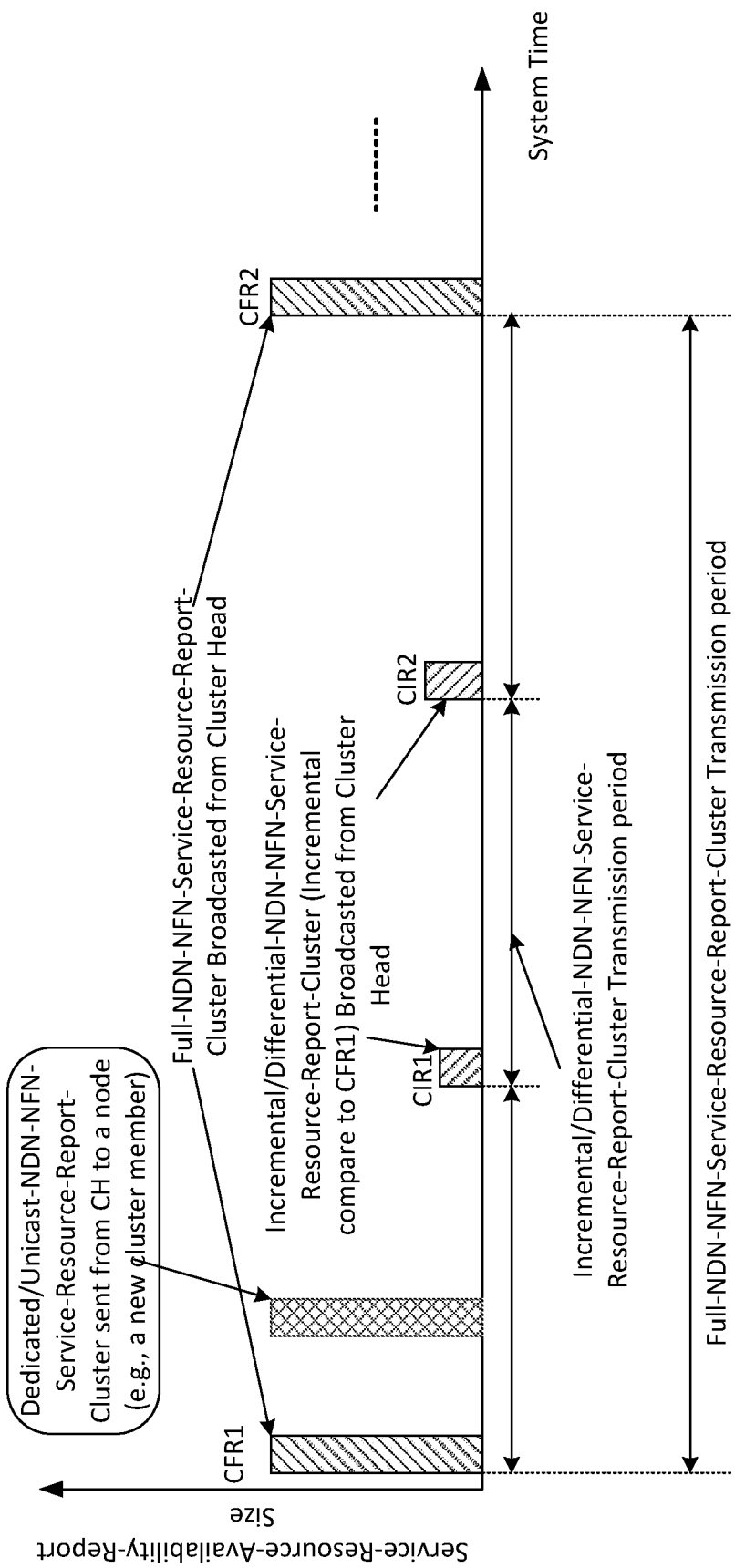
Figure 26:
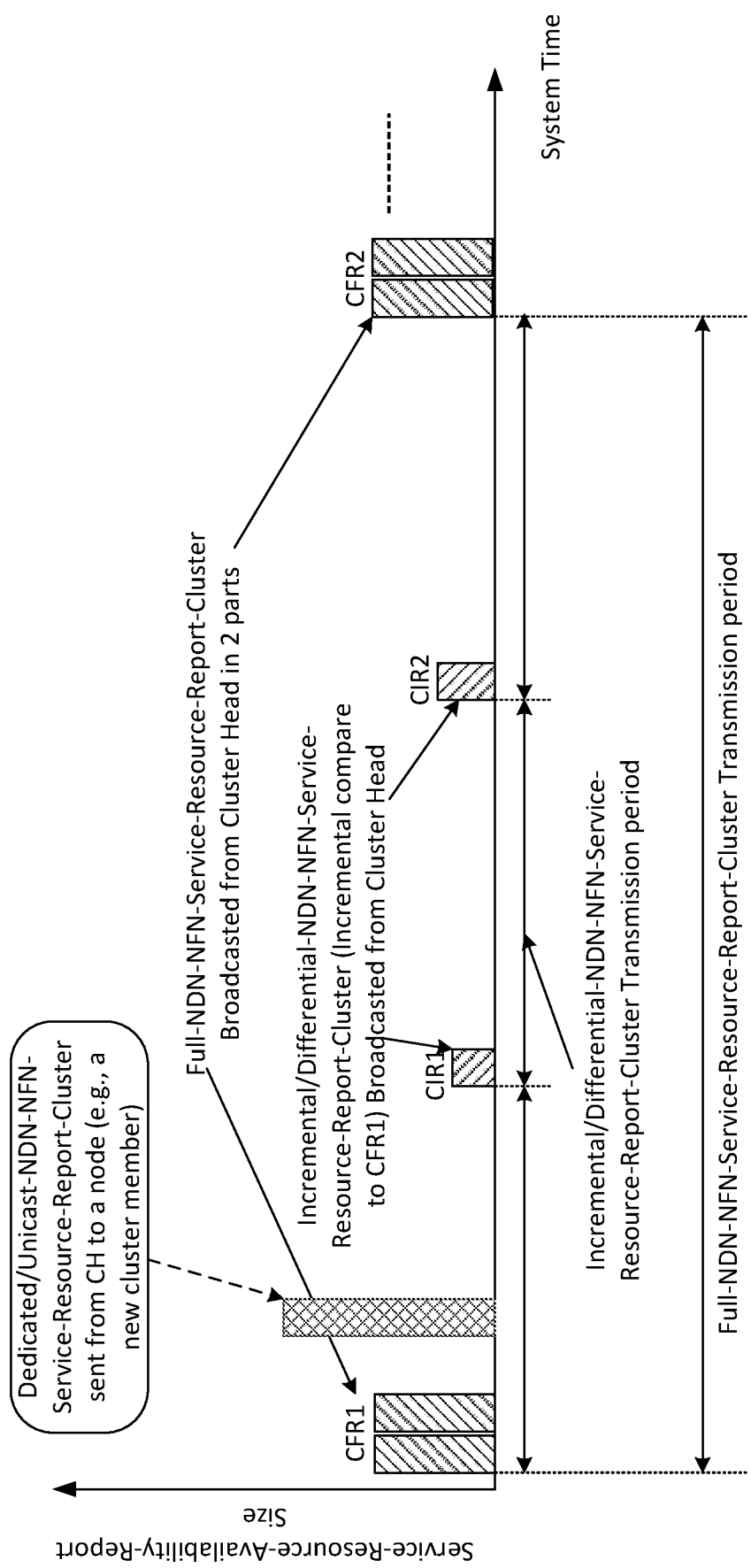

FIG. 25 and FIG. 26 illustrate examples showing how the cluster head broadcasts aggregated Resource/Service/Cache Availability in the cluster, where CFR=Cluster Full Report, CIR=Cluster Incremental Report. The Full NDN-NFN-Service-Resource-Report-Cluster size can be bigger, so the full report (called CFR—cluster full report) is transmitted with longer periodicity as shown in FIG. 25. As discussed above, some part of the report will not change frequently. For example, lists of cached data/content and functional executables at nodes may not change very frequently, so a periodic update with longer period for such information is sufficient. In between two consecutive CFRs, cluster incremental/differential reports (CIRs) for the cluster can be transmitted. Additionally, for a new member joining the cluster, the CH can send a dedicated CFR as unicast transmission. Similar to the Full NDN-NFN-Service-Resource-Report-Node, a time reference (Time-Tag-of-Full-Report of X bits) can be added to the cluster Full NDN-NFN-Service-Resource-Report-Cluster report (CFR).

Figure 27:
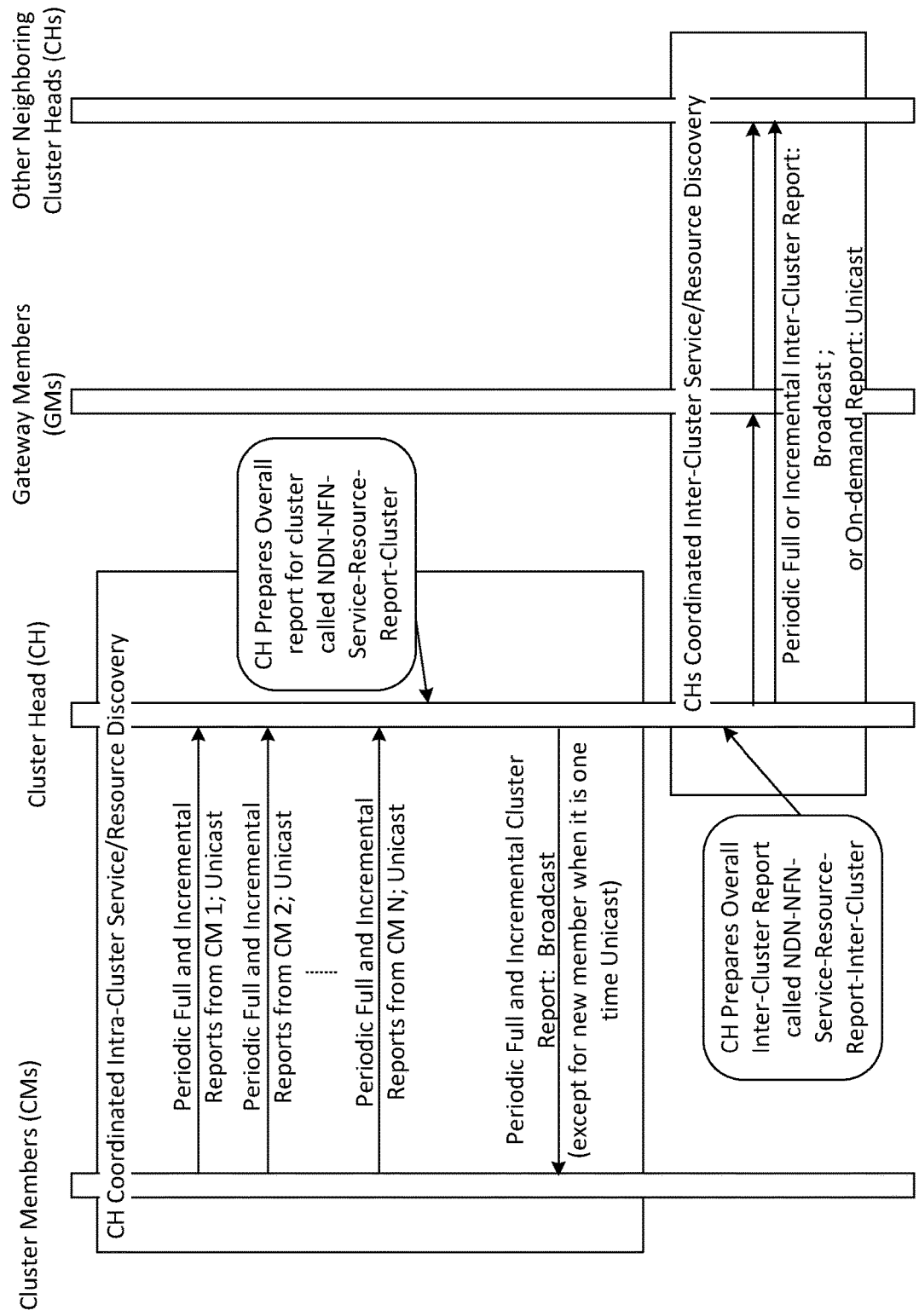
FIG. 27 is an illustrative sequence diagram of another example of a process flow according to an embodiment.

FIG. 27 illustrates an example showing how a cluster head collects Resource/Service/Cache Availability in the cluster and shares the aggregated report to the cluster members and neighboring cluster heads. The discovery process may next include mechanisms where the Cluster Head sends Service/Resource availability in the cluster to Neighboring Cluster Heads. The CHs play a vital role in deciding cache placement/replacement for data/content and functional executables as well as in forwarding decisions. Therefore, it is beneficial that CHs in a proximity should know each other's service/resource/caching information to optimize the system performance. For example, if caching is limited, then a CH may decide not to cache the data/content which are cached in a neighboring Cluster. Similarly, if a function executable is available in a cluster, a neighboring cluster may not find it very beneficial in terms of communicate-compute tradeoff to download and cache the same function executable. Some embodiments provide mechanisms to share NDN-NFN-Service-Resource-Report-Inter-Cluster among the proximity CHs as shown in FIG. 27. Some embodiments first focus on a CH sharing NDN-NFN-Service-Resource-Report-Cluster to its immediate clusters. The CH prepares an NDN-NFN-Service-Resource-Report-Inter-Cluster based on the NDN-NFN-Service-Resource-Report-Cluster. NDN-NFN-Service-Resource-Report-Inter-Cluster may contain only selected information from NDN-NFN-Service-Resource-Report-Cluster such as only caching info of data/content and function executables. For example, other clusters may not be interested in remaining caching capability in this cluster. The CH then sends NDN-NFN-Service-Resource-Report-Inter-Cluster message by using inter-cluster communication resource where mostly CHs or designed gateway members (GMs) listen to the communication. If a GM receives NDN-NFN-Service-Resource-Report-Inter-Cluster, it will forward the message to the corresponding CH. Gateway members (GMs) are regular cluster members at border of two clusters who are pre-designated by its CH to act as relay for that specific neighboring CH. GM relay/forward inter-cluster discovery reports, Interest packets, and Data packets between clusters. Similar to as discussed above, the Full NDN-NFN-Service-Resource-Report-Inter-Cluster (ICFR=Inter-cluster full report) can be transmitted periodically with long periodicity, while an incremental report (Inter-cluster incremental report (ICIR)) can be transmitted between two successive ICFRs. A dedicated unicast ICFR can be sent to a neighboring CH upon demand as well. In some cases, two CHs may not communicate reliably. However, they can communicate reliably through GMs.

Producer and/or Consumer Mobility Examples

Producer (or node with content or function executable in cache) and consumer mobility in a highly mobile environment of vehicular network is generally frequent. Some embodiments may provide technology for cluster head assisted mobility handling to improve or optimize cache replacement in such cases and to inform the neighborhood about producer and/or consumer mobility quickly or as soon as possible to reduce convergence time with minimal signaling flood.

Producer Mobility Examples

In case of producer mobility in a NDN, the network is not updated with the new location or cluster-association of the Producer for a while (called convergence/update time). An interest packet is directed to the old location (or cluster-association) with a chance to fail unless it finds a new cache on the previously established path between consumer and producer. Because Caching of Content and Function Executable is done as per cluster coordinated by the CH, whenever a producer is moved and the mobility is detected by the CH, the CH finds one or more CMs for cache replacement within the cluster. The CH also updates neighboring CHs immediately or shortly thereafter. For detecting Producer Mobility: (a) If the producer (or a CM with Content and Function Executable caching) is about to leave the cluster due to a predictable reason such as a Highway exit, a left/right turn, a route change, etc., the producer informs the CH in advance by intra-cluster communication; and (b) As mentioned in connection with the discovery mechanism above, each node updates resource/service/cache availability to the CH periodically. If the CH does not receive such a report from a CM for N-missed periods, the CH may probe the CM and determine mobility.

With respect to Cache Replacement: (a) Once expected mobility is detected by the CH (i.e., mobility situation identified before producer moves out of the cluster), the CH initiates cache replacement from the producer; (b) the CH runs a similar algorithm as described above to find another CM(s) to move the Content and Function Executable caching; and (c) If the producer is moving to an adjacent cluster, the CH may skip cache replacement. Instead, the CH simply sends an updated cluster resource/service/cache availability report to cluster members and inter-cluster resource/service/cache availability report to neighboring clusters immediately (event triggered reporting), or shortly thereafter.

If the producer moves out of the cluster before informing the CH: (a) In some cases (such as due to dynamic radio condition or due to unpredicted reasons such as traffic light turned red at intersection) the producer moves out of the cluster without informing the CH. In these cases, the producer may send a NDN-Mobility-Management packet (a packet similar to interest packet where naming indicates cache replacement request to the CH) towards the CH. It may help the CH and neighboring CHs to know about the producer's mobility immediately or sooner than they may otherwise know; (b) the CH then tries to receive the content and function executable that was cached on the moved out member; (c) For example, the CH can achieve the content and function executable from one of the neighboring clusters (if neighboring clusters have them) by inter-cluster communication. Note that the discovery mechanism enables neighboring CHs to know about each other's resource/service/cache availability; (d) Alternately, or additionally, the CH can send an interest packet to get the content towards the producer or an alternate cache. Similarly, the CH can send a request to an RSU to get the function executable; and (e) the CH runs a similar algorithm as described above to find another CM(s) to cache the Content and/or Function Executable. If the CH cannot get the cache replaced, the CH will update neighboring clusters and members of its own cluster by sending updated inter-cluster and cluster resource/service/cache availability report, respectively.

Consumer Mobility Examples

If a consumer (cluster member after sending interest packet) moves out of the cluster, the CH should keep track of the target cluster where the consumer is moving in. When the requested content comes, the CH should forward the content towards the target cluster (e.g. by inter-cluster communication if the Target cluster is a neighboring cluster). If the consumer moves without informing the CH, the CH may not know the target cluster of the consumer. In this case, the consumer should retransmit the interest packet after expiry of a Mobility-Retransmission-Wait-Timer. The consumer starts this timer once it knows it has moved out of current cluster.

Cluster Head Assisted Forwarding of Interest and Data Packets Examples

In some embodiments, cluster heads (CHs) have a global view of proximity in terms of resource/service/cache availability in the proximity. Therefore, CHs can play a vital role in forwarding decisions. In some embodiments, when an interest packet arrives in a cluster, the CH checks whether requested content and/or function is/are available at cluster members (CMs). If yes, the CH asks the CM(s) to respond back to the interest packet. Otherwise, the CH maintains the pending interest table and forwards the interest packets towards a next cluster. A gateway member can help to forward the interest packet to the next cluster. The next cluster is a neighboring cluster in the next hop Geo-area towards the producer (or content and/or function caches). The next-hop Geo-Area is decided by a Geo-Area based routing (any suitable Geo-Area based routing technology may be utilized).

Figure 28:
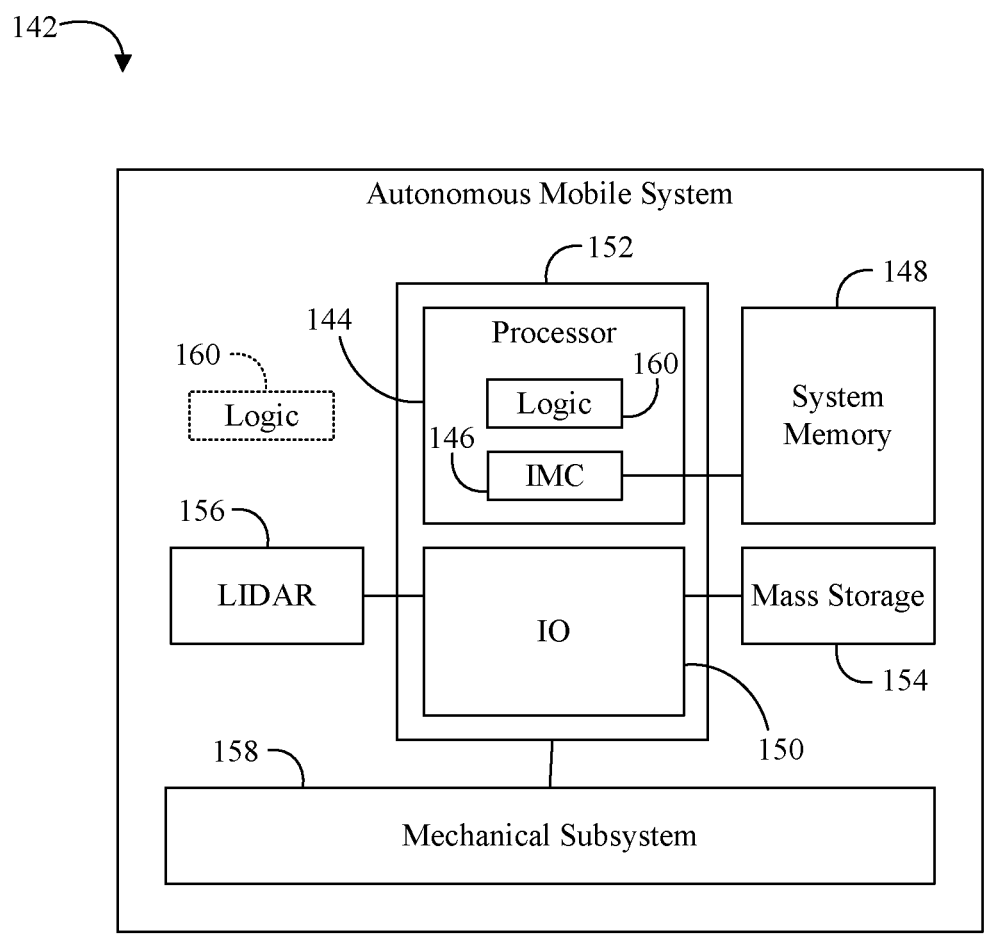
FIG. 28 is a block diagram of an example of an autonomous mobile system according to an embodiment.

Turning now to FIG. 28, a performance-enhanced autonomous mobile system 142 is shown. The mobile system 142 may be a robot, autonomous vehicle (e.g., car, van bus, aircraft, spacecraft), and so forth. In the illustrated example, the system 142 includes a host processor 144 (e.g., central processing unit/CPU) having an integrated memory controller (IMC) 146 that is coupled to a system memory 148.

The illustrated system 142 also includes an input output (IO) module 150 implemented together with the processor 144 on a semiconductor die 152 as a system on chip (SoC). The IO module 150 may function as a host device that communicates with, for example, a LIDAR 156 and mass storage 154 (e.g., hard disk drive/HDD, optical disk, solid state drive/SSD, flash memory). The die 152 may also be coupled to a mechanical subsystem 158 (e.g., wheels, drivetrain, internal combustion engines, fuel injectors, pumps, etc.) that enable the system 142 to move from one location to another.

The processor 144 may include logic 160 (e.g., logic instructions, configurable logic, fixed-functionality hardware logic, etc., or any combination thereof) that implements one or more aspects of the method 20 (FIG. 3), and/or the method 30 (FIGS. 4A to 4C), already discussed. Although the logic 160 is illustrated in the processor 144, the logic 160 may be distributed throughout or located elsewhere in the mobile system 142. Some embodiments may omit one or more of the LIDAR 156 and mechanical subsystem 158, such that the system 142 functions as a fixed infrastructure node such as a RSU.

Additional Notes and Examples:

Example 1 includes an electronic processing system, comprising a processor, memory communicatively coupled to the processor, and logic communicatively coupled to the processor to generate first name information corresponding to one or more of data or content for an autonomous vehicle to represent vehicular application information based on one or more requirements of the vehicular application information, and generate second name information corresponding to a chain of one or more functions for an autonomous vehicle based on the one or more requirements of the vehicular application information.

Example 2 includes the system of Example 1, wherein the logic is further to incorporate the first and second name information as part of a name of a data packet including at least geo-content location information in the name of the data packet.

Example 3 includes the system of any of Examples 1 to 2, wherein the logic is further to discover an available function independent from one or more of a data request or response procedure, and download the available function from a trusted source.

Example 4 includes the system of Example 3, wherein the logic is further to discover the available function based on one or more of the first name information and the second name information.

Example 5 includes the system of any of Examples 1 to 4, wherein the logic is further to forward data based on one or more of geographical location of data, compute capability, and communication capability.

Example 6 includes the system of Example 5, wherein the logic is further to place an in-network function based on one or more of geographical location of data, compute capability, and communication capability.

Example 7 includes a semiconductor package apparatus for use with autonomous vehicle-related information, comprising one or more substrates, and logic coupled to the one or more substrates, wherein the logic is at least partly implemented in one or more of configurable logic and fixed-functionality hardware logic, the logic coupled to the one or more substrates to generate first name information corresponding to one or more of data or content for an autonomous vehicle to represent vehicular application information based on one or more requirements of the vehicular application information, and generate second name information corresponding to a chain of one or more functions for an autonomous vehicle based on the one or more requirements of the vehicular application information.

Example 8 includes the apparatus of Example 7, wherein the logic is further to incorporate the first and second name information as part of a name of a data packet including at least geo-content location information in the name of the data packet.

Example 9 includes the apparatus of any of Examples 7 to 8, wherein the logic is further to discover an available function independent from one or more of a data request or response procedure, and download the available function from a trusted source.

Example 10 includes the apparatus of Example 9, wherein the logic is further to discover the available function based on one or more of the first name information and the second name information.

Example 11 includes the apparatus of any of Examples 7 to 10, wherein the logic is further to forward data based on one or more of geographical location of data, compute capability, and communication capability.

Example 12 includes the apparatus of Example 11, wherein the logic is further to place an in-network function based on one or more of geographical location of data, compute capability, and communication capability.

Example 13 includes the apparatus of any of Examples 7 to 12, wherein the logic coupled to the one or more substrates includes transistor channel regions that are positioned within the one or more substrates.

Example 14 includes a method of compute-aware content-centric vehicular networking, comprising generating first name information corresponding to one or more of data or content for an autonomous vehicle to represent vehicular application information based on one or more requirements of the vehicular application information, and generating second name information corresponding to a chain of one or more functions for an autonomous vehicle based on the one or more requirements of the vehicular application information.

Example 15 includes the method of Example 14, further comprising incorporating the first and second name information as part of a name of a data packet including at least geo-content location information in the name of the data packet.

Example 16 includes the method of any of Examples 14 to 15, further comprising discovering an available function independent from one or more of a data request or response procedure, and downloading the available function from a trusted source.

Example 17 includes the method of Example 16, further comprising discovering the available function based on one or more of the first name information and the second name information.

Example 18 includes the method of any of Examples 14 to 17, further comprising forwarding data based on one or more of geographical location of data, compute capability, and communication capability.

Example 19 includes the method of Example 18, further comprising placing an in-network function based on one or more of geographical location of data, compute capability, and communication capability.

Example 20 includes at least one computer readable storage medium, comprising a set of instructions, which when executed by a computing device, cause the computing device to generate first name information corresponding to one or more of data or content for an autonomous vehicle to represent vehicular application information based on one or more requirements of the vehicular application information, and generate second name information corresponding to a chain of one or more functions for an autonomous vehicle based on the one or more requirements of the vehicular application information.

Example 21 includes the at least one computer readable storage medium of Example 20, comprising a further set of instructions, which when executed by the computing device, cause the computing device to incorporate the first and second name information as part of a name of a data packet including at least geo-content location information in the name of the data packet.

Example 22 includes the at least one computer readable storage medium of any of Examples 20 to 21, comprising a further set of instructions, which when executed by the computing device, cause the computing device to discover an available function independent from one or more of a data request or response procedure, and download the available function from a trusted source.

Example 23 includes the at least one computer readable storage medium of Example 22, comprising a further set of instructions, which when executed by the computing device, cause the computing device to discover the available function based on one or more of the first name information and the second name information.

Example 24 includes the at least one computer readable storage medium of any of Examples 20 to 23, comprising a further set of instructions, which when executed by the computing device, cause the computing device to forward data based on one or more of geographical location of data, compute capability, and communication capability.

Example 25 includes the at least one computer readable storage medium of Example 24, comprising a further set of instructions, which when executed by the computing device, cause the computing device to place an in-network function based on one or more of geographical location of data, compute capability, and communication capability.

Example 26 includes a vehicular network apparatus, comprising means for generating first name information corresponding to one or more of data or content for an autonomous vehicle to represent vehicular application information based on one or more requirements of the vehicular application information, and means for generating second name information corresponding to a chain of one or more functions for an autonomous vehicle based on the one or more requirements of the vehicular application information.

Example 27 includes the apparatus of Example 26, further comprising means for incorporating the first and second name information as part of a name of a data packet including at least geo-content location information in the name of the data packet.

Example 28 includes the apparatus of any of Examples 26 to 27, further comprising means for discovering an available function independent from one or more of a data request or response procedure, and means for downloading the available function from a trusted source.

Example 29 includes the apparatus of Example 28, further comprising means for discovering the available function based on one or more of the first name information and the second name information.

Example 30 includes the apparatus of any of Examples 26 to 29, further comprising means for forwarding data based on one or more of geographical location of data, compute capability, and communication capability.

Example 31 includes the apparatus of Example 30, further comprising means for placing an in-network function based on one or more of geographical location of data, compute capability, and communication capability.

Example 32 includes an electronic processing system, comprising a processor, memory communicatively coupled to the processor, and logic communicatively coupled to the processor to identify a cluster head for a cluster of autonomous vehicles, utilize the cluster head to assist in-networking caching of one or more of data and functions, utilize the cluster head to coordinate discovery of one or more of an availability of functions, data cache resources, and compute resources in a proximity of the cluster head, and utilize the cluster head to coordinate one or more of producer mobility and consumer mobility.

Example 33 includes the system of Example 32, wherein the logic is further to select the cluster head based at least in part on computational resources of two or more cluster head candidates.

Example 34 includes the system of any of Examples 32 to 33, wherein the logic is further to identify popular information in a geo-location of the cluster head, and utilize the cluster head to determine where to cache the popular information.

Example 35 includes the system of any of Examples 32 to 34, wherein the logic is further to provide one or more of service and resource availability-related information updates from each cluster member to the cluster head, provide aggregated service and resource availability-related information from the cluster head to the cluster members, and provide additional service and resource availability-related information from the cluster head to one or more neighbor cluster head.

Example 36 includes the system of any of Examples 32 to 35, wherein the logic is further to detect if a producer is moved out of the cluster, utilize the cluster head to determine one or more cluster members for cache replacement of the moved producer within the cluster, detect if a consumer is moved out of the cluster, track a new target cluster for the moved consumer, and forward interest packet-related information for the moved consumer towards the new target cluster.

Example 37 includes the system of any of Examples 32 to 36, wherein the logic is further to forward data based on cluster-related information.

Example 38 includes a semiconductor package apparatus for use with autonomous vehicle-related information, comprising one or more substrates, and logic coupled to the one or more substrates, wherein the logic is at least partly implemented in one or more of configurable logic and fixed-functionality hardware logic, the logic coupled to the one or more substrates to identify a cluster head for a cluster of autonomous vehicles, utilize the cluster head to assist in-networking caching of one or more of data and functions, utilize the cluster head to coordinate discovery of one or more of an availability of functions, data cache resources, and compute resources in a proximity of the cluster head, and utilize the cluster head to coordinate one or more of producer mobility and consumer mobility.

Example 39 includes the apparatus of Example 38, wherein the logic is further to select the cluster head based at least in part on computational resources of two or more cluster head candidates.

Example 40 includes the apparatus of any of Examples 38 to 39, wherein the logic is further to identify popular information in a geo-location of the cluster head, and utilize the cluster head to determine where to cache the popular information.

Example 41 includes the apparatus of any of Examples 38 to 40, wherein the logic is further to provide one or more of service and resource availability-related information updates from each cluster member to the cluster head, provide aggregated service and resource availability-related information from the cluster head to the cluster members, and provide additional service and resource availability-related information from the cluster head to one or more neighbor cluster head.

Example 42 includes the apparatus of any of Examples 38 to 41, wherein the logic is further to detect if a producer is moved out of the cluster, utilize the cluster head to determine one or more cluster members for cache replacement of the moved producer within the cluster, detect if a consumer is moved out of the cluster, track a new target cluster for the moved consumer, and forward interest packet-related information for the moved consumer towards the new target cluster.

Example 43 includes the apparatus of any of Examples 38 to 42, wherein the logic is further to forward data based on cluster-related information.

Example 44 includes the apparatus of any of Examples 38 to 43, wherein the logic coupled to the one or more substrates includes transistor channel regions that are positioned within the one or more substrates.

Example 45 includes a method of vehicular networking, comprising identifying a cluster head for a cluster of autonomous vehicles, utilizing the cluster head to assist in-networking caching of one or more of data and functions, utilizing the cluster head to coordinate discovery of one or more of an availability of functions, data cache resources, and compute resources in a proximity of the cluster head, and utilizing the cluster head to coordinate one or more of producer mobility and consumer mobility.

Example 46 includes the method of Example 45, further comprising selecting the cluster head based at least in part on computational resources of two or more cluster head candidates.

Example 47 includes the method of any of Examples 45 to 46, further comprising identifying popular information in a geo-location of the cluster head, and utilizing the cluster head to determine where to cache the popular information.

Example 48 includes the method of any of Examples 45 to 47, further comprising providing one or more of service and resource availability-related information updates from each cluster member to the cluster head, providing aggregated service and resource availability-related information from the cluster head to the cluster members, and providing additional service and resource availability-related information from the cluster head to one or more neighbor cluster head.

Example 49 includes the method of any of Examples 45 to 48, further comprising detecting if a producer is moved out of the cluster, utilizing the cluster head to determine one or more cluster members for cache replacement of the moved producer within the cluster, detecting if a consumer is moved out of the cluster, tracking a new target cluster for the moved consumer, and forwarding interest packet-related information for the moved consumer towards the new target cluster.

Example 50 includes the method of any of Examples 45 to 49, further comprising forwarding data based on cluster-related information.

Example 51 includes at least one computer readable storage medium, comprising a set of instructions, which when executed by a computing device, cause the computing device to identify a cluster head for a cluster of autonomous vehicles, utilize the cluster head to assist in-networking caching of one or more of data and functions, utilize the cluster head to coordinate discovery of one or more of an availability of functions, data cache resources, and compute resources in a proximity of the cluster head, and utilize the cluster head to coordinate one or more of producer mobility and consumer mobility.

Example 52 includes the at least one computer readable storage medium of Example 51, comprising a further set of instructions, which when executed by the computing device, cause the computing device to select the cluster head based at least in part on computational resources of two or more cluster head candidates.

Example 53 includes the at least one computer readable storage medium of any of Examples 51 to 52, comprising a further set of instructions, which when executed by the computing device, cause the computing device to identify popular information in a geo-location of the cluster head, and utilize the cluster head to determine where to cache the popular information.

Example 54 includes the at least one computer readable storage medium of any of Examples 51 to 53, comprising a further set of instructions, which when executed by the computing device, cause the computing device to provide one or more of service and resource availability-related information updates from each cluster member to the cluster head, provide aggregated service and resource availability-related information from the cluster head to the cluster members, and provide additional service and resource availability-related information from the cluster head to one or more neighbor cluster head.

Example 55 includes the at least one computer readable storage medium of any of Examples 51 to 54, comprising a further set of instructions, which when executed by the computing device, cause the computing device to detect if a producer is moved out of the cluster, utilize the cluster head to determine one or more cluster members for cache replacement of the moved producer within the cluster, detect if a consumer is moved out of the cluster, track a new target cluster for the moved consumer, and forward interest packet-related information for the moved consumer towards the new target cluster.

Example 56 includes the at least one computer readable storage medium of any of Examples 51 to 55, comprising a further set of instructions, which when executed by the computing device, cause the computing device to forward data based on cluster-related information.

Example 57 includes a vehicular network apparatus, comprising means for identifying a cluster head for a cluster of autonomous vehicles, means for utilizing the cluster head to assist in-networking caching of one or more of data and functions, means for utilizing the cluster head to coordinate discovery of one or more of an availability of functions, data cache resources, and compute resources in a proximity of the cluster head, and means for utilizing the cluster head to coordinate one or more of producer mobility and consumer mobility.

Example 58 includes the apparatus of Example 57, further comprising means for selecting the cluster head based at least in part on computational resources of two or more cluster head candidates.

Example 59 includes the apparatus of any of Examples 57 to 58, further comprising means for identifying popular information in a geo-location of the cluster head, and means for utilizing the cluster head to determine where to cache the popular information.

Example 60 includes the apparatus of any of Examples 57 to 59, further comprising means for providing one or more of service and resource availability-related information updates from each cluster member to the cluster head, means for providing aggregated service and resource availability-related information from the cluster head to the cluster members, and means for providing additional service and resource availability-related information from the cluster head to one or more neighbor cluster head.

Example 61 includes the apparatus of any of Examples 57 to 60, further comprising means for detecting if a producer is moved out of the cluster, means for utilizing the cluster head to determine one or more cluster members for cache replacement of the moved producer within the cluster, means for detecting if a consumer is moved out of the cluster, means for tracking a new target cluster for the moved consumer, and means for forwarding interest packet-related information for the moved consumer towards the new target cluster.

Example 62 includes the apparatus of any of Examples 57 to 61, further comprising means for forwarding data based on cluster-related information.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited because other modifications will become apparent to the skilled practitioner upon a study of the drawings, specification, and following claims.

We claim:

1. A semiconductor package apparatus for use with autonomous vehicle-related information, comprising:
   one or more substrates; and
   logic coupled to the one or more substrates, wherein the logic is at least partly implemented in one or more of configurable logic and fixed-functionality hardware logic, the logic coupled to the one or more substrates to:
      generate first name information corresponding to one or more of data or content for an autonomous vehicle to represent vehicular application information based on one or more requirements of the vehicular application information,
      generate second name information corresponding to a chain of functions for an autonomous vehicle based on the one or more requirements of the vehicular application information, the second name information including an order of the functions in the chain of functions to apply to the one or more of data or content to produce a result, and
      transmit an interest packet to request the result, the interest packet name including the first name information and the second name information.

2. The apparatus of claim 1, wherein the logic is further to:
   include geo-content location information in the name of the interest packet.

3. The apparatus of claim 1, wherein the logic is further to:
   discover an available function independent from one or more of a data request or response procedure; and
   download the available function from a trusted source.

4. The apparatus of claim 3, wherein the logic is further to:
   discover the available function based on one or more of the first name information and the second name information.

5. The apparatus of claim 1, wherein the logic is further to:
   forward data based on one or more of geographical location of data, compute capability, and communication capability.

6. The apparatus of claim 5, wherein the logic is further to:
   place an in-network function based on one or more of geographical location of data, compute capability, and communication capability.

7. The apparatus of claim 1, wherein the logic coupled to the one or more substrates includes transistor channel regions that are positioned within the one or more substrates.

8. The apparatus of claim 1, wherein the second name information includes common parameters that are common to all functions in the chain of functions.

9. The apparatus of claim 1, wherein the second name information includes specific parameters that are specific to one function in the chain of functions.

10. A method of compute-aware content-centric vehicular networking, comprising:
    generating first name information corresponding to one or more of data or content for an autonomous vehicle to represent vehicular application information based on one or more requirements of the vehicular application information;
    generating second name information corresponding to a chain of one or more functions for an autonomous vehicle based on the one or more requirements of the vehicular application information, the second name information including an order of the functions in the chain of functions to apply to the one or more of data or content to produce a result, and
    transmitting an interest packet to request the result, the interest packet name including the first name information and the second name information.

11. The method of claim 10, further comprising:
    including geo-content location information in the name of the interest packet.

12. The method of claim 10, further comprising:
    discovering an available function independent from one or more of a data request or response procedure; and
    downloading the available function from a trusted source.

13. The method of claim 12, further comprising:
    discovering the available function based on one or more of the first name information and the second name information.

14. The method of claim 10, further comprising:
    forwarding data based on one or more of geographical location of data, compute capability, and communication capability.

15. The method of claim 14, further comprising:
    placing an in-network function based on one or more of geographical location of data, compute capability, and communication capability.

16. The method of claim 10, wherein the second name information includes common parameters that are common to all functions in the chain of functions.

17. The method of claim 10, wherein the second name information includes specific parameters that are specific to one function in the chain of functions.

18. At least one computer readable storage medium including a set of instructions that, when executed by a computing device, cause the computing device to perform operations comprising:
    generating first name information corresponding to one or more of data or content for an autonomous vehicle to represent vehicular application information based on one or more requirements of the vehicular application information;
    generating second name information corresponding to a chain of functions for an autonomous vehicle based on the one or more requirements of the vehicular application information, the second name information including an order of the functions in the chain of functions to apply to the one or more of data or content to produce a result, and transmitting an interest packet to request the result, the interest packet name including the first name information and the second name information.

19. The method of claim 18, wherein the operations further comprise:

including geo-content location information in the name of the interest packet.

20. The method of claim 18, wherein the operations further comprise:

discovering an available function independent from one or more of a data request or response procedure; and downloading the available function from a trusted source.

21. The method of claim 20, wherein the operations further comprise discovering the available function based on one or more of the first name information and the second name information.

22. The method of claim 18, wherein the operations further comprise:

forwarding data based on one or more of geographical location of data, compute capability and communication capability.

23. The method of claim 22, wherein the operations further comprise:

placing an in-network function based on one or more of geographical location of data, compute capability, and communication capability.

24. The method of claim 18, wherein the second name information includes common parameters that are common to all functions in the chain of functions.

25. The method of claim 18, wherein the second name information includes specific parameters that are specific to one function in the chain of functions.

* * * * *

UNITED STATES PATENT AND TRADEMARK OFFICE
CERTIFICATE OF CORRECTION

Page 1 of 1

PATENT NO. : 11,064,321 B2
APPLICATION NO. : 16/236453
DATED : July 13, 2021
INVENTOR(S) : Jha et al.

It is certified that error appears in the above-identified patent and that said Letters Patent is hereby corrected as shown below:

In the Claims

In Column 43, Line 16, in Claim 21, after "comprise", insert --:--

In Column 44, Line 4, in Claim 22, after "capability", insert --,--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*